(12) United States Patent
Fujisawa et al.

(10) Patent No.: US 8,146,113 B2
(45) Date of Patent: Mar. 27, 2012

(54) DISK UNIT FOR CONVEYING DISKS OF DIFFERENT DIAMETERS

(75) Inventors: Shinichi Fujisawa, Tokyo (JP); Satoru Inoue, Tokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 0 days.

(21) Appl. No.: 13/160,121

(22) Filed: Jun. 14, 2011

(65) Prior Publication Data

US 2011/0247020 A1   Oct. 6, 2011

Related U.S. Application Data

(63) Continuation of application No. 11/347,796, filed on Feb. 2, 2006, now Pat. No. 7,984,458.

(30) Foreign Application Priority Data

| Feb. 2, 2005 | (JP) | ................................. 2005-026935 |
| Feb. 3, 2005 | (JP) | ................................. 2005-027720 |
| Feb. 16, 2005 | (JP) | ................................. 2005-039141 |

(51) Int. Cl.
*G11B 17/04* (2006.01)
(52) U.S. Cl. ........................ 720/623; 720/704
(58) Field of Classification Search .................. 720/617, 720/619–623, 626, 628, 703, 704
See application file for complete search history.

(56) References Cited

U.S. PATENT DOCUMENTS

| 5,022,023 | A |  | 6/1991 | Toyoguchi |
| 5,097,460 | A |  | 3/1992 | Camps |
| 5,113,388 | A |  | 5/1992 | Yamada |
| 5,150,349 | A |  | 9/1992 | Takai |
| 5,173,894 | A |  | 12/1992 | Kido |
| 5,828,641 | A |  | 10/1998 | Abe |
| 6,243,350 | B1 |  | 6/2001 | Knight |
| 6,414,927 | B1 |  | 7/2002 | Ota |
| 6,480,442 | B1 |  | 11/2002 | Nakatani |
| 6,618,341 | B1 |  | 9/2003 | Yamashita |
| 6,826,766 | B2 | * | 11/2004 | Tuchiya ........................ 720/620 |
| 6,839,898 | B2 |  | 1/2005 | Saji |
| 6,990,673 | B2 |  | 1/2006 | Lee |
| 6,993,776 | B2 |  | 1/2006 | Yamanaka |
| 7,007,285 | B2 | * | 2/2006 | Suzuki ......................... 720/621 |
| 7,010,798 | B2 |  | 3/2006 | Saji |

(Continued)

FOREIGN PATENT DOCUMENTS

CN    1136204 A    11/1996

(Continued)

OTHER PUBLICATIONS

Chinese Patent Office First Action issued Mar. 28, 2008, in corresponding CN Patent Application No. 2006101387619.

*Primary Examiner* — Brian Miller

(74) *Attorney, Agent, or Firm* — Seed IP Law Group PLLC

(57) ABSTRACT

A disk unit is disclosed wherein a disk inserted by a pivoting arm is loaded to the interior of the disk unit or a disk accommodated in the interior of the disk unit is unloaded to the exterior of the disk unit, the disk unit including a plurality of arms able to convey two types of disks different in diameter while supporting an outer periphery edge of each of the disks.

11 Claims, 49 Drawing Sheets

U.S. PATENT DOCUMENTS

| | | | |
|---|---|---|---|
| 7,140,030 B2 * | 11/2006 | Togawa | 720/623 |
| 7,353,522 B2 * | 4/2008 | Suzuki | 720/621 |
| 7,356,825 B2 | 4/2008 | Makisaka | |
| 7,770,190 B2 * | 8/2010 | Fujisawa et al. | 720/626 |
| 2001/0021157 A1 | 9/2001 | Kikuchi et al. | |
| 2003/0161243 A1 | 8/2003 | Tuchiya | |
| 2005/0060734 A1 | 3/2005 | Aoyama | |
| 2005/0141356 A1 | 6/2005 | Fujisawa | |
| 2005/0198656 A1 | 9/2005 | Yamamoto | |
| 2006/0085808 A1 | 4/2006 | Fujimura | |
| 2006/0230412 A1 * | 10/2006 | Fujisawa et al. | 720/626 |
| 2008/0163273 A1 * | 7/2008 | Eguchi | 720/623 |

FOREIGN PATENT DOCUMENTS

| | | |
|---|---|---|
| CN | 1201232 A | 12/1998 |
| CN | 1320263 A | 10/2001 |
| CN | 1384498 A | 12/2001 |
| CN | 1435831 A | 8/2003 |
| CN | 1637902 A | 7/2005 |
| JP | 10-162466 | 6/1998 |
| JP | 10-289514 | 10/1998 |
| JP | 11-7689 A | 1/1999 |
| JP | 11-7690 A | 1/1999 |
| JP | 11066677 A | 3/1999 |
| JP | 11120657 A | 4/1999 |
| JP | 2001056994 A | 2/2001 |
| JP | 2002117604 A | 4/2002 |
| JP | 2002170309 A | 6/2002 |
| JP | 2002279716 A | 9/2002 |
| JP | 2003257058 A | 9/2003 |
| JP | 2005190645 A | 7/2005 |
| JP | 2006127680 A | 5/2006 |
| KR | 1019950010274 B1 | 12/1995 |

* cited by examiner (A)

(B)

(C)

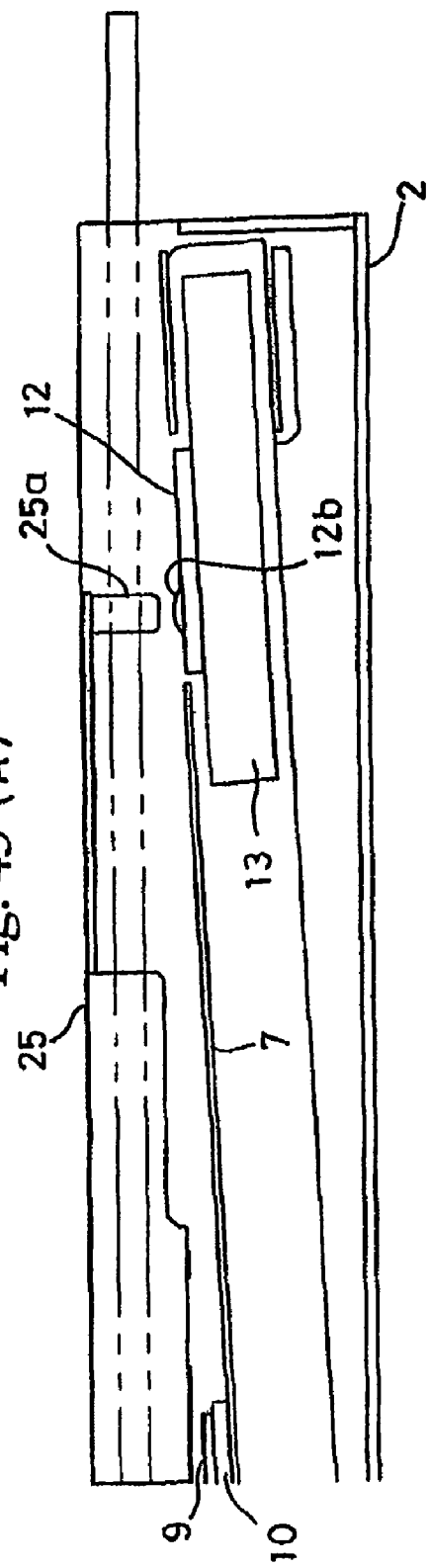
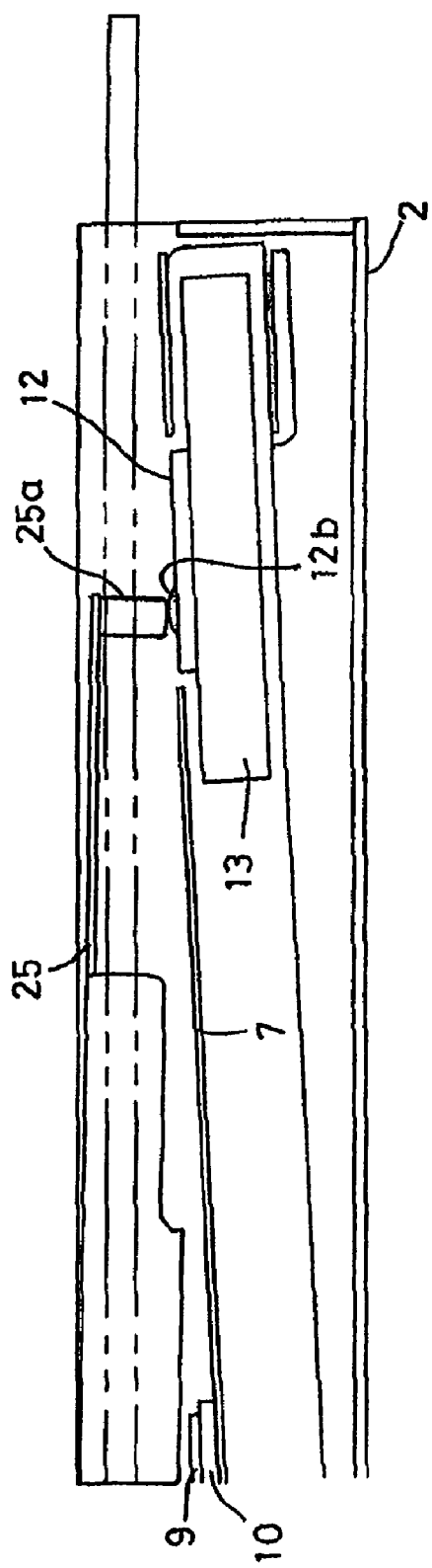
Fig. 45 (A)
Fig. 45 (B)

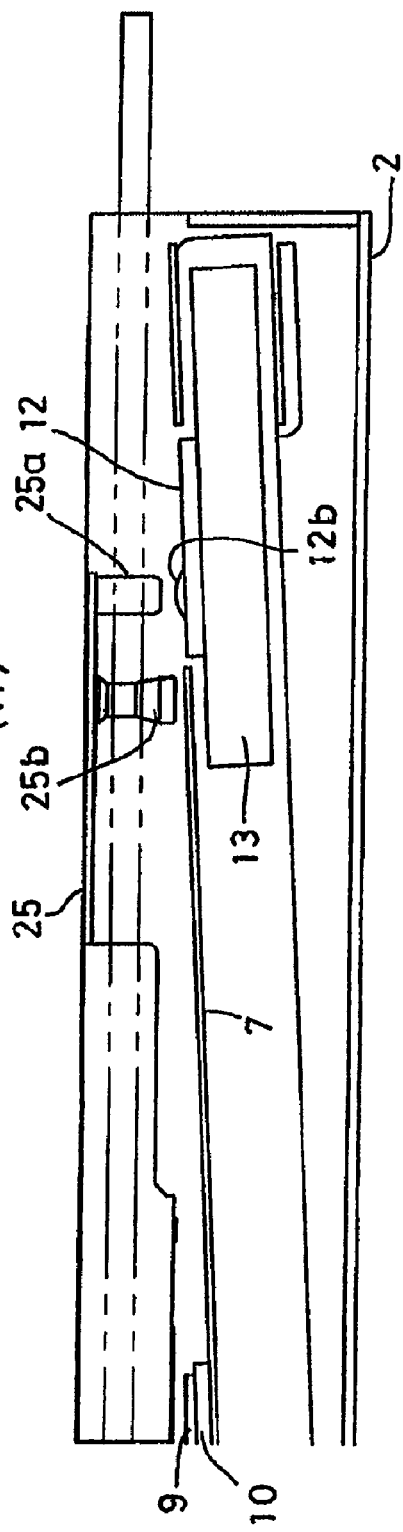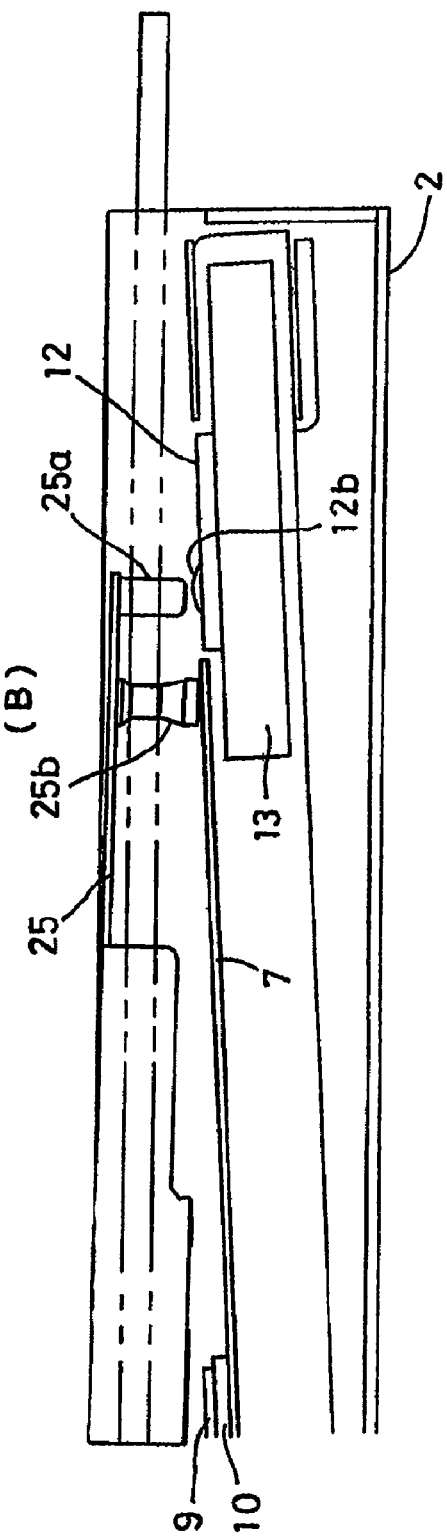

DISK UNIT FOR CONVEYING DISKS OF DIFFERENT DIAMETERS

BACKGROUND

1. Technical Field

The present invention relates to a disk unit for driving an optical disk (e.g., CD-R/RW, DVD-R/-RW/RAM/+R/+RW) as a recording medium which stores a large amount of information in information systems such as various computer systems.

2. Description of the Related Art

The disk unit incorporated for example in a personal computer is usually provided with a disk tray loaded with a disk, the disk tray being constructed so as to move forward and backward. The disk loaded on the disk tray is driven within a body of the disk unit to perform read or write of information.

On the other hand, as a disk unit not using such a disk tray, a slot-in type disk unit tends to be adopted more and more. The slot-in type disk unit is suitable for the reduction in thickness and size of personal computers. In the slot-in type disk unit, the disk tray is not used for load and unload of a disk with respect to the unit body, so when an operator inserts the greater part of the disk into a slot, a loading mechanism installed in the unit body operates and loads the disk automatically.

FIGS. 49 and 50 show the construction and operation modes of a loading mechanism in a conventional slot-in type disk unit. According to the illustrated construction, when an operator inserts a disk D into a slot, the disk D reaches its position shown in FIG. 49 while its height direction and right and left positions are restricted by a pin 100a provided at a tip of a first pivotable member 100 and also by right and left guide members 101, 102 and further restricted halfway by a pin 103 a provided at a tip of a second pivotable member 103.

At this time, the pin 100a at the tip of the first pivotable member 100 is pushed by the disk D and the first pivotable member 100 rotates in the direction of arrow 100A. Likewise, the pin 103a at the tip of the second pivotable member 103 is pushed by the disk D and the second pivotable member 103 rotates in the direction of arrow 103A. Further, a switch lever 104 is pushed against an end portion of the second pivotable member 103 and rotates in the direction of arrow 104A, thereby actuating a detection switch 105.

Upon operation of the detection switch 105, drive means 106 starts operating and a first slide member 107 starts moving in the direction of arrow 107A. An end of the first slide member 107 and an end of a second slide member 108 are connected together through a slide connecting member 109 which is pivotably supported by a pin 110. Consequently, the second slide member 108 moves forward in the direction of arrow 108A in synchronism with retreat of the first slide member 107.

Once the first slide member 107 starts to retreat, a driven pin 100b of the first pivotable member 100 which is cantilevered by the first slide member 107 is guided by a cam groove 107a of the first slide member 107, so that the pivotable member 100 rotates in the direction of arrow 108B around a fulcrum 100c, whereby the pin 100a at the tip of the first pivotable member 100 conveys the disk D until abutment against pins 111a and 111b of a disk positioning member 111 in the direction of arrow 107A.

At this time, the pin 103a of the second pivotable member 103 rotates in the direction of arrow 103A and therefore moves in the arrow 103A direction in synchronism with the pin 100a provided at the tip of the first pivotable member 100 while supporting the disk D. Then, after abutment of the disk D against the pins 111a and 111b of the disk positioning member 111, the pin 103a rotates to a position spaced a little from the disk D.

The above is an operation mode of the loading mechanism in case of loading the disk D into the disk unit. The operation mode of the loading mechanism in case of unloading the disk D to the exterior of the disk unit is reverse to the above operation mode. More specifically, when the drive means 106 is turned ON in the opposite direction in accordance with an unloading command in a state in which the disk D is at a predetermined position in the interior of the disk unit as shown in FIG. 50, the first slide member 107 starts to move forward in the direction of arrow 107B and, in synchronism therewith, the second slider member 108 connected to the slide connecting member 109 starts to retreat in the direction of arrow 108B. Consequently, the first pivotable member 100 rotates in the direction of arrow 100A and the second pivotable member 103 rotates in the direction of arrow 103B, so that the disk D is unloaded to the exterior of the disk unit while being supported by the pins 100a and 103a provided respectively at the tips of those pivotable members.

The disk D loaded into the disk unit is clamped by a clamp head 112 which is adapted to move vertically at a predetermined position. The clamp head 112 is integral with a turntable 113 fixed to a drive shaft of a spindle motor 114. The spindle motor 114 is disposed on a frame member (not shown), which frame member is moved vertically by a lift mechanism (see, for example, Japanese Patent Laid-Open Publication No. 2002-117604).

In the disk unit configured as above, in order to effect a cooperative operation of both first pivotable member 100 and second pivotable member 103, the first slide member 107 and the second slide member 108 are connected with each other through the slide connecting member 109 so as to synchronize their forward and backward movements. Therefore, the positions in the course of conveyance of the pins 100a and 103a provided respectively at the tips of the first and second pivotable members 100, 103 must be determined on the basis of an outer periphery edge of a disk of a specific diameter.

Disks defined by the standard applied to such a disk unit as the above disk unit are generally called 12 cm disk and 8 cm disk, the former being the highest in versatility. Driving a disk of such a different diameter in a disk tray type disk unit can be done by only loading the disk to a corresponding groove formed in a disk tray. However, in the disk unit having such a mechanism as disclosed in Japanese Patent Laid-Open Publication No. 2002-117604, a pivoting range of the first pivotable member 100 and that of the second pivotable member 103 are designed in a corresponding relation to the conveyance of the 12 cm disk, so that the conveyance and hence drive of the 8 cm disk cannot be done at all.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention has been accomplished in view of the above conventional problems and it is an object of the present invention to provide a slot-in type disk unit which permits drive of two types of disks different in diameter and in which the tip of an arm for the conveyance of a disk is prevented from damaging an optical pickup adapted to write or read information with respect to the disk.

The present invention achieves the above-mentioned object by adopting the following means.

In a first aspect of the present invention there is provided a disk unit wherein a disk inserted by a pivoting arm is loaded to the interior of the disk unit or a disk accommodated in the interior of the disk unit is unloaded to the exterior of the disk unit, the disk unit including a plurality of arms able to convey two types of disks different in diameter while supporting an outer periphery edge of each of the disks.

In a second aspect of the present invention there is provided, in combination with the above first aspect, a disk unit wherein the plural arms can convey the two types of disks different in diameter while supporting the outer periphery edge of each of the disks in at least three positions.

In a third aspect of the present invention there is provided, in combination with the above first aspect, a disk unit wherein the drive of the plural arms is controlled in interlock with advance or retreat of a single loading slider.

In a fourth aspect of the present invention there is provided, in combination with the above first aspect, a disk unit wherein an arm for the conveyance of a small-diameter disk is retracted from a conveyance path of a large-diameter disk, thereby permitting conveyance of the large-diameter disk.

In a fifth aspect of the present invention there is provided, in combination with the above first aspect, a disk unit wherein an arm for the conveyance of a small-diameter disk is disposed so as not to extend onto a lift base on which is provided a turntable for supporting and rotating the disks.

In a sixth aspect of the present invention there is provided, in combination with the above first aspect, a disk unit wherein an automatic loading of a small-diameter disk is started on the basis of a primary operation of a detection switch adapted to judge the state of operation of the disk supporting arms and an automatic loading of a large-diameter disk is started on the basis of a secondary operation of the detection switch.

In a seventh aspect of the present invention there is provided, in combination with the above first aspect, a disk unit wherein a loading member for transmitting a driving force to at least one of the plural arms is provided with a guide groove to control the drive of an arm for the conveyance of a large-diameter disk and a guide groove to control the drive of an arm for the conveyance of a small-diameter disk.

In an eighth aspect of the present invention there is provided, in combination with the above first aspect, a disk unit wherein a common arm is guided by either a guide groove provided to control the drive of an arm for the conveyance of a large-diameter disk or a guide groove provided to control the drive of an arm for the conveyance of a small-diameter disk.

In a ninth aspect of the present invention there is provided, in combination with the above first aspect, a disk unit wherein an arm driven pin guided by a guide groove adapted to control the drive of an arm for the conveyance of a large-diameter disk and a guide groove adapted to control the drive of an arm for the conveyance of a small-diameter disk faces the guide groove adapted to control the drive of the arm for the conveyance of the small-diameter disk in a steady state and, upon insertion of the large-diameter disk, faces the guide groove adapted to control the drive of the arm for the conveyance of the large-diameter disk.

In a tenth aspect of the present invention there is provided, in combination with the above first aspect, a disk unit wherein a loading member for transmitting a driving force to at least one of the plural arms is provided with a guide groove adapted to make the one arm perform an operation for the conveyance of a large-diameter disk and a guide groove adapted to make the one arm perform an operation for the conveyance of a small-diameter disk.

In an eleventh aspect of the present invention there is provided, in combination with the above first aspect, a disk unit wherein a turntable for supporting and rotating the disks is provided on a lift frame, and at a tip of an arm passing over an optical pickup which is adapted to reciprocate through the interior of the lift frame there is provided a descent inhibiting member for the arm.

In a twelfth aspect of the present invention there is provided, in combination with the above eleventh aspect, a disk unit wherein a pin member is fixed to a rear portion of a disk support member fixed to the tip of the arm and is allowed to serve as the descent inhibiting member.

In a thirteenth aspect of the present invention there is provided, in combination with the above eleventh aspect, a disk unit wherein a disk support member and the descent inhibiting member are formed integrally and fixed to the tip of the arm.

According to the present invention it is possible to complete a slot-in type disk unit able to effect automatic loading and drive of two types of disks different in diameter. Besides, since the drive of plural arms is controlled, the thickness of the entire unit does not become large and thus it is possible to meet the demand for thickness reduction. Further, the tip of an arm adapted to pivot over an optical pickup which is for write or read of information with respect to a disk and thereby effect conveyance of the disk is prevented from damaging the optical pickup, whereby the mechanical reliability of the disk unit can be improved.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 45 is a diagram illustrating a state of occurrence of an inconvenience in FIG. 44;

FIG. 47 is a diagram illustrating a function of the guide arm shown in FIG. 46;

DETAILED DESCRIPTION

Embodiments of the present invention will be described in detail hereinafter with reference to the accompanying drawings. To facilitate understanding of the present invention, constructions related to the gist of the present invention will be included in the following description.

Figure 1:
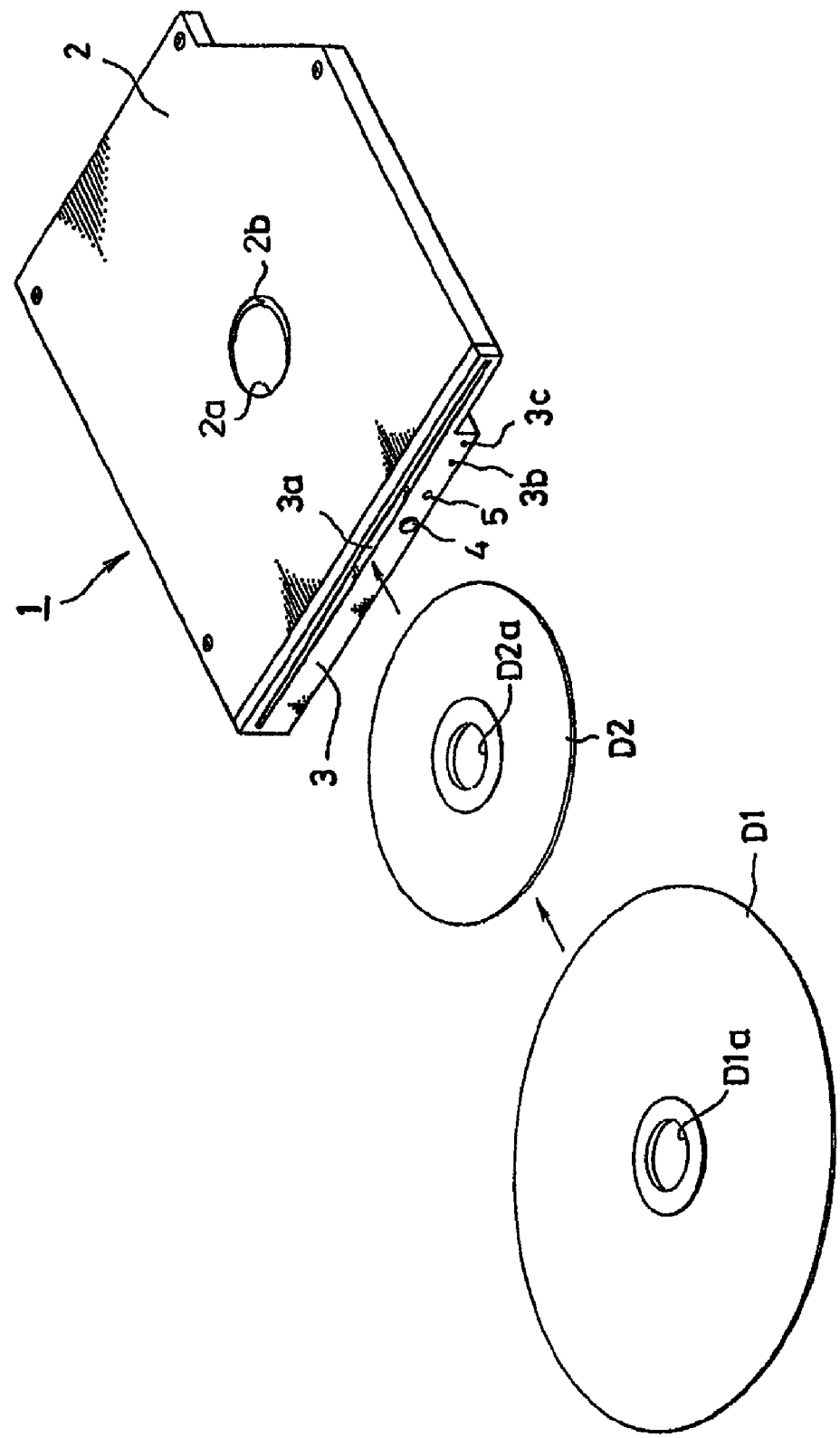
FIG. 1 is a perspective view of a slot-in type disk unit embodying the present invention.

FIG. 1 illustrates an appearance of a slot-in type disk unit 1 embodying the present invention. An aperture 2a is formed centrally of a top plate of a chassis case 2 which is constructed in a shielded condition, and an inwards projecting protuberance 2b is formed on a periphery edge portion of the aperture 2a. A bezel 3 is fixed to a front end of the chassis case 2, and a slot 3a for insertion therein of both 12 cm disk (hereinafter referred to as the "large-diameter disk") D1 and 8 cm disk (hereinafter referred to as the "small-diameter disk") D2, as well as through holes 3b and 3c for emergency release, are formed in the bezel 3. The bezel 3 is provided with a push-button 4 for unloading the large-diameter disk D1 or the small-diameter disk D2 accommodated within the disk unit 1 to the exterior of the unit and an indicator 5 for indicating a state of operation of the disk unit 1.

Figure 2:
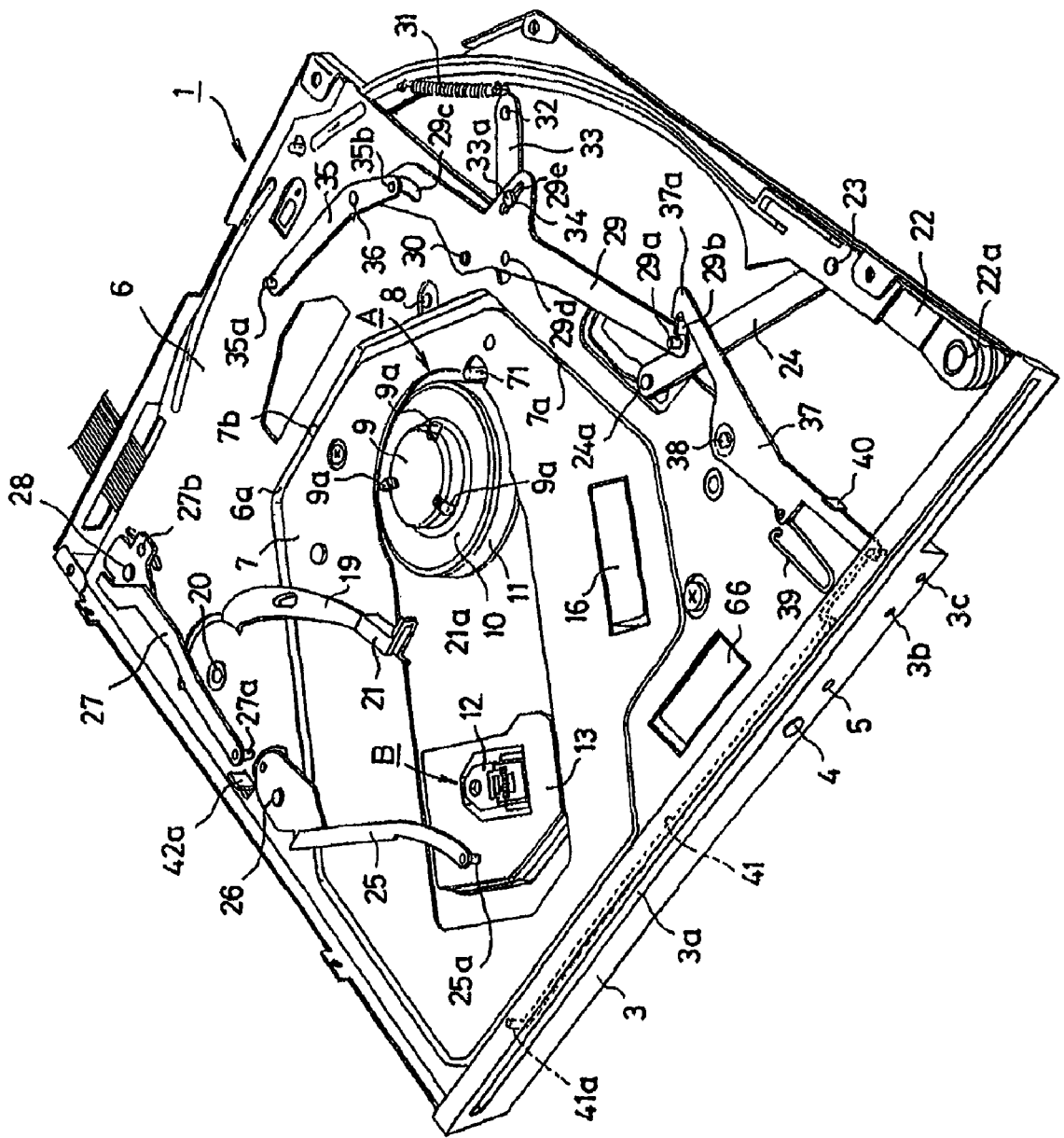
FIG. 2 is a perspective view showing an interior configuration of the disk unit of FIG. 1.

FIG. 2 is a perspective view of the disk unit with a top plate portion of the chassis case 2 removed. A base panel 6 is disposed within the chassis case 2 and a drive unit A for the large- and small-diameter disks D1, D2 is disposed obliquely downward from the center of the base panel 6. In the drive unit A, for clamping center holes D1a and D2a of the large- and small-diameter disks D1, D2, or for releasing the clamped state, a lift frame 7 is connected at plural positions to the base panel 6 by a known shock-absorbing support structure 8, the lift frame 7 being constructed such that a rear end portion thereof positioned centrally of the disk unit is vertically pivotable with the front bezel 3 side as a fulcrum.

In the rear end portion of the lift frame 7, a clamp head 9 is disposed at a position corresponding to the center of the large- or small-diameter disk D1 or D2 which has been loaded and stopped. The clamp head 9 is constructed integrally with a turntable 10 and is fixed to a drive shaft of a spindle motor 11 disposed just under the clamp head. The large- or small-diameter disk D1 or D2 clamped by a chucking pawl 9a of the clamp head 9 is driven rotationally by the spindle motor 11 to read or write information.

The reference numeral B denotes a head unit supported by the lift frame 7. In the head unit B, a carrier block 13 for reciprocating an optical pickup 12 in the diametrical direction of the large- and small-diameter disks D1, D2 is supported at both ends thereof by guide shafts 14 and 15 which are fixed to the lift frame 7. The carrier block 13 is moved forward and backward with a driving force of a sled motor 16 transmitted from a gear train 17 to a screw shaft 18 (see FIG. 3).

Plural arms for loading and unloading of the large- and small-diameter disks D1, D2 are disposed on a flat surface of the base panel 6 in a surrounding relation to the lift frame 7 and are operated by a drive mechanism disposed on the back side of the base panel 6. Among the plural arms, it is a disk supporting arm 19 that fulfills a main function in loading and unloading of the disks. The disk supporting arm 19 is adapted to move pivotally about a rivet pin 20 and not only supports rear end sides of the large- and small-diameter disks D1, D2 but also keeps accurately the height position of each disk during conveyance. To this end, the disk supporting arm 19 is provided at a tip thereof with a holder 21, and the rear end sides of the large- and small-diameter disks D1, D2 are held by a recess 21a of the holder 21.

The reference numeral 22 denotes a loading arm for loading the large-diameter disk D1 into the disk unit. The loading arm 22 is pulled by a link lever 24 which is connected to the loading arm through a pivot pin 23 and moves pivotally. The loading arm 22 starts pressing a front side portion with respect to the center of the large-diameter disk D1 which has been inserted by a loading roller 22a of the loading arm, and functions to lead the large-diameter disk D1 into the disk unit.

A guide arm 25 is adapted to move pivotally about a pivot pin 26 which is mounted rotatably to the base panel 6, and functions to support a side portion of the small-diameter disk D2 and lead it to a predetermined position, the small-diameter disk D2 being conveyed by a support member 25a which is fixed in a suspended state to a tip of the guide arm 25. A guide arm 27 is adapted to move pivotally about a rivet pin 28 and not only functions to support a side portion of the large-diameter disk D1 and lead it to a predetermined position, the large-diameter disk D1 being conveyed by a support member 27a which is fixed in a suspended state to a tip of the guide arm 27, but also functions to support a side portion of the small-diameter disk D2 and lead it to a predetermined position. On the back side of the base panel 6, an end portion of a third pivotable member 51 and an end portion of an extension spring 53 are attached to a pivot pin 27b provided at a base end portion of the guide arm 27.

A guide arm 29 is adapted to move pivotally about a rivet pin 30 and not only functions to support a side portion of the small-diameter disk D2 and lead it to a predetermined position, the small-diameter disk D2 being conveyed by a support member 29a which is fixed in an erected state to a tip of the guide arm 29, but also functions to support a side portion of the large-diameter disk D1 and locate it to predetermined positions. A work pin 33a of a link lever 33 which is urged by an extension spring 31 and moves pivotally about a rivet pin 32 is engaged in a slit 29e of the guide arm 29, so that the tip of the guide arm 29 assumes a constantly urged state in the centripetal direction. A guide arm 35 connected through a driven pin 35b to a guide groove 29c formed in a rear end portion of the guide arm 29 is adapted to move pivotally about a rivet pin 36 and not only functions to support the rear end side of the small-diameter disk D2 through a support member 35a which is fixed in an erected state to a tip of the guide arm 35 and lead it to a predetermined position but also functions to support a side portion of the small-diameter disk D2 and locate it at a predetermined position.

The reference numeral 37 denotes a lock lever, which is adapted to move pivotally about a rivet pin 38, thereby permitting an angle 37a formed at a tip of the lock lever 37 to lock a tongue piece 29b provided at the tip of the guide arm 29. The angle 37a formed at the tip of the lock lever 37 is urged constantly in the centripetal direction by a wire spring 39, but usually a stopper 40 functions to let the lock lever 37 stand still at a predetermined position.

The reference numeral 41 denotes a lead wire which is disposed along the lower side of the bezel 3. An end portion of the lead wire 41 is connected to a rear end portion of the lock lever 37 and a retaining end portion 41a of the lead wire 41 is bent in an erected state and faces the slot 3a of the bezel 3. Therefore, when the large-diameter disk D1 is inserted from the slot 3a, the retaining end portion 41a is pushed by a side portion of the large-diameter disk D1, with the result that the lead wire 41 moves sideways in parallel with the bezel 3. Consequently, the lock lever 37 is pulled and the angle 37a formed at the tip of the lock lever moves pivotally in a centrifugal direction, whereby the tongue piece 29b of the guide arm 29 can be unlocked.

As a mechanical element exposed onto the flat surface of the base panel 6, the reference numeral 42a denotes a retaining tongue piece of a lever arm 42 (see FIGS. 2 and 3), which functions to control the position of the guide arm 27. As to an operation mode thereof, a detailed description will be given later. Reference numeral 71 denotes a clamp release pin for releasing the clamped state of the large- and small-diameter disks D1, D2 by the clamp head 9.

Mechanical elements are constructed on the back side of the base panel 6 to operate the guide arms, etc. thus constructed on the flat surface of the base panel 6. The disk unit 1 of the present invention is constructed so that all of operation controls related to the conveyance of the large- and small-diameter disks D1, D2 can be completed by advance and retreat of a loading slider 43 which is disposed in a side portion of the interior of the disk unit and in the longitudinal direction as indicated in phantom line in FIG. 3. The following description is now provided about the construction of the loading slider 43 as a main mechanical element and also about mechanical elements whose operations are controlled by the loading slider 43.

Figure 4:
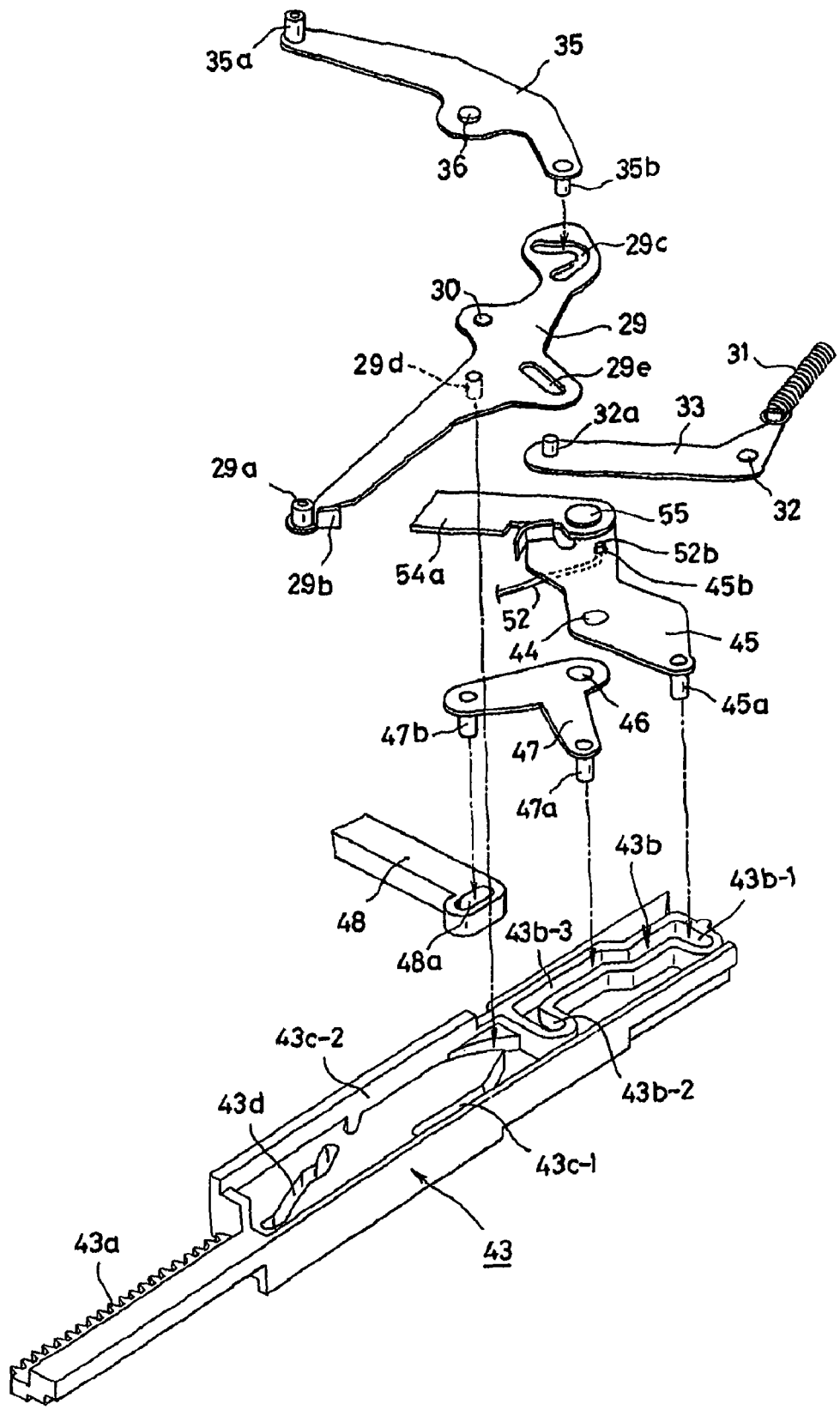
FIG. 4 is an exploded perspective view showing the construction of a loading slider.

FIG. 4 shows a state in which the loading slider 43 is overlooked in a direction opposed to the back side of the base panel 6. As shown in the same figure, the loading slider 43 is formed in the shape of a pillar and a rack gear 43a is formed in a front end portion of the loading slider. On the other hand, in a rear end portion of the loading slider 43 is formed a guide groove 43b, the guide groove 43b comprising an upper-end horizontal portion 43b-1, a lower-end horizontal portion 43b-2 and an intermediate, stepped, vertical portion 43b-3 which are in communication with one another.

A driven pin 45a of a first pivotable member 45 adapted to move pivotally about a rivet pin 44 is fitted in the upper-end horizontal portion 43b-1 and a driven pin 47a of a second pivotable member 47 adapted to move pivotally about a rivet pin 46 is fitted in the vertical portion 43b-3. Further, a work pin 47b of the second pivotable member 47 is fitted in an end through hole 48a of a driven slider 48.

Guide grooves 43c-1 and 43c-2 are formed on both sides of a middle portion of the loading slider 43. A rear end portion of the guide groove 43c-1 is formed with a slant face and front and rear ends of the guide groove 43c-2 are also inclined. A driven pin 29d of the guide arm 29 is mounted so as to be positioned in an opening of the inclined rear end portion of the guide groove 43c-2 in a most advanced state of the loading slider 43.

Figure 5:
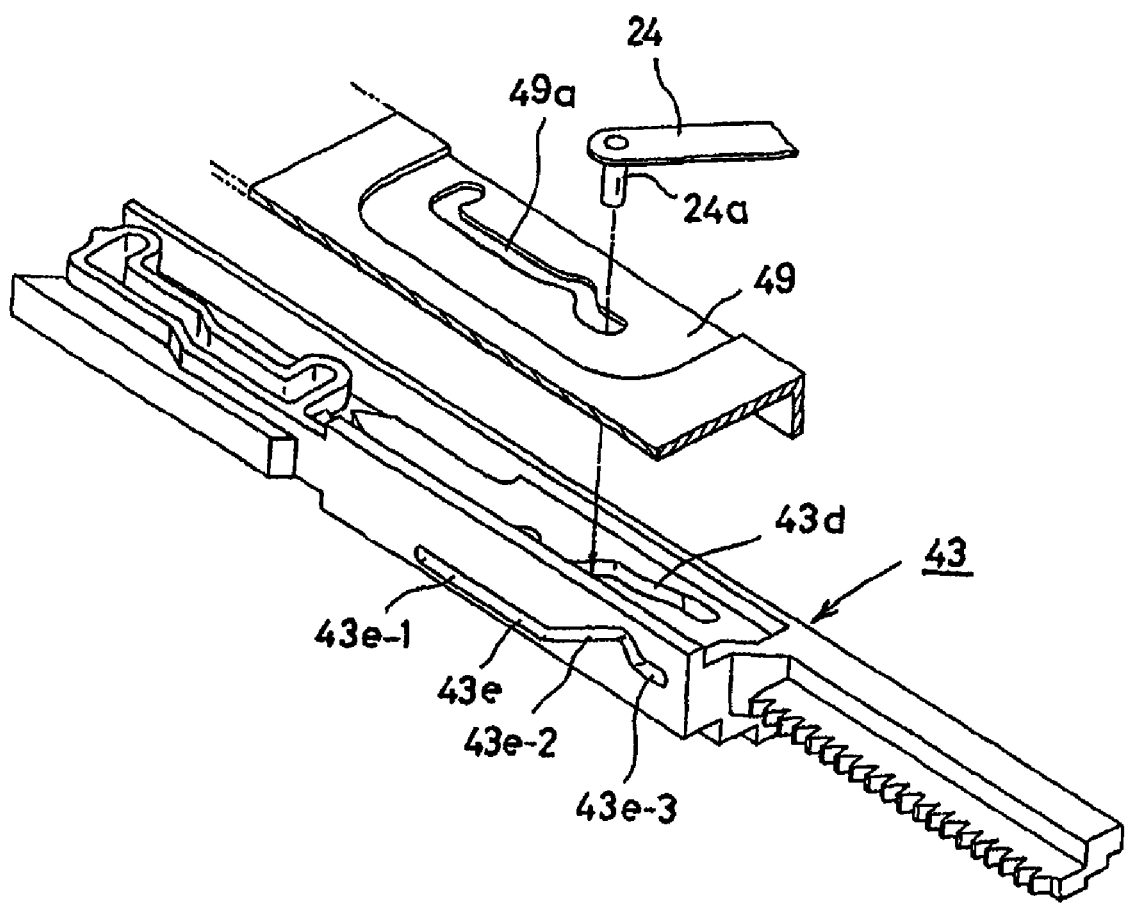
FIG. 5 is an exploded perspective view showing the construction of both loading slider and guide plate.

Reference numeral 43d denotes a guide groove adapted to pull the link lever 24 so as to operate the loading arm 22 in synchronism with conveyance of the large-diameter disk D1. As shown in FIG. 5, a guide slit 49a is formed in a guide plate 49 fixed to the base panel 6 at a position overlapping the guide groove 43d. A driven pin 24a fixed to a tip of the link lever 24 is in an inserted state into both guide groove 43d and guide slit 49a. Therefore, the guide groove 43d adapted to move forward and backward and the guide slit 49a lying at a fixed position operate on each other to control the operation of the driven pin 24a.

In a side portion of the loading slider 43 which side portion faces the lift frame 7 there is formed a cam groove 43e to vertically move the driven pin 7a which functions to raise and lower the lift frame 7. The cam groove 43e comprises a lower portion 43e-1 for maintaining the lift frame 7 at a low position, a slant portion 43e-2 for raising or lowering the lift frame 7, and a higher portion 43e-3 for maintaining the lift frame 7 at a high position, which are formed in series.

Figure 6:
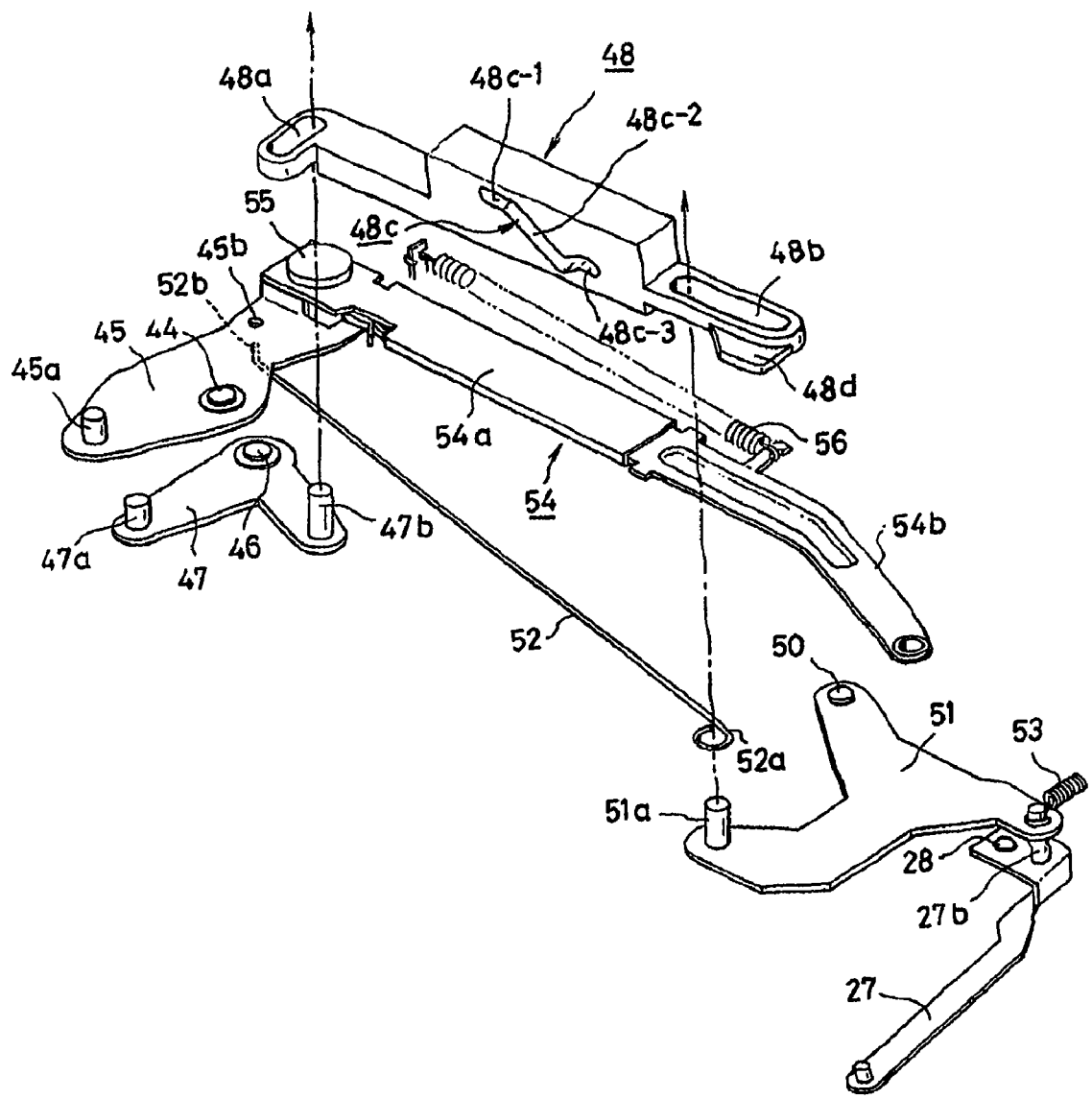
FIG. 6 is an exploded perspective view showing the construction of a power transfer mechanism.

FIG. 6 is an exploded perspective view of a power transfer mechanism as overlooked from a back side thereof, the power transfer mechanism being constructed in the rear portion of the interior of the disk unit. In the power transfer mechanism, a cam groove 48c is formed in the driven slider 48 to raise and lower a driven pin 7b which functions to raise and lower the lift frame 7. The cam groove 48c comprises a lower portion 48c-1 for maintaining the lift frame 7 at a low position, a slant portion 48c-2 for raising or lowering the lift frame 7, and a higher portion 48c-3 for maintaining the lift frame 7 at a high position, which are formed in series.

A work pin 51a of the third pivotable member 51 adapted to move pivotally about a rivet pin 50 is fitted in an end through hole 48b of the driven slider 48. An end portion 52a of a link wire 52 is fitted on the work pin 51a and an opposite end portion 52b of the link wire 52 is engaged in a through hole 45b of the first pivotable member 45. The third pivotable member 51 is urged counterclockwise in FIG. 6 by the extension spring 53, but when the disk unit is not in operation, the third pivotable member 51 stands still at its predetermined position because the movement of the work pin 51a is restricted by the link wire 52. Further, a work piece 48d for actuating the lever arm 42 is formed in a side portion of the end through hole 48b.

A link arm 54 is connected between the first pivotable member 45 and a gear disc which will be described later. The link arm 54 is constructed so that it can expand and contract by a combination of a first link arm 54a connected to the first pivotable member 45 through a connecting member 55 and a second link arm 54b urged by an extension spring 56, thereby ensuring the safety of the mechanism during conveyance of the large- and small-diameter disks D1, D2.

Figure 7:
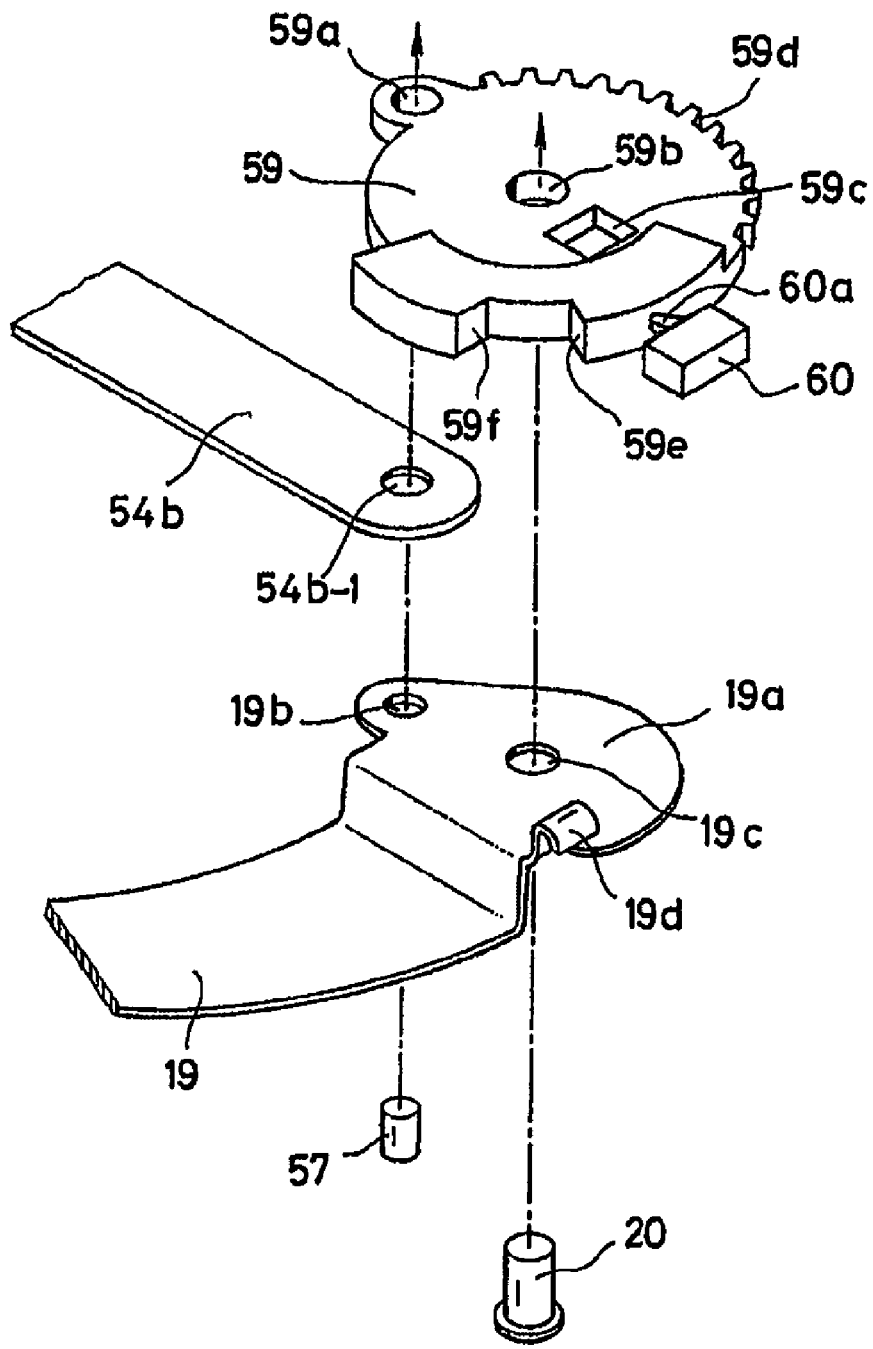
FIG. 7 is an exploded perspective view showing the construction of a gear disc.

FIG. 7 is a perspective view of an end portion of the second link arm 54b as overlooked from the back side of the disk unit. In the same figure, a through hole 54b-1 formed in the second link arm 54b, a through hole 19b formed in a rotary base 19a of the disk supporting arm 19, and a through hole 59a formed in a gear disk 59, are pivotally supported simultaneously by a pivot pin 57. On the other hand, a center hole 19c of the disk supporting arm 19 and a center hole 59b of the gear disc 59 are supported simultaneously by the rivet pin 20 which is fixed at one end thereof to the base panel 6. Further, a retaining piece 19d of the rotary base 19a faces a retaining window 59c of the gear disc 59 to provide an integral combination.

A gear 59d is formed in part of an outer periphery edge of the gear disc 59 opposed to a side face of the chassis case 2. In an outer periphery edge of the gear disk 59 opposite to the said outer periphery edge there are formed switch starting stepped portions 59e and 59f. A limit switch 60, which is turned ON by the switch starting stepped portions 59e and 59f, is mounted on a wiring board (not shown) disposed on the bottom of the chassis case 2 and a switch knob 60a thereof is operated by the switch starting stepped portions 59e and 59f.

The above-described lever arm 42 is fixed so as to move pivotally about a rivet pin 61 and its retaining tongue piece 42a is allowed to face the surface of the base panel 6 from the opening of the base panel 6. Further, a tip of a spring piece 42b is brought into contact with an opening wall 6a of the base panel 6 so that an urging force acting in the centrifugal direction is generated in a roller 42c provided at a tip of the lever arm 42. According to this construction, the lever arm 42 stands still at its predetermined position when the roller 42c is in contact with a side wall of the driven slider 48, but with a sliding motion of the driven slider 48, the roller 42c is pressed by the work piece 48d of the driven slider, so that the lever arm 42 moves pivotally about the rivet pin 61 and the retaining tongue piece 42a moves in the centrifugal direction.

Figure 3:
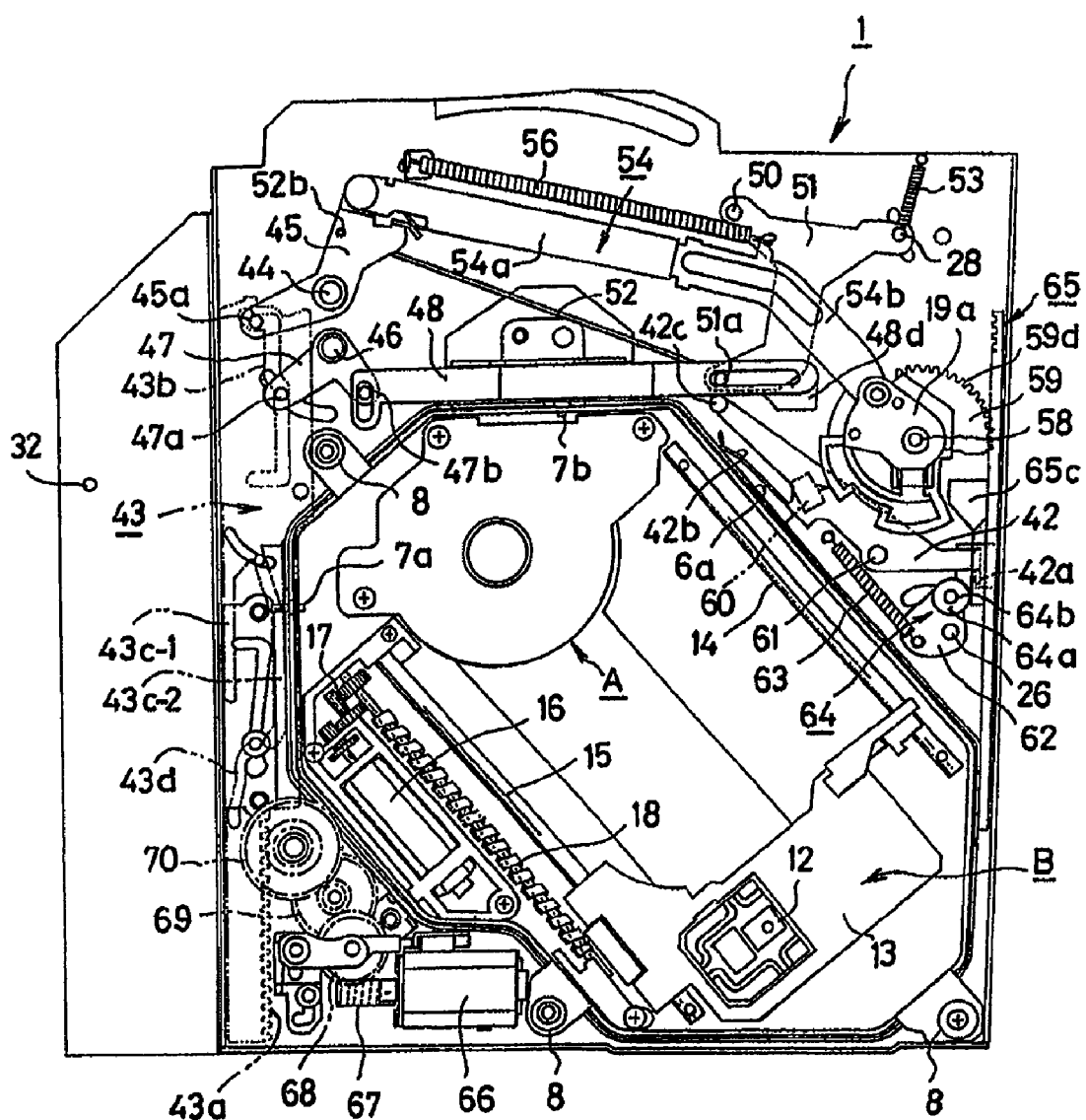
FIG. 3 is a perspective view showing the construction of a drive mechanism in the disk unit of FIG. 1.
Figure 8:
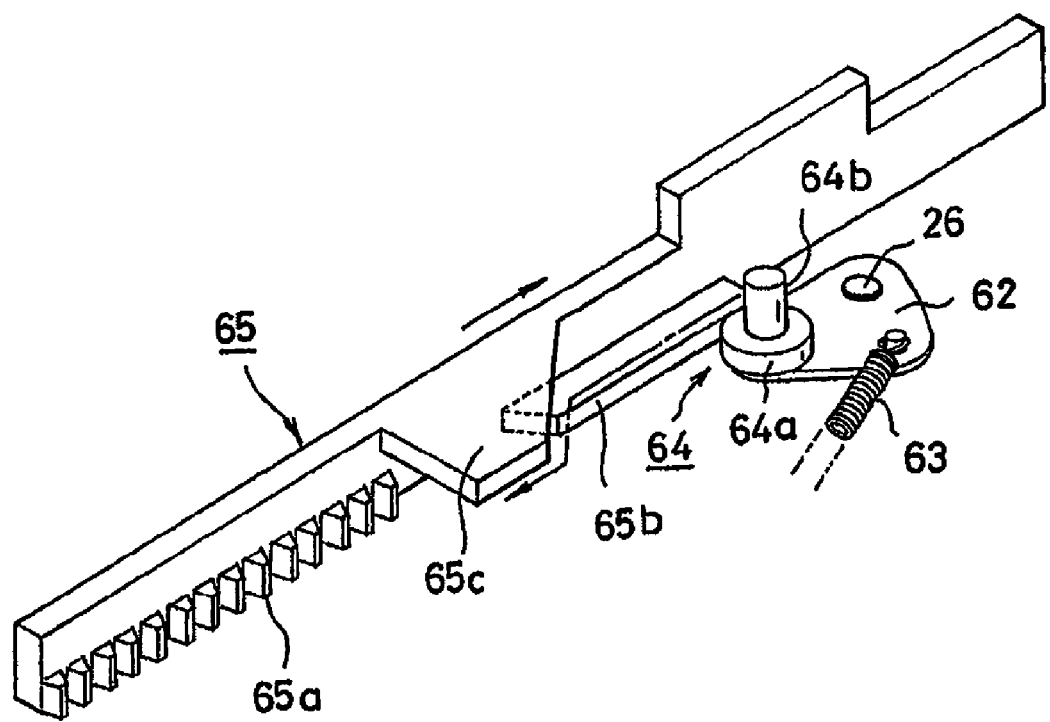
FIG. 8 is a perspective view showing the construction of a rack slider.

Next, a description will be given about a mechanism for pivoting the guide arm 25. The pivot pin 26 provided at a base end as a fulcrum of the guide arm 25 is extended to the back side of the base panel 6 and a roller supporting plate 62 is fixed to an end portion of the pivot pin 26. Since an extension spring 63 is anchored in a stretched state to the roller supporting plate 62 as shown in FIG. 3, a clockwise urging force in the same figure is exerted on the guide arm 25, so that the guide arm 25 tilts in the centripetal direction. As shown in FIG. 8, a double roller 64 disposed on the roller supporting plate 62 has a large-diameter portion 64a and a small-diameter portion 64b which are constructed coaxially with each other.

In FIG. 8, a rack slider 65 disposed along an inner surface of a side wall of the chassis case 2 is provided with a rack gear 65a meshing with the gear 59d of the gear disc 59 and moves forward and backward in synchronism with rotation of the gear disc 59. A lower guide piece 65b is formed on a lower side of an intermediate portion of the rack slider 65 and an upper guide piece 65c is formed on an upper side of the said intermediate portion. The lower guide piece 65b guides the large-diameter portion 64a of the double roller 64, while the upper guide piece 65c guides the small-diameter portion 64b.

The mechanical elements thus constructed are operated with advance and retreat of the loading slider 43 and a drive mechanism for them is disposed in a corner portion of the back side of the disk unit as shown in FIG. 3. A loading motor 66 serves as a power source of the drive mechanism and a rotational force of a worm gear 67 of an output shaft of the loading motor 66 is transmitted successively from a gear smaller in diameter up to a gear larger in diameter while being reduced in speed by means of a gear train comprising double gears 68, 69 and 70. A driving force is transmitted to the rack gear 43a of the loading slider 43 from a small-diameter gear of the double gear 70 meshing with the rack gear 43a, whereby the loading slider 43 moves forward or backward.

The following description is now provided about operation modes of the disk unit 1 of the present invention constructed as above. As described above, the disk unit 1 of the present invention is constructed so as to permit conveyance of the large- and small-diameter disks D1, D2. First, a conveyance mode of the large-diameter disk D1 will be described with reference to FIGS. 9 to 22 and a conveyance mode of the small-diameter disk D2 will be described with reference to FIGS. 23 to 36.

FIGS. 9 to 15 are plan views illustrating, with solid lines, main constituent portions exposed to the surface of the base panel 6 and illustrating, with broken lines, main constituent portions on the back side of the base panel 6. FIGS. 16 to 22 are bottom views illustrating, with solid lines, main constituent portions exposed to the back side of the base panel 6 and illustrating, with broken lines, main constituent portions on the surface side of the base panel 6. Properly speaking, the cam grooves 43e, 48c and the driven pins 7a, 7b do not appear in FIGS. 9 to 15, but for the convenience of explanation and for easier understanding, they are illustrated in those figures.

Figure 9:
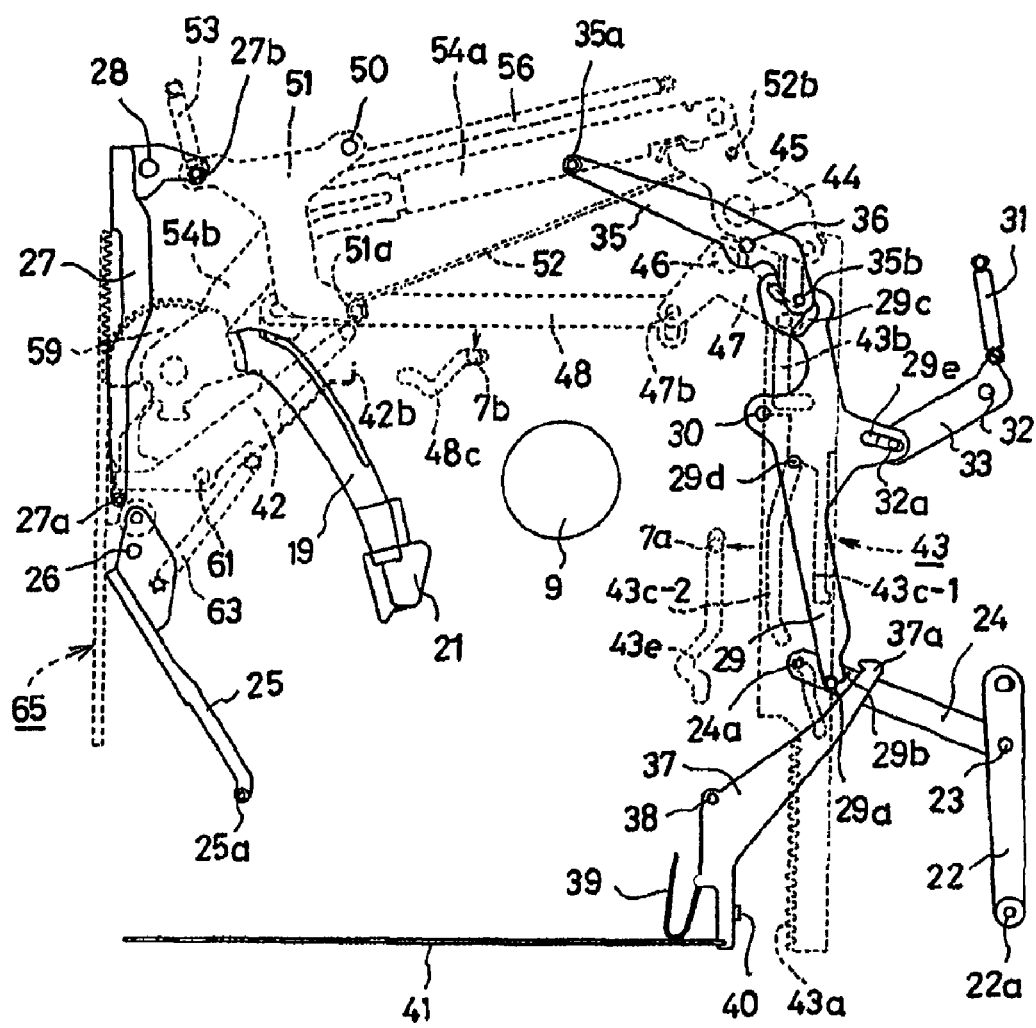
FIG. 9 is a first process diagram illustrating in what state a large-diameter disk is conveyed.
Figure 16:
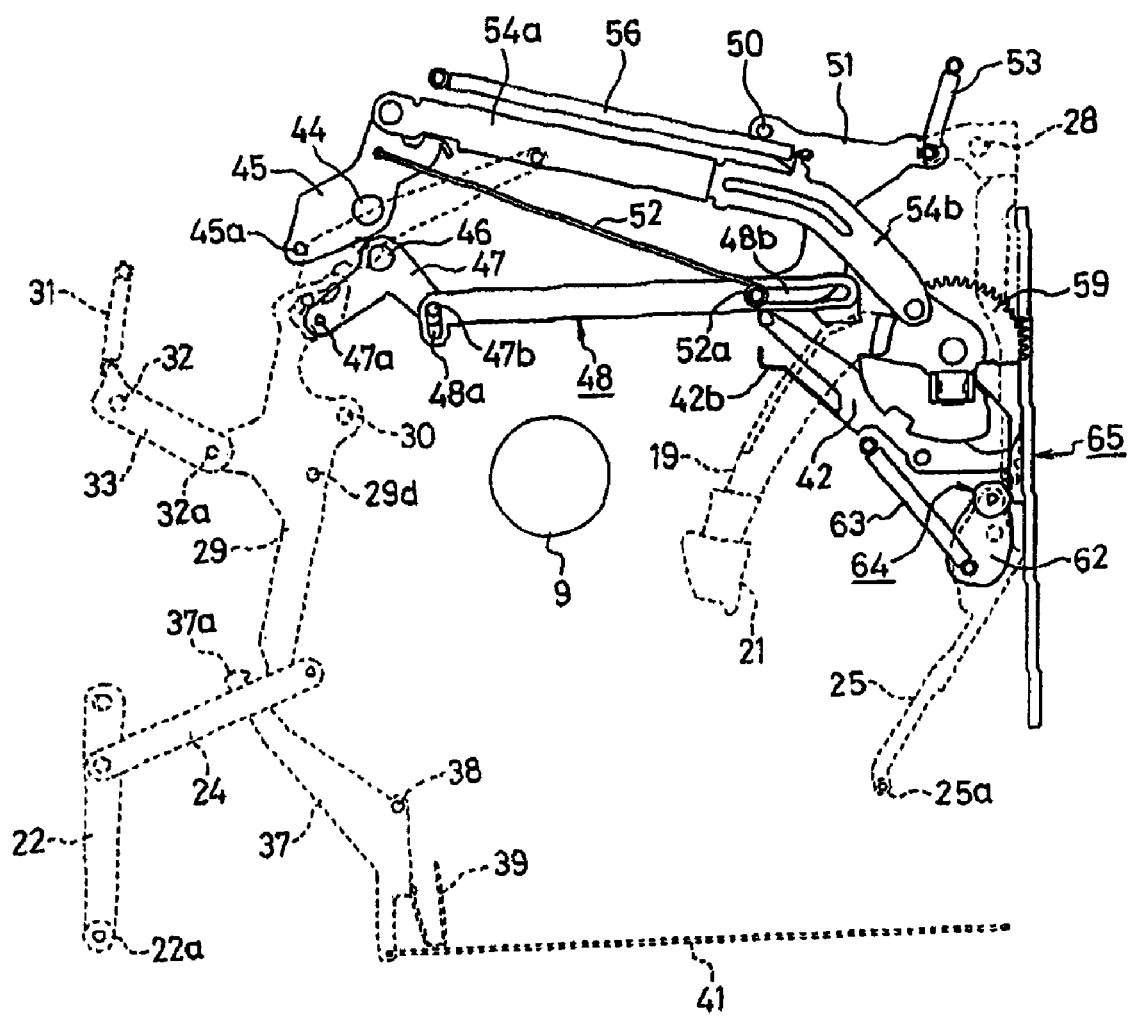
FIG. 16 is a first process diagram illustrating in what state the large-diameter disk is conveyed.

FIGS. 9 and 16 show a state in which the disk unit is waiting for insertion of the large-diameter disk D1 from the slot 3a of the bezel 3 and the arms stand still in an initial condition. At this time, the large-diameter portion 64a of the roller 64 of the roller supporting plate 62 which is fixed to the pivot pin 26 on the back side of the base panel 6 is in abutment against the lower guide piece 65b of the rack slider 65 as shown in FIGS. 8 and 16 and the guide arm 25 is at rest in a position pivoted in the centrifugal direction by a predetermined amount from a position most pivoted in the centripetal direction.

This is for the following reason. If there is adopted a construction wherein the guide arm 25 stops at the position most pivoted in the centripetal direction and waits for insertion of a disk, when the small-diameter disk D2 is inserted into the disk unit in proximity to the left side of the disk unit, the small-diameter disk D2 enters the left side of the support member 25a and it becomes impossible to convey the small-diameter disk D2. For preventing the occurrence of such an inconvenience, the guide arm 25 is stopped at a position pivoted in the centrifugal direction by a predetermined amount from the position most pivoted in the centripetal direction and is allowed to wait for insertion of the disk.

Since the base end portion of the guide arm 27 is urged by the extension spring 53, a force acting to pivot the tip support member 27a in the centripetal direction is exerted constantly on the guide arm 27. However, since the third pivotable member 51 connected to the pivot pin 27b stands still at its predetermined position, the guide arm 27 is at rest in its states shown in FIG. 9. This is because the link wire 52 stretched between the first pivotable member 45 which is at a standstill and the work pin 51a of the third pivotable member 51 functions as a stopper and inhibits a pivotal movement of the third pivotable member 51.

Figure 37:
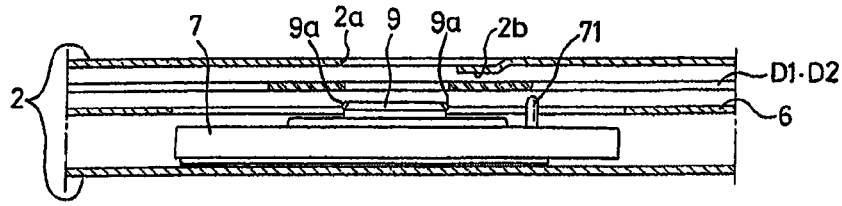
FIG. 37 is a process diagram illustrating an ascending process of a lift frame.
Figure 37:
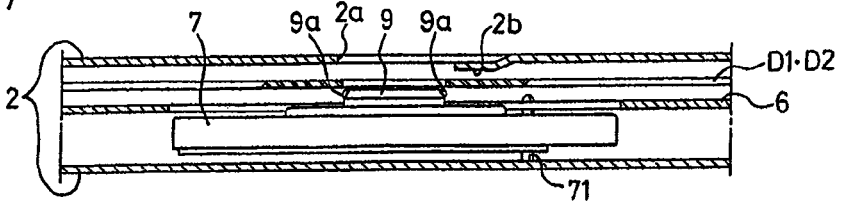
Figure 37:
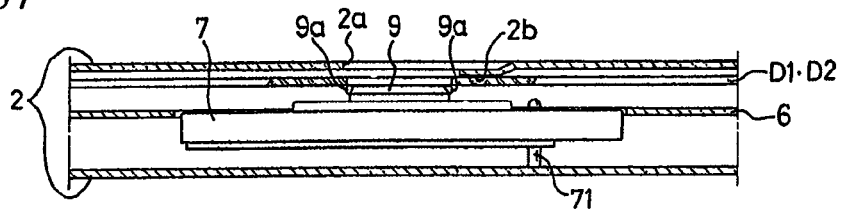
Figure 37:
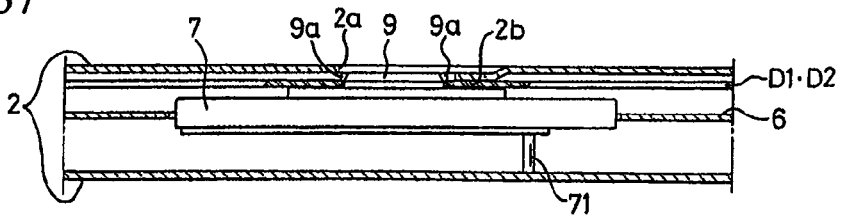
Figure 37:
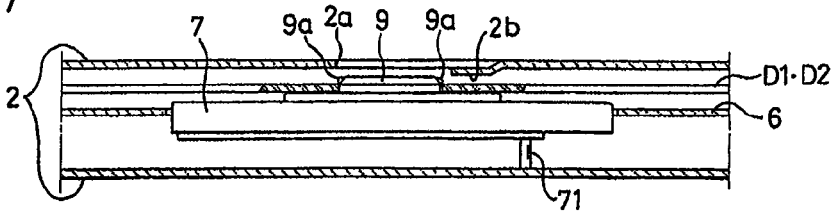

Likewise, the disk supporting arm 19, the guide arms 29, 35 and the loading arm 22, to which power is transmitted with movement of the loading slider 43, are also at rest in the respective states shown in FIG. 9. Further, the driven pin 7a of the lift frame 7 which is guided by the cam groove 43e of the loading slider 43 lies in the lower portion 43e-1 of the cam groove 43e, while the driven pin 7b of the lift frame 7 which is guided by the cam groove 48c of the driven slider 48 lies in the lower portion 48c-1 of the cam groove 48c, so that the lift frame 7 assumes its most descended state as shown in FIG. 37(A).

Figure 10:
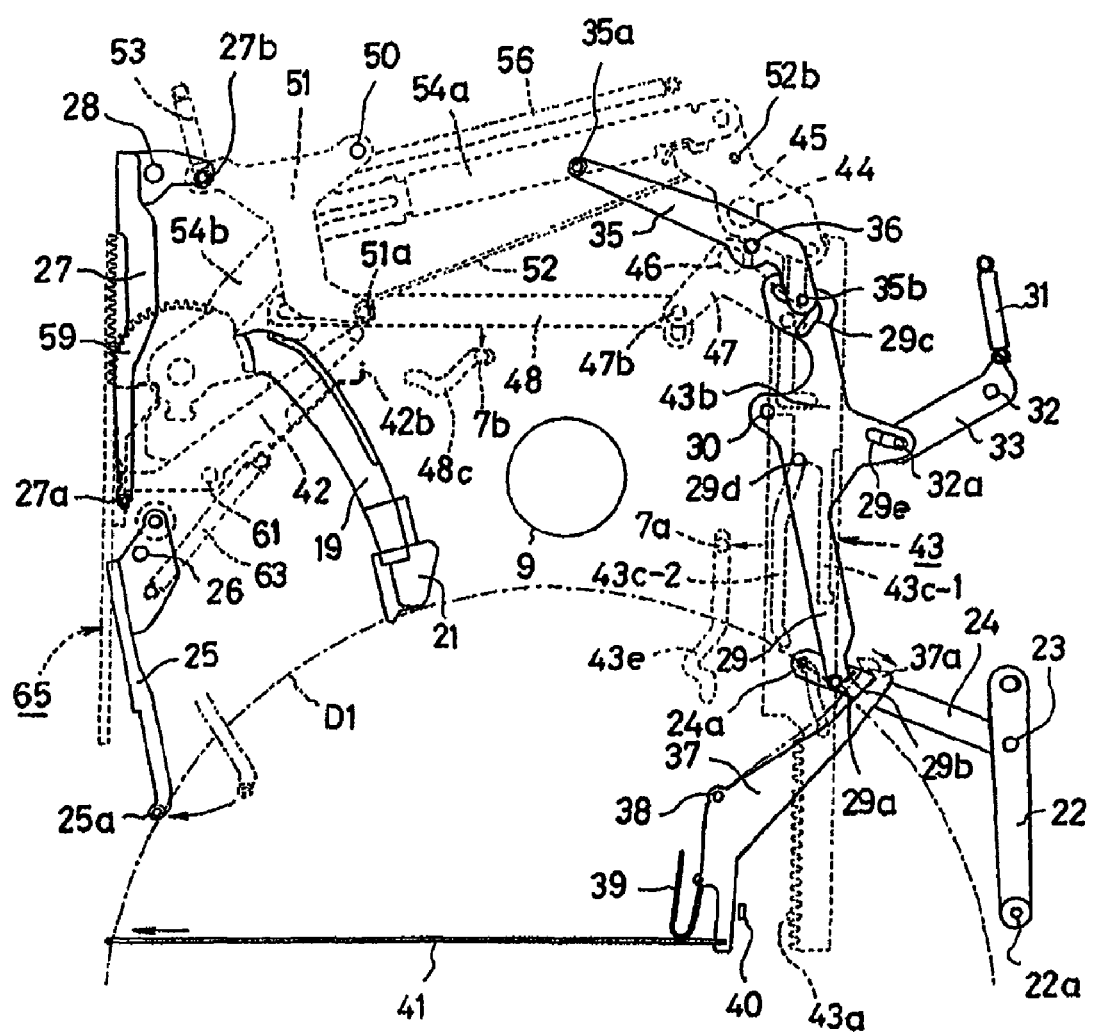
FIG. 10 is a second process diagram illustrating in what state the large-diameter disk is conveyed.
Figure 17:
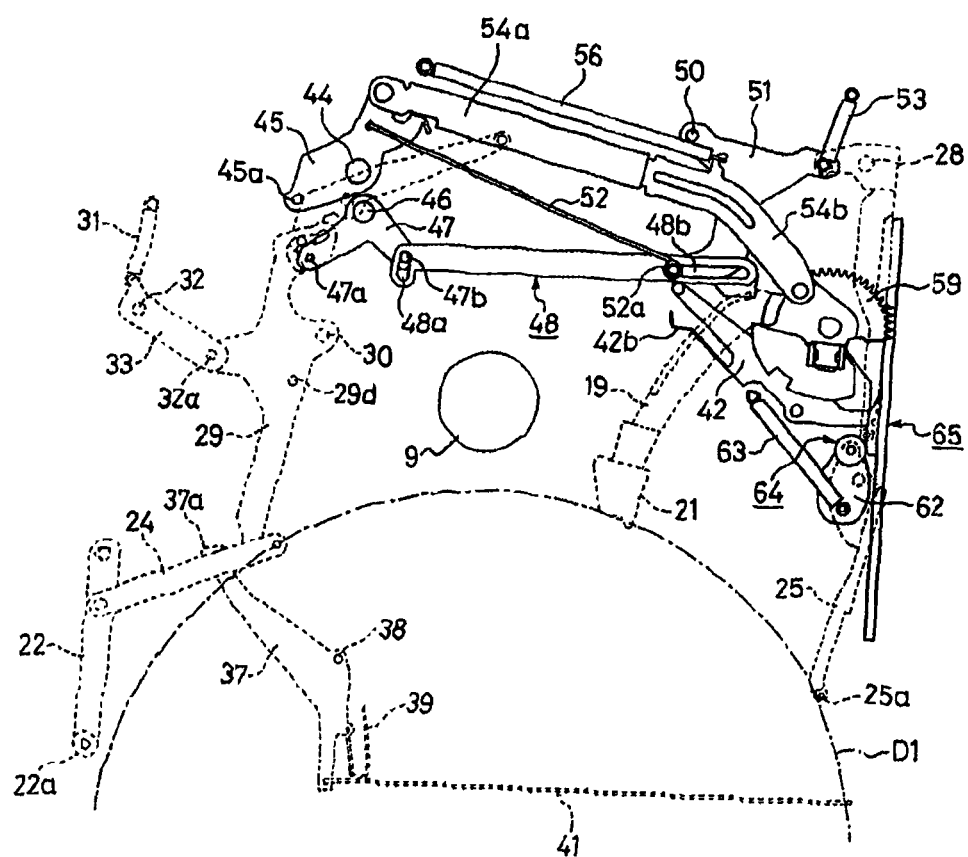
FIG. 17 is a second process diagram illustrating in what state the large-diameter disk is conveyed.

FIGS. 10 and 17 show a state in which the large-diameter disk D1 is inserted from the slot 3a of the bezel 3 by an operator and its front end side is put in abutment against both holder 21 of the disk supporting arm 19 and support member 29a of the guide arm 29. At this time, the large-diameter disk D1 pushes the support member 25a provided at the tip of the guide arm 25 and moves pivotally in the centrifugal direction from its position shown in phantom line in FIG. 10. At the same time, a side portion of the large-diameter disk D1 pushes the retaining end portion 41a of the lead wire 41 and slides in the direction of arrow in the same figure. As a result, the lock lever 37 is pulled by the lead wire 41 and the angle 37a formed at the tip of the lock lever 37 moves pivotally in the direction of arrow in the same figure and is therefore deviated from the locking range for the tongue piece 29b provided at the tip of the guide arm 29.

Figure 11:
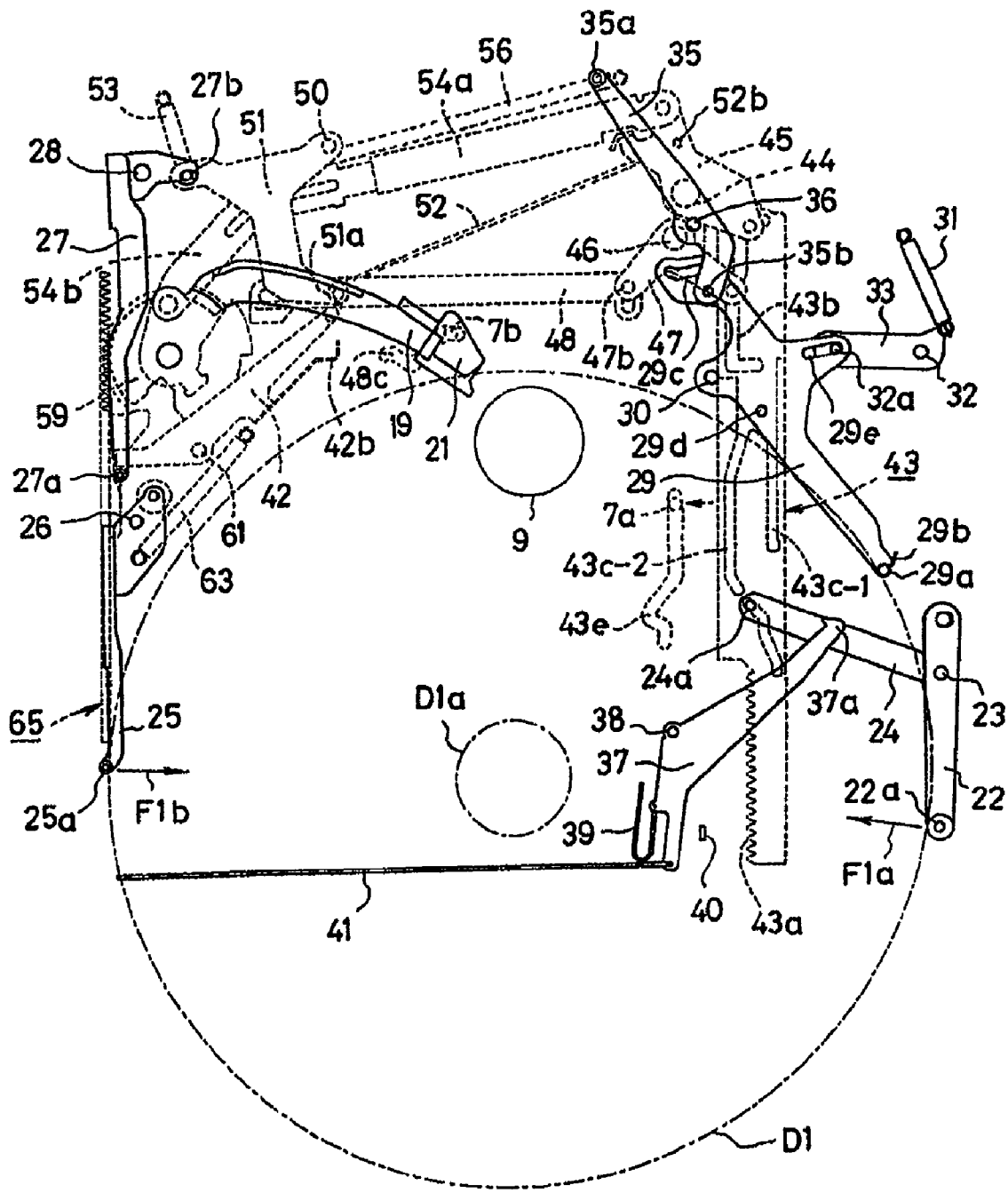
FIG. 11 is a third process diagram illustrating in what state the large-diameter disk is conveyed.
Figure 18:
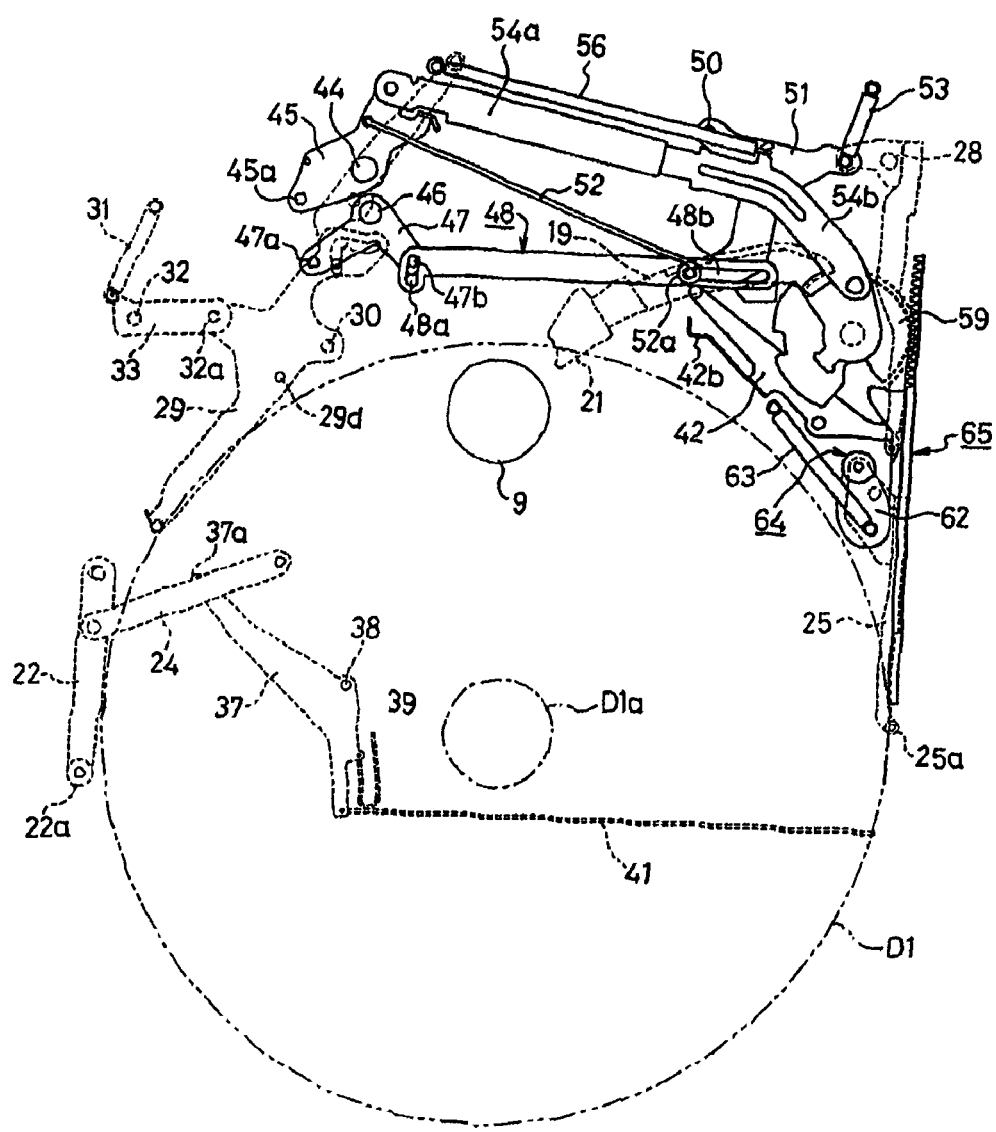
FIG. 18 is a third process diagram illustrating in what state the large-diameter disk is conveyed.

FIGS. 11 and 18 show a further inserted state of the large-diameter disk D1 from the above condition by the operator. The disk supporting arm 19 and the guide arms 25, 29 are pushed by the large-diameter disk D1 and move pivotally in the centrifugal direction. Consequently, a base portion of the disk supporting arm 19 rotates from its position shown in FIG. 39(A) up to its position shown in FIG. 39(B) with the rivet pin 20 as a fulcrum and the limit switch 60 is actuated by the switch starting stepped portion 59e of the gear disc 59. At this time, the rack slider 65 meshing with the gear disc 59 advances slightly.

An electric current of a low voltage flows in the loading motor 66 at this time point in accordance with a signal provided from the limit switch 60 which has been actuated by the switch starting stepped portion 59e. As a result, the loading slider 43 retreats and pulls the link lever 24, the loading arm 22 moves pivotally up to its position shown in phantom line in FIG. 18 and the loading roller 22a provided at the tip of the loading arm 22 comes into abutment against a side portion of the large-diameter disk D1 and stops.

The foregoing electric current of a low voltage is set on the basis of a potential necessary for the conveyance of the small-diameter disk D2 which will be described later. If an electric current of a high potential for generating a large torque necessary for the loading of the large-diameter disk D1 is flowed at this stage, there is a fear that there may occur a malfunction in the conveyance mechanism. More particularly, in FIG. 11, since a component of force F1a induced by pressing of the loading roller 22a and a component of force F1b induced by pressing of the support member 25a of the guide arm 25 lie near the center of the large-diameter disk D1, a resultant force thereof is extremely small and thus a force acting to propel the large-diameter disk D1 in the loading direction is not generated. Besides, in the state shown in FIG. 11, the support member 29a provided at the tip of the guide arm 29 and being urged in the centripetal direction is pushing a rear side portion of the large-diameter disk D1.

In this condition, if an electric current of a high potential necessary for the conveyance of the large-diameter disk D1 is fed to the loading motor 66, the loading arm 22 stops while gripping the large-diameter disk D1 and the loading operation comes to a stop. Continuance of this state leads to a likelihood of risk such as breakage of the gear train in the conveyance mechanism or burnout of the loading motor 66. At this stage, for avoiding the occurrence of such an inconvenience, an electric current of a low voltage necessary for the conveyance of the small-diameter disk D2 is fed to the loading motor 66.

With only the driving force of the loading motor 66 in the above condition with a low voltage current flowing in the loading motor 66, the large-diameter disk D1 acts as a load and the loading arm 22 fails to turn, so that an operation for conveyance of the large-diameter disk D1 is not performed. When the operator pushes the large-diameter disk D1, the driving force of the loading motor 66 and the pushing force of the operator acting in the disk inserting direction are applied to the disk and there is performed an operation for conveyance of the large-diameter disk D1.

Figure 12:
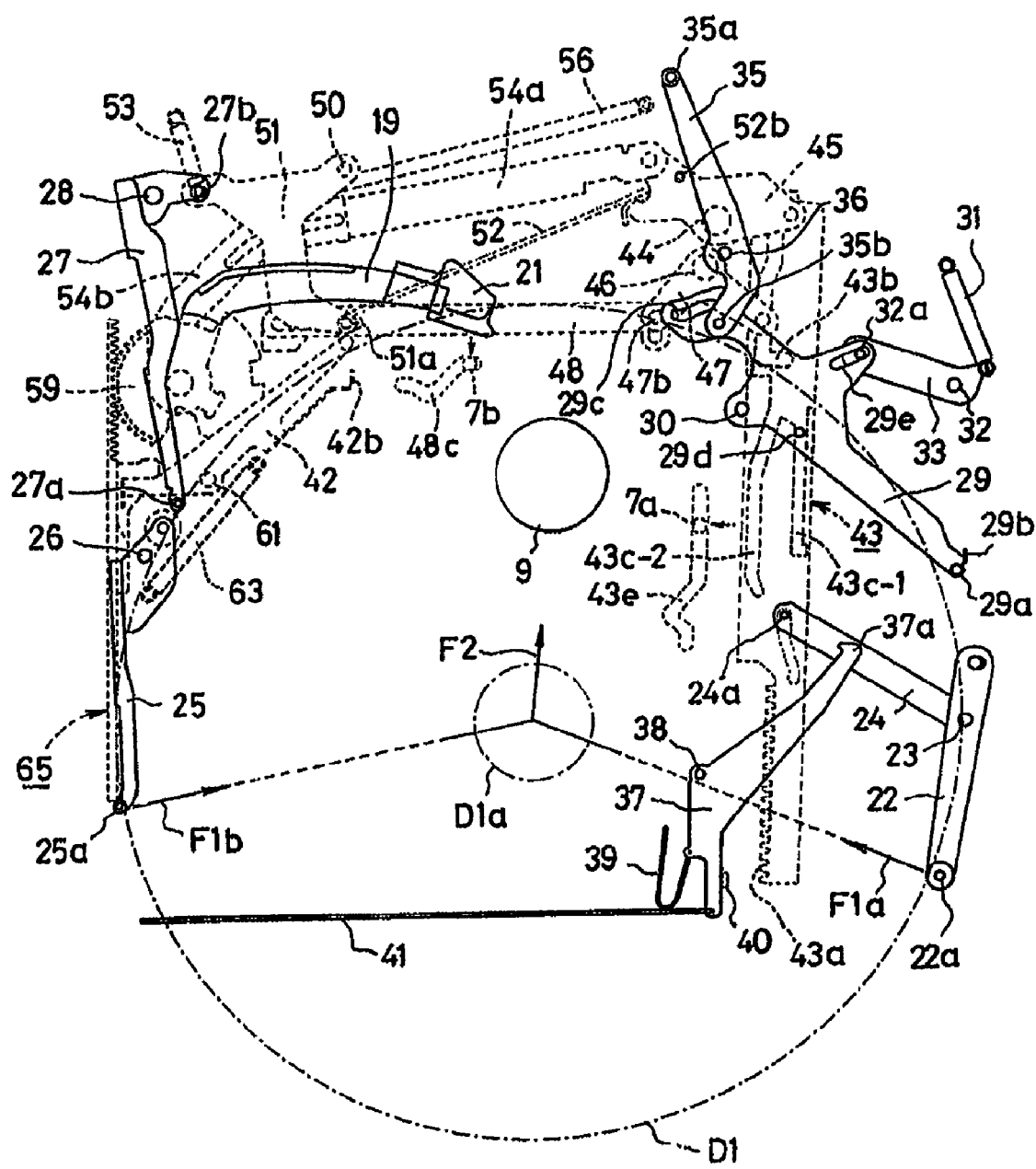
FIG. 12 is a fourth process diagram illustrating in what state the large-diameter disk is conveyed.
Figure 19:
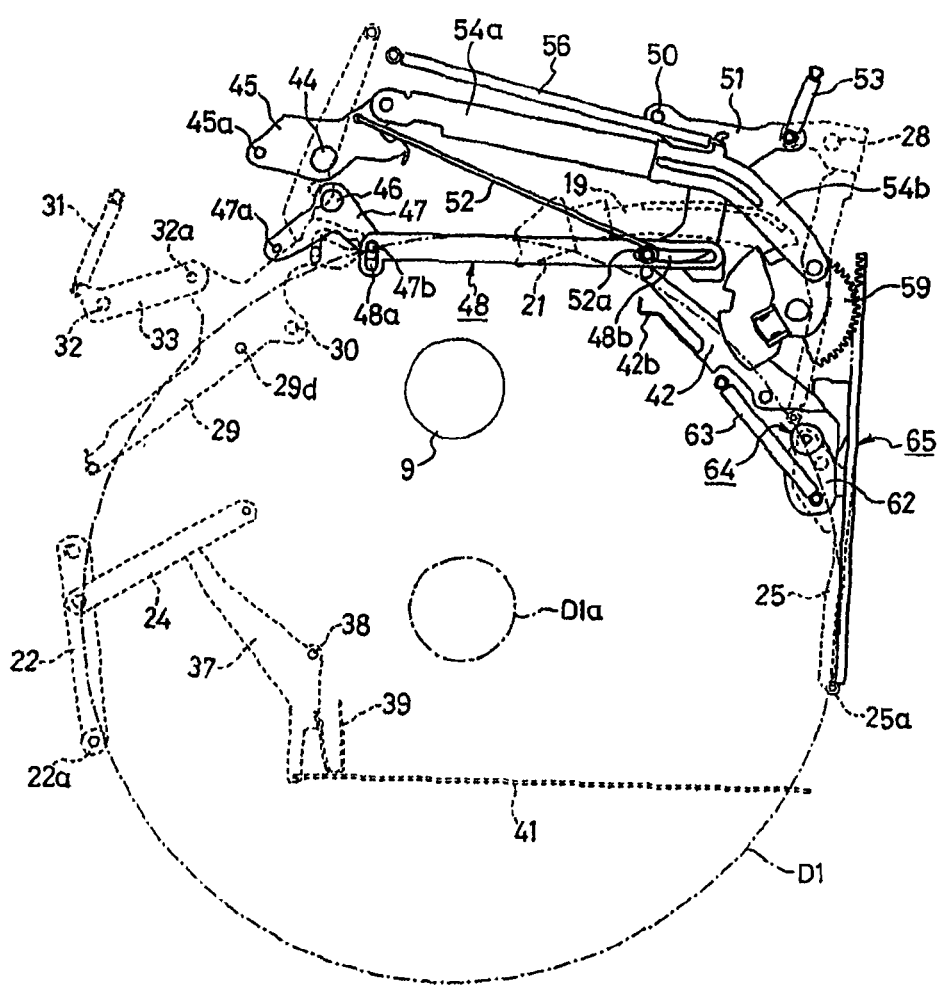
FIG. 19 is a fourth process diagram illustrating in what state the large-diameter disk is conveyed.

FIGS. 12 and 19 show a further inserted state of the large-diameter disk D1 from the above condition by the operator. The gear disc 59 provided at the base portion of the disk supporting arm 19 further rotates, whereby the link arm 54 is pulled, the first pivotable member 45 moves pivotally about the rivet pin 44 and the driven pin 45a moves backward. Consequently, the loading slider 43 which is in an urged state with the driving force of the loading motor 66 with a low voltage current flowing therein also moves backward.

With these operations, the guide arm 29 moves pivotally in the centrifugal direction and the supported state of the large-diameter disk D1 by the support member 29a is released. This results from a condition such that the driven pin 29d of the guide arm 29 positioned on the slant face of the rear end portion of the guide groove 43c-1 in the loading slider 43 undergoes the action of the said slant face with retreat of the loading slider 43 in the state of FIG. 11.

With the foregoing pivotal movement of the first pivotable member 45, the third pivotable member 51 whose pivotal movement is inhibited by the link wire 52 moves pivotally about the rivet pin 50 under the action of the extension spring 53. As a result, the guide arm 27 moves pivotally in the centripetal direction and a rear side portion of the large-diameter disk D1 is supported by the support member 27a provided at the tip of the guide arm 27. At this time, the link lever 24 is pulled with retreat of the loading slider 43, so that the loading arm 22 moves pivotally in the centripetal direction and the loading roller 22a provided at the tip of the loading arm 22 comes into abutment against and supports a front side portion of the large-diameter disk D1. The driven pin 7a of the lift frame 7 is in a state of laterally moving through the lower portion 43e-1 of the cam groove 43e and therefore the lift frame 7 stops at its position shown in FIG. 37(A).

Figure 39:
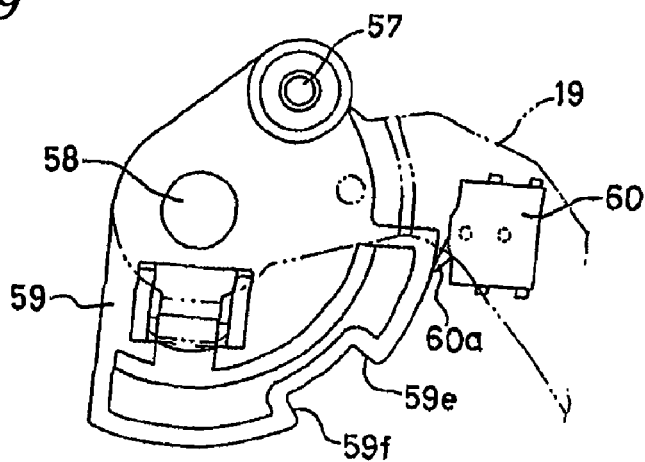
FIG. 39 is a diagram illustrating operation modes of the gear disc.
Figure 39:
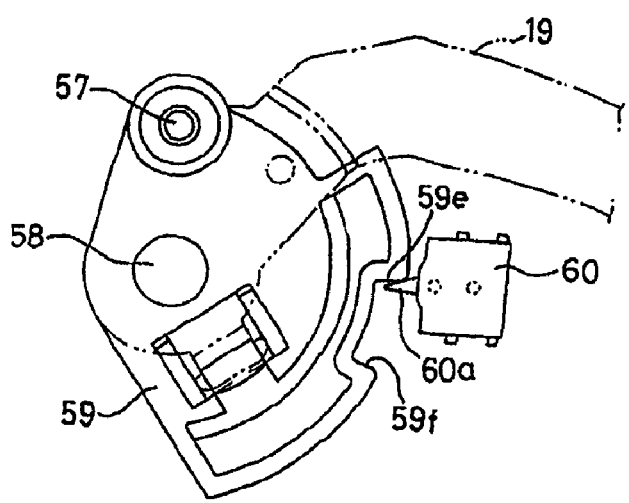
Figure 39:
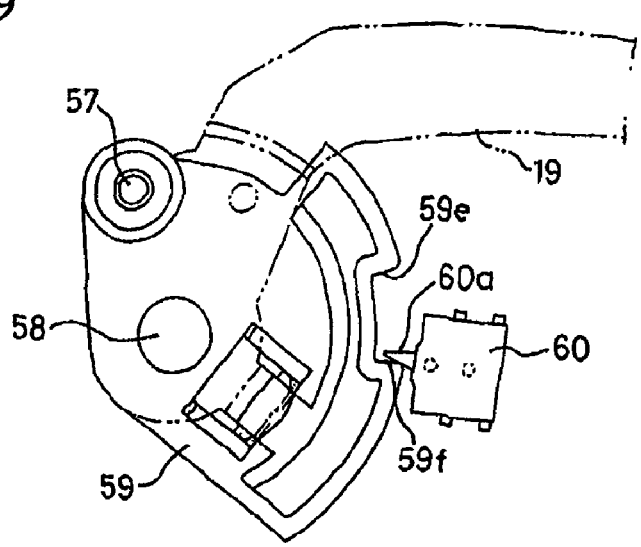
Figure 40:
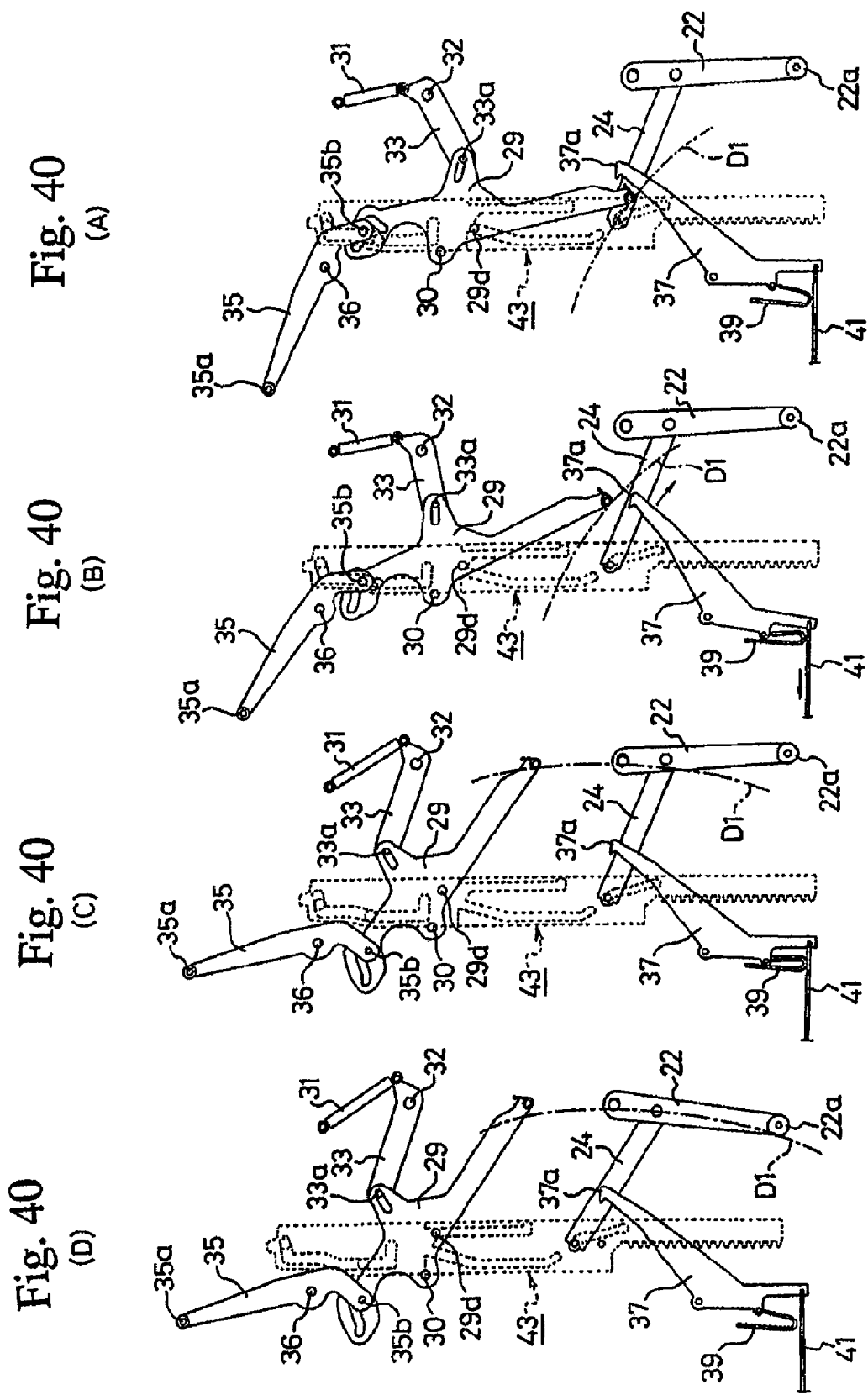
FIG. 40 is a process diagram illustrating operation modes of arms during conveyance of the large-diameter disk.

On the other hand, the gear disc 59 provided at the base portion of the disk supporting arm 19 rotates up to its position shown in FIG. 39(C) and the switch starting stepped portion 59f inverts the switch knob 60a of the limit switch 60. The electric current flowing in the loading motor 66 is switched to a high potential current in accordance with a signal provided at this instant from the limit switch 60 to generate a torque necessary for loading of the large-diameter disk D1. Further, since the component of force F1a induced by pressing of the loading roller 22a and the component of force F1b induced by pressing of the support member 25a of the guide arm 25 become large, there is generated a resultant force F2 acting to propel the disk in the loading direction and an automatic loading by the loading motor 66 is started.

Figure 13:
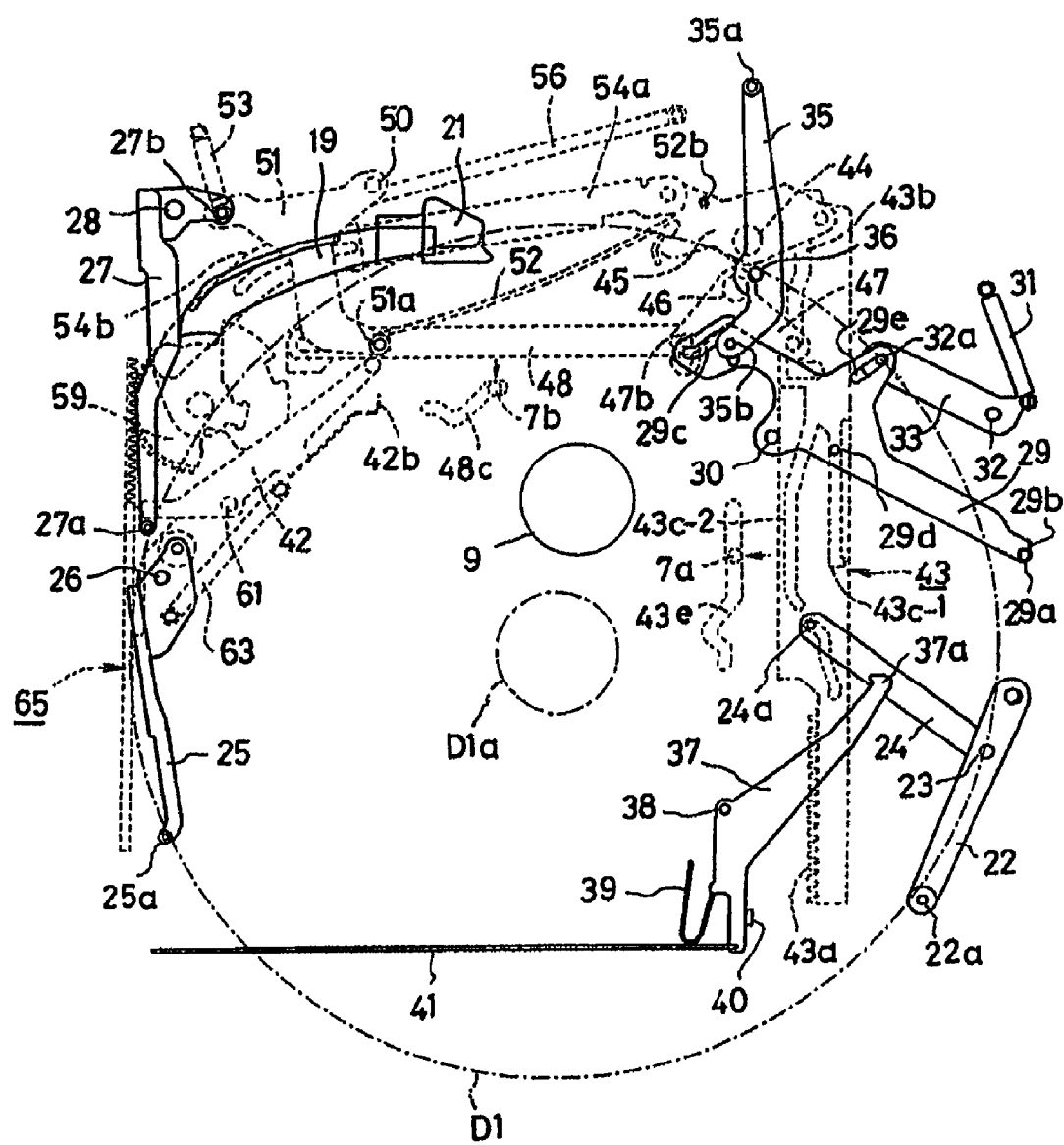
FIG. 13 is a fifth process diagram illustrating in what state the large-diameter disk is conveyed.
Figure 20:
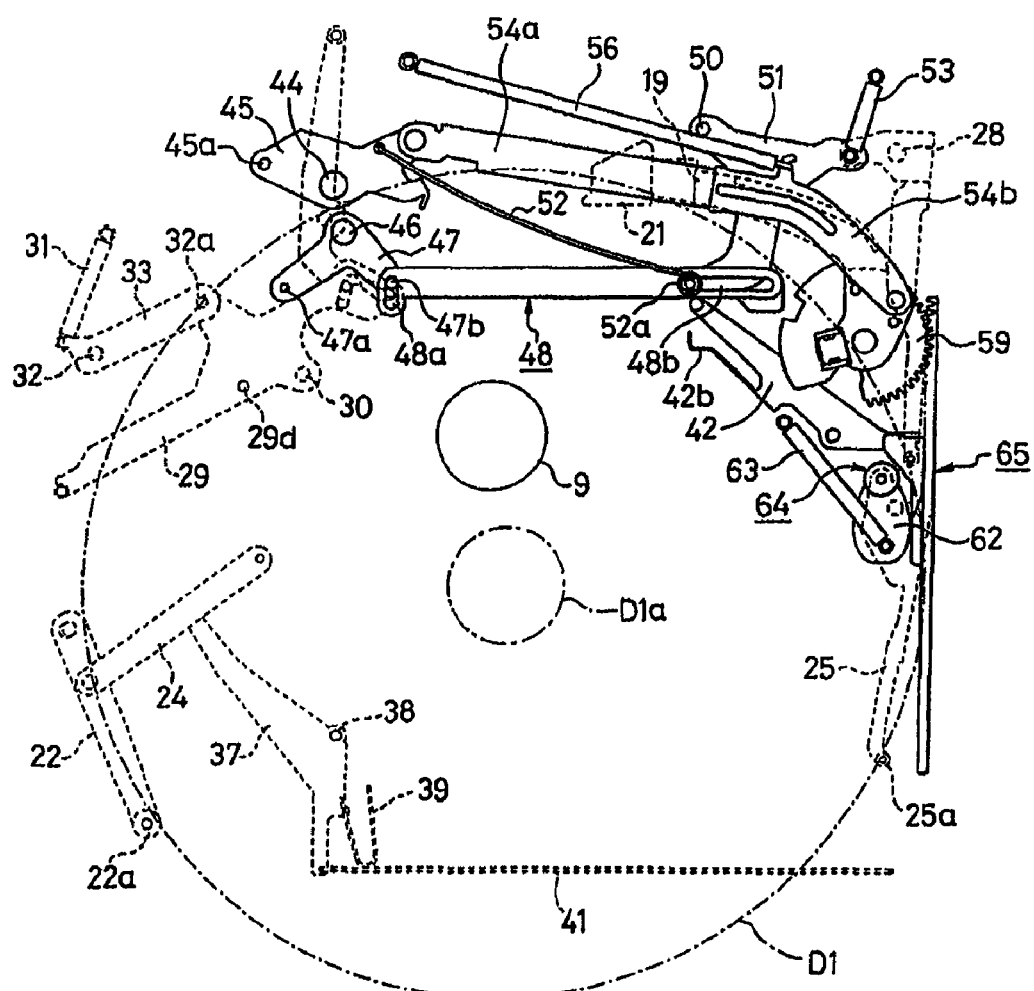
FIG. 20 is a fifth process diagram illustrating in what state the large-diameter disk is conveyed.

FIGS. 13 and 20 show a state in which the automatic loading by the loading motor 66 is started and the large-diameter disk D1 is being loaded. When the loading slider 43 further retreats from the state of FIG. 12, the driven pin 29d of the guide arm 29 enters the guide groove 43c-1 from the slant portion of the loading slider 43. As a result, the guide arm 29 further pivots in the centrifugal direction and the support member 29a provided at the tip of the guide arm 29 assumes a state free of contact with a side portion of the large-diameter disk D1. FIGS. 40(A) to 40(D) show operation modes of the guide arm 29 in a continuous manner.

As the loading slider 43 moves backward, the link lever 24 is pulled to start a pivotal movement in the centripetal direction of the loading arm 22. FIGS. 41(A) to 41(D) show pivoting states of the loading arm 22 in a continuous manner. The state of the loading arm 22 shown in FIG. 12 corresponds to a shifted state to FIG. 41(B) from an initial state of FIG. 41(A).

As noted earlier, the driven pin 24a fixed to the tip of the link lever 24 which causes a pivotal movement of the loading arm 22 is inserted into both guide groove 43d of the loading slider 43 and the guide slit 49a of the guide plate 49, so upon retreat of the loading slider 43, the driven pin 24a is held grippingly between the rear-end slant face of the guide groove 43d and a side wall of the guide slit 49a and therefore retreats as well. Consequently, the link lever 24 is pulled and the loading arm 22 moves pivotally.

When the loading slider 43 retreats up to its position shown in FIG. 13, the upper-end horizontal portion 43b-1 of the guide groove 43b pushes up the driven pin 45a of the first pivotable member 45, causing the first pivotable member 45 to move pivotally about the rivet pin 44 and causing rotation of the gear disc 59 through the link arm 54. As a result, the disk supporting arm 19 moves pivotally in the centrifugal direction, that is, the holder 21 which supports the rear end portion of the large-diameter disk D1 moves backward in synchronism with the loading of the large-diameter disk D1. At this stage, the driven pin 47a of the second pivotable member 47 is sliding along the vertical portion of the guide groove 43b, so that the second pivotable member 47 is at a standstill and so is the driven slider 48.

With the loading of the large-diameter disk D1, the support member 27a provided at the tip of the guide arm 27 which is urged by the extension spring 53 in the course of shift from the state of FIG. 12 to the state of FIG. 13 is pushed back as in FIG. 13 into abutment against the retaining tongue piece 42a of the lever arm 42 and stops. At this time, the third pivotable member 51 slightly moves pivotally and therefore its work pin 51a moves in the centripetal direction through the end through hole 48b of the driven slider 48 which stands still, thus resulting in that the link wire 52 is slightly deflected.

On the other hand, the support member 25a of the guide arm 25 supports a front side portion of the large-diameter disk D1 and the upper guide piece 65c of the rack slider 65 which has advanced with rotation of the gear disc 59 is in a spaced state from the small-diameter portion 64b of the double roller 64. At this time, the driven pin 7a of the lift frame 7 is in a state of laterally moving through the lower portion 43e-1 of the cam groove 43e and the driven slider 48 is at rest, so that the lift frame 7 still stands still at its position shown in FIG. 37(A).

Figure 14:
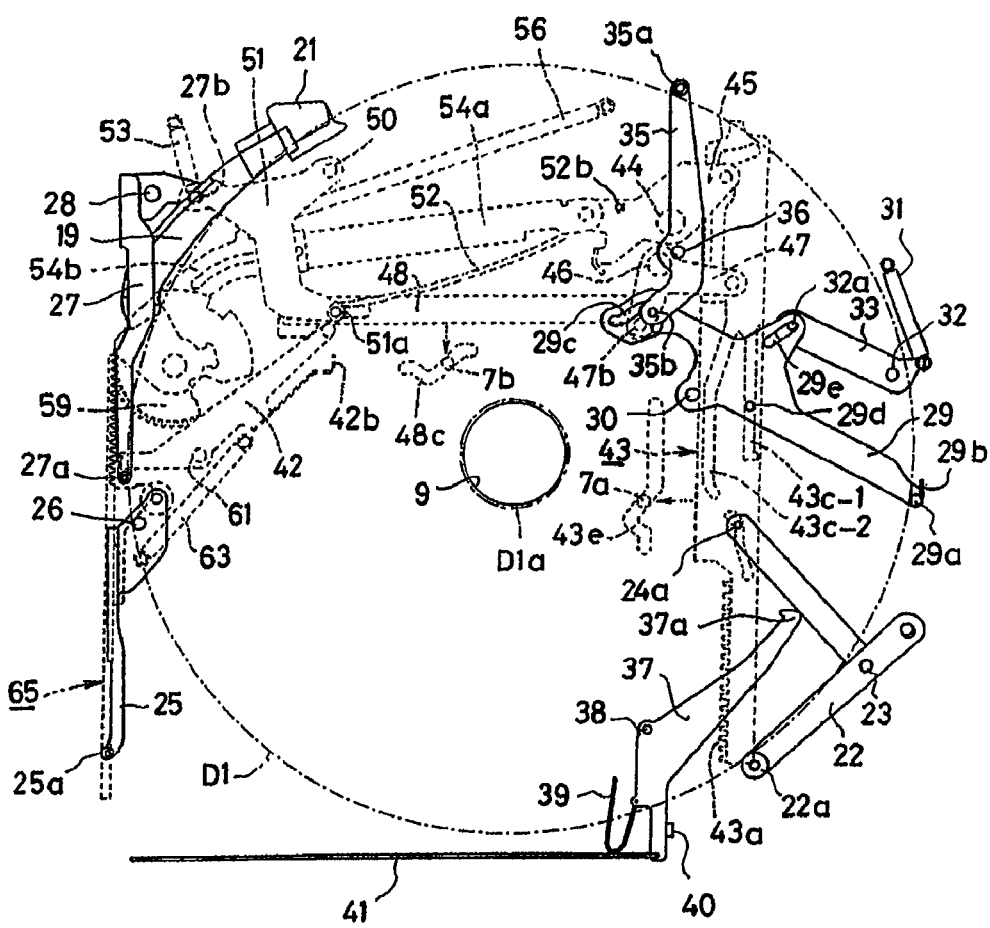
FIG. 14 is a sixth process diagram illustrating in what state the large-diameter disk is conveyed.
Figure 21:
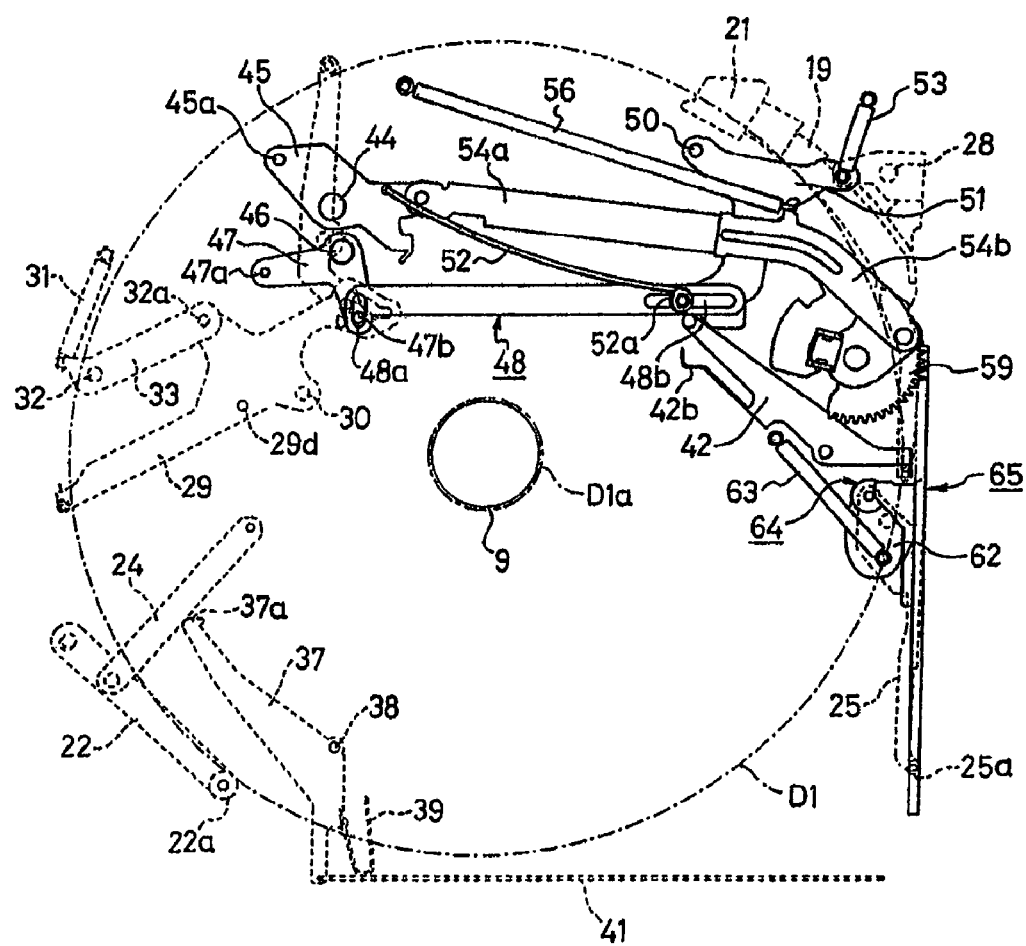
FIG. 21 is a sixth process diagram illustrating in what state the large-diameter disk is conveyed.
Figure 41:
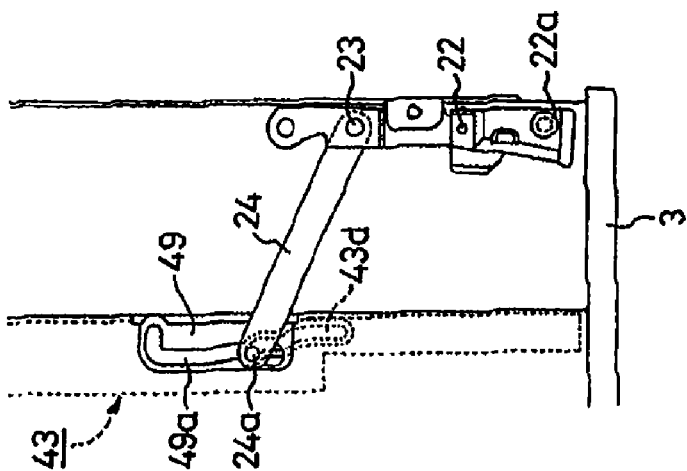
FIG. 41 is a process diagram illustrating operation modes of a loading arm.
Figure 41:
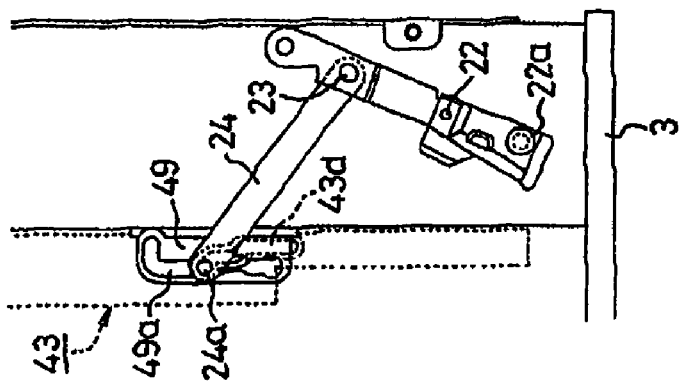
Figure 41:
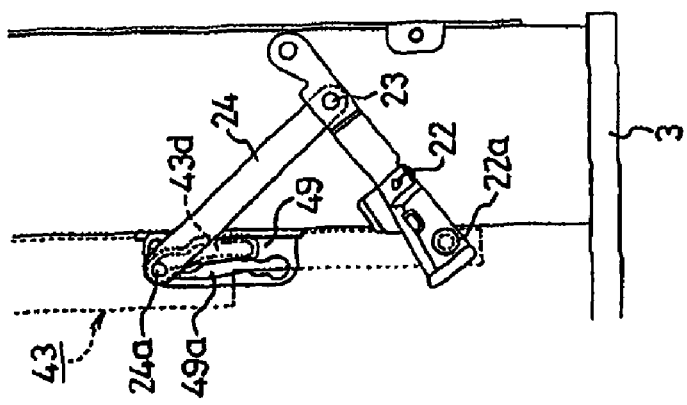
Figure 41:
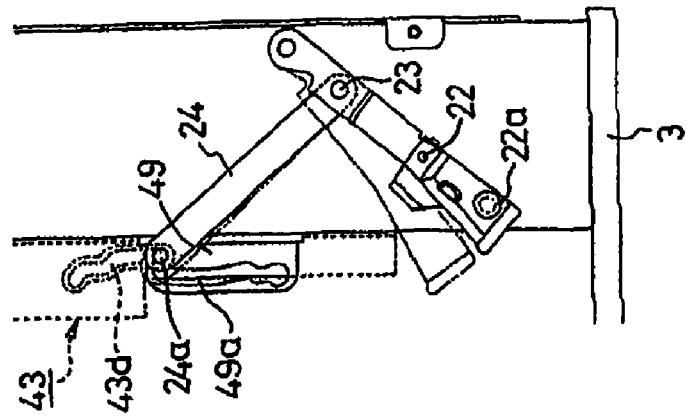
Figure 42:
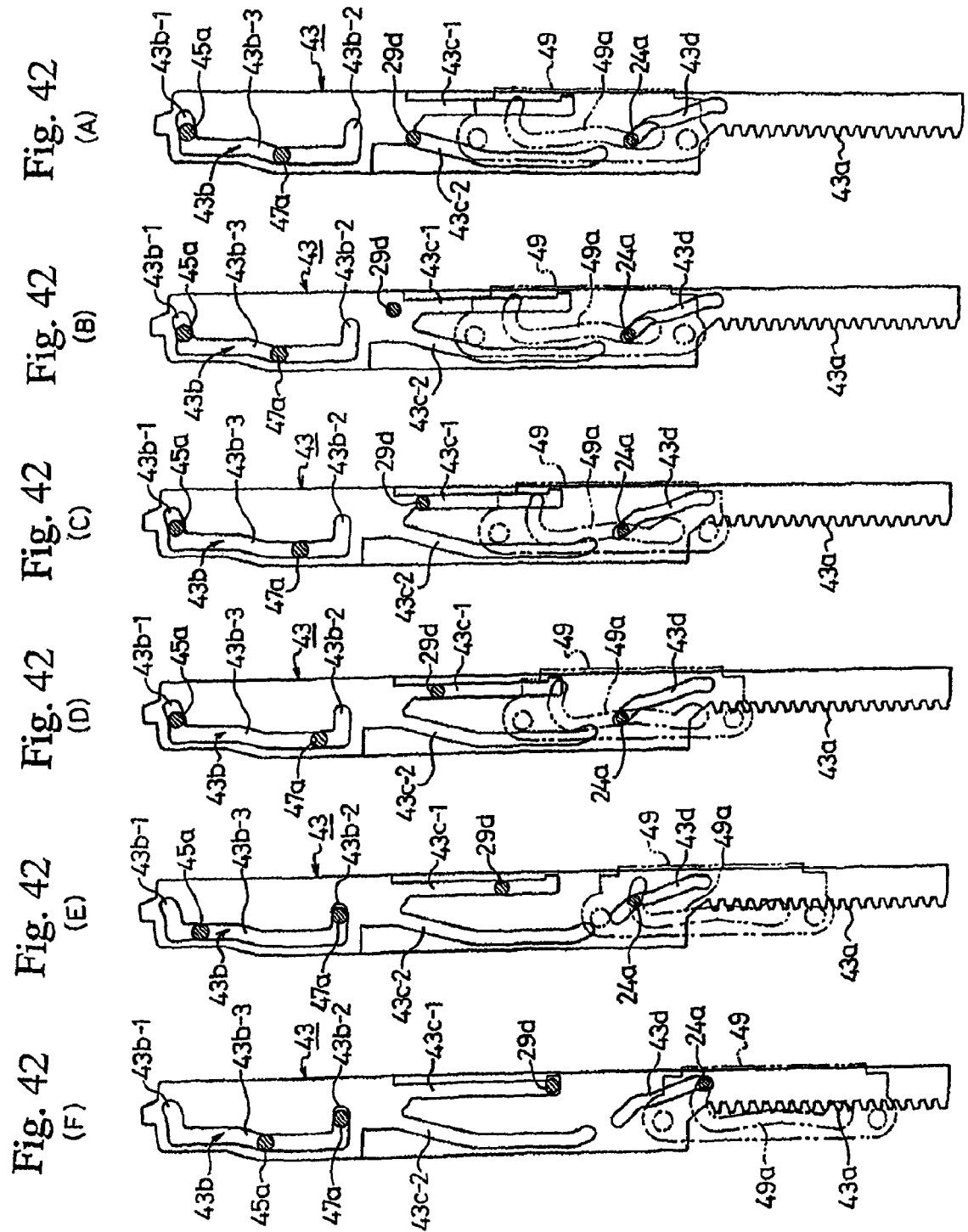
FIG. 42 is a process diagram illustrating operation modes of the loading slider and a driven pin.

FIGS. 14 and 21 show a state in which the loading slider 43 further retreats from its state shown in FIGS. 13 and 20, the link lever 24 is pulled, causing the loading arm 22 to move pivotally up to its position shown in FIG. 41(C), and the center of the center hole D1a of the large-diameter disk D1 which has been loaded and the center of the clamp head 9 are aligned with each other. On the other hand, the driven pin 29d of the guide arm 29 moves straight through the guide groove 43c-1 of the loading slider 43, so that the guide arms 29 and 35 are at rest in their positions shown in FIG. 14. At this time, the support members 29a and 35a catch and position the outer periphery edge of the large-diameter disk D1, whereby the center hole D1a of the large-diameter disk D1 and the clamp head 9 are accurately aligned with each other.

With the retreat of the loading slider 43, the driven pin 45a of the first pivotable member 45 is pushed up to the upper-end horizontal portion 43b-1 and shifts to the vertical portion 43b-3, so that the first pivotable member 45 moves pivotally up to its position shown in the drawings, and the disk supporting arm 19 also pivots in the centrifugal direction with rotation of the gear disc 59 caused by the link arm 54. The rotation of the gear disc 59 causes a further advance of the rack slider 65 and the small-diameter portion 64b of the double roller 64 strikes on the upper guide piece 65c, so that the guide arm 25 largely pivots in the centrifugal direction and the support of the outer periphery edge of the large-diameter disk D1 by the support member 25a is ended. Now, the guide arm 25 is retracted sideways of the lift frame 7 and does not extend over the lift frame 7. Thus, there is no fear of collision between the lift frame 7 which is rising and the guide arm 25.

At this time, the large-diameter disk D1 presses the support member 27a of the guide arm 27, but since the support member 27a is abutted against the retaining tongue piece 42a of the lever arm 42 and a stop position thereof is established, so that the center of the large-diameter disk D1 is aligned with the clamp head 9 in the horizontal direction at this stage. On the other hand, a vertical center of the large-diameter disk D1 relative to the clamp head 9 is established by the holder 21 of the disk supporting arm 19 which stands still in the state shown in FIG. 14 and the loading roller 22a of the loading arm 22.

Thus, according to the disk unit of the present invention, from the time the automatic loading of the large-diameter disk D1 is started until reaching the state of FIG. 14, the large-diameter disk D1 is supported in at least three positions of its outer periphery edge by the foregoing plural arms and is stopped in the position where the disk as loaded into the disk unit can be clamped in its center hole D1a by the clamp head 9.

In the course of shift from FIG. 13 to FIG. 14, the driven pin 7a of the lift frame 7 shifts from the lower portion 43e-1 to the slant portion 43e-2 and rises with retreat of the cam groove 43e of the loading slider 43. On the other hand, the driven pin 47a of the second pivotable member 47 passes the vertical portion 43b-3 of the loading slider 43 and reaches the lower-end horizontal portion 43b-2 and the second pivotable member 47 moves pivotally in the centrifugal direction, so that the work pin 47b causes the driven slider 48 to move horizontally, with a consequent horizontal movement of the cam groove 48c. Accordingly, the driven pin 7b of the lift frame 7 shifts from the lower portion 48c-1 to the slant portion 48c-2 and rises and the lift frame 7 starts to rise as shown in FIG. 37(B).

Figure 15:
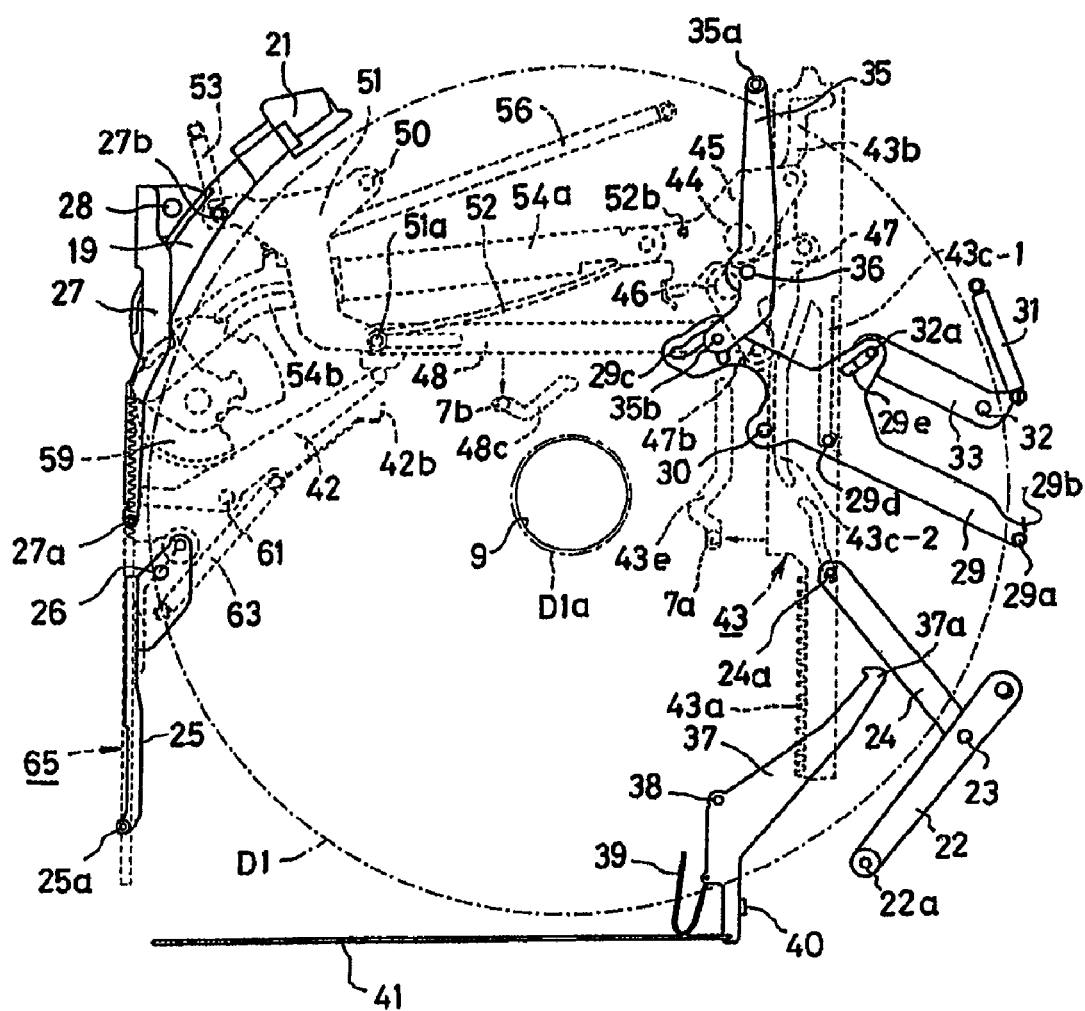
FIG. 15 is a seventh process diagram illustrating in what state the large-diameter disk is conveyed.
Figure 22:
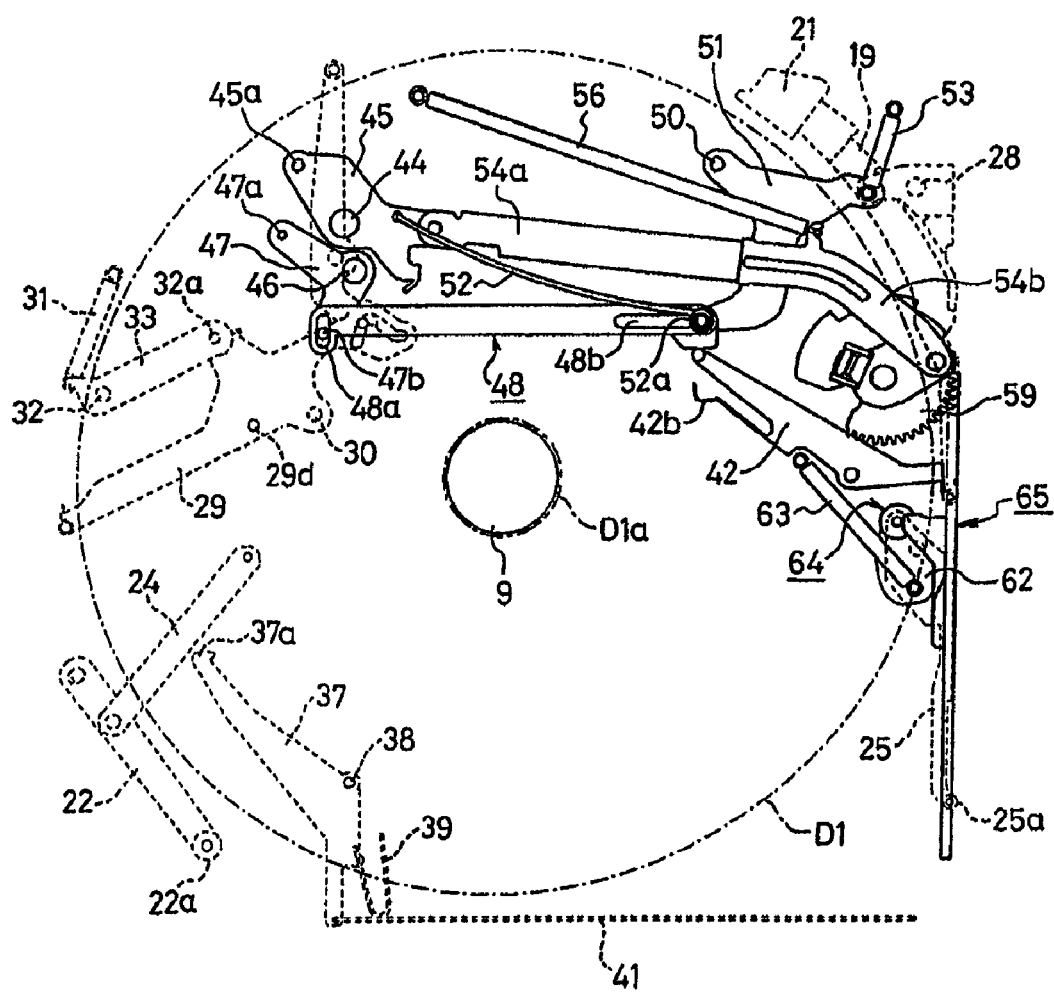
FIG. 22 is a seventh process diagram illustrating in what state the large-diameter disk is conveyed.

FIGS. 15 and 22 show a final state in which the clamp head 9 clamps the center hole D1a of the large-diameter disk D1, thereby permitting drive of the large-diameter disk D1. For reaching this state it is necessary that the loading arm 22 and the guide arm 27 pivot slightly in the centrifugal direction to terminate the support of the large-diameter disk D1 so as not to be an obstacle to rotation of the disk.

More particularly, at a further retreated and stopped position of the loading slider 43 from the state of FIG. 14, the driven pin 24a of the link lever 24 is pushed into a lateral groove in a rear end of the guide slit 49a at a vertical offset portion of the rear portion of the guide groove 43d, so that, as shown in FIG. 41(D), the link lever 24 returns slightly in the direction opposite to the pulling direction and the loading arm 22 pivots slightly in the centrifugal direction to terminate the support of the outer periphery edge of the large-diameter disk D1 by the loading roller 22a.

At the same time, the driven pin 45a of the first pivotable member 45 is slightly pivoted by a slant portion formed at a middle position of the vertical portion 43b-3 of the guide groove 43b and this pivotal motion is transmitted to the gear disc 59 through the link arm 54. As a result, the disk supporting arm 19 pivots slightly in the centrifugal direction to terminate the support of the outer periphery edge of the large-diameter disk D1 by the disk supporting arm 19.

On the other hand, the driven pin 47a of the second pivotable member 47 is pushed up largely in the lower-end horizontal portion 43b-2 of the guide groove 43b in the loading slider 43, whereby the work pin 47b pivots in the centrifugal direction, causing the driven slider 48 to move horizontally, and the end through hole 48b pulls the work pin 51a of the third pivotable member 51. As a result, the third pivotable member 51 pivots slightly and at the same time the work piece 48d pushes up the roller 42c of the lever arm 42, whereby the retaining tongue piece 42a of the lever arm 42 against which the support member 27a of the guide arm 27 is abutted moves backward. Consequently, the guide arm 27 pivots slightly in the centrifugal direction to terminate the support of the outer periphery edge of the large-diameter disk D1 by the guide arm 27.

At this time, an end portion of the guide groove 43c-1 of the loading slider 43 pushes the driven pin 29d of the guide arm 29, whereby the guide arm 29 pivots slightly. As a result, the support member 29a of the guide arm 29 pivots in the centrifugal direction to complete positioning of the outer periphery edge of the large-diameter disk D1. Further, the guide arm 35 connected through the driven pin 35b to the guide groove 29c of the guide arm 29 pivots slightly, whereby the support member 35a also pivots in the centrifugal direction to complete positioning of the outer periphery edge of the large-diameter disk D1.

In the course of shift from FIG. 14 to FIG. 15, the driven slider 48 moves horizontally in synchronism with retreat of the loading slider 43, but the driven pin 7a of the lift frame 7 shifts from the slant portion 43e-2 of the cam groove 43e in the loading slider 43 to the higher portion 43e-3 and the driven pin 7b shifts from the slant portion 48c-2 of the cam groove 48c in the driven slider 48 to the higher portion 48c-3.

In this process the lift frame 7 behaves as follows. The lift frame 7 rises by the driven pins 7a and 7b which rise along the slant portions 43e-2 and 48c-2, the chucking pawl 9a of the clamp head 9 comes into abutment against the center hole D1a of the large-diameter disk D1 and pushes up the large-diameter disk D1, as shown in FIG. 37(C), and the peripheral edge of the center hole D1a comes into abutment against the protuberance 2b of the chassis case 2.

When the driven pins 7a and 7b reach the tops of the slant portions 43e-2 and 48c-2 from the above state, the clamp head 9 is fitted in the center hole D1a of the large-diameter disk D1 to complete clamping by the chucking pawl 9a, as shown in FIG. 37(D), whereby the large-diameter disk D1 is fixed onto the turntable 10. Then, the driven pins 7a and 7b shift to the higher portions 43e-3 and 48c-3, whereby the lift frame 7 descends to its position shown in FIG. 37(E), thus permitting drive of the large-diameter disk D1.

Figure 38:
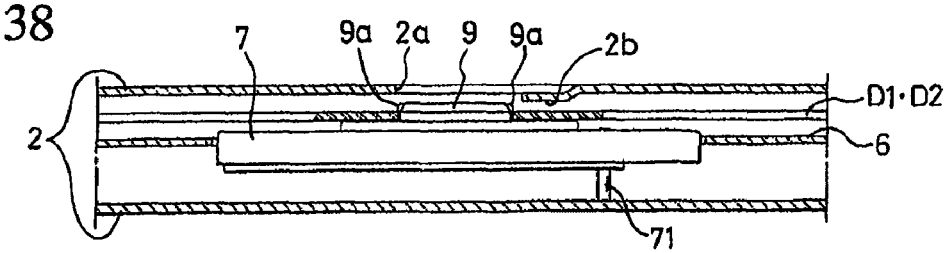
FIG. 38 is a process diagram illustrating a descending process of the lift frame.
Figure 38:
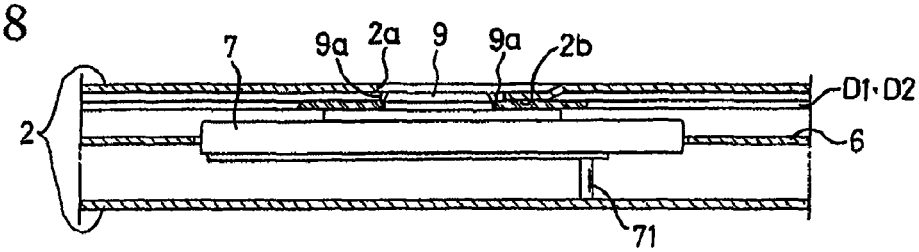
Figure 38:
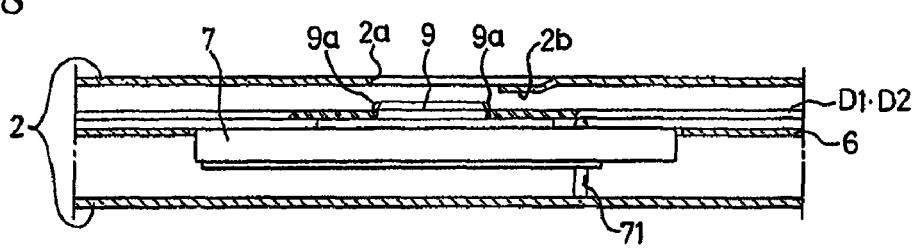
Figure 38:
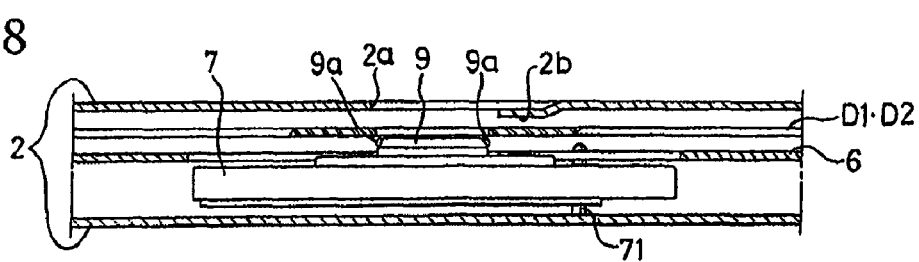
Figure 38:
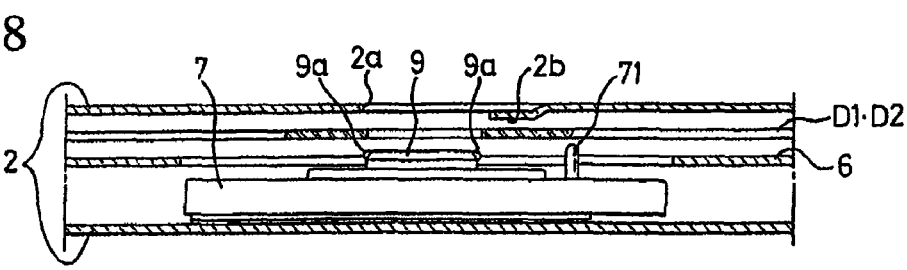

Operation modes of various mechanisms during loading of the large-diameter disk D1 by the disk unit 1 of the present invention have been described above, but, during unloading, the mechanisms operate in accordance with a sequence reverse to the above loading sequence with advance of the loading slider 43. That is, when unloading of the large-diameter disk D1 is started and the loading slider 43 starts to advance, the lift frame 7 once rises and then descends to its initial position, as shown in FIGS. 38(A) to 38(E). In the meantime, the large-diameter disk D1 is stuck up by a clamp release pin 71 as shown in FIG. 38(C), whereby the clamped state by the clamp head 9 is released.

In the above process up to release of the clamp of the large-diameter disk D1, the disk supporting arm 19, loading arm 22 and guide arm 27 start moving pivotally in the centripetal direction to support the outer periphery edge of the large-diameter disk D1 as shown in FIG. 14. Subsequently, the large-diameter disk D1 is unloaded with the pivoting force in the centripetal direction of the disk supporting arm 19 and is stopped in a state in which its front end portion is exposed from the slot 3a of the bezel 3.

Operation modes of the driven pins 24a, 29d, 45a and 47a with retreat of the loading slider 43 are shown in a continuous manner in FIGS. 42(A) to 42(F).

Next, operation modes in case of conveying the small-diameter disk D2 by the disk unit of the present invention will be described with reference to plan views of FIGS. 23 to 29 and bottom views of FIGS. 30 to 36. Properly speaking, the cam grooves 43e, 48c and the driven pins 7a, 7b do not appear in FIGS. 23 to 29, but they are illustrated therein for the convenience of explanation and for easier understanding.

Figure 23:
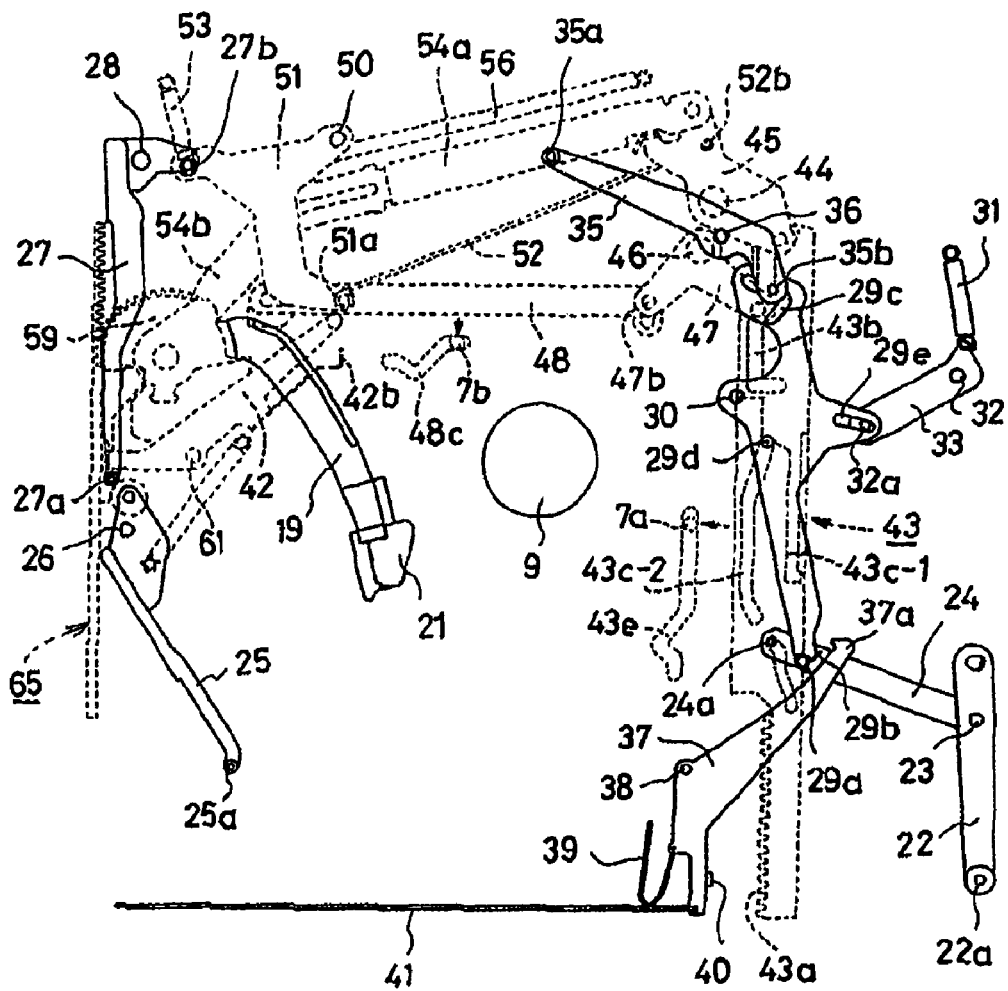
FIG. 23 is a first process diagram illustrating in what state a small-diameter disk is conveyed.
Figure 30:
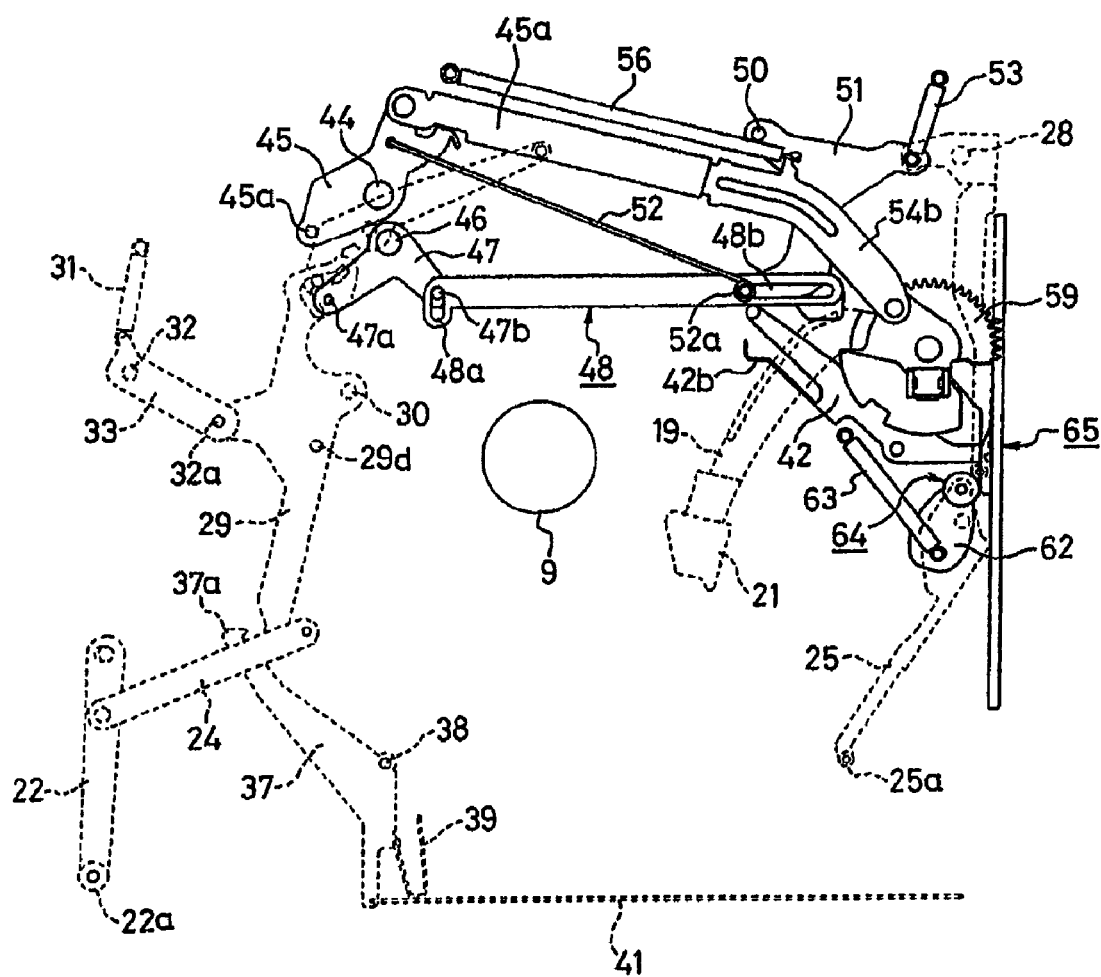
FIG. 30 is a first process diagram illustrating in what state the small-diameter disk is conveyed.

FIGS. 23 and 30 show a state in which the disk unit is waiting for insertion therein of the small-diameter disk D2 from the slot 3a of the bezel 3, with the arms being at rest in their initial states. At this time, the large-diameter portion 64a of the roller 64 of the roller supporting plate 62 fixed to the pivot pin 26 on the back side of the base panel 6 is in abutment against the lower guide piece 65b of the rack slider 65 as shown in FIGS. 8 and 30 and the guide arm 25 is at rest in a position pivoted in the centrifugal direction by a predetermined amount from the position most pivoted in the centripetal direction.

This is for the following reason. According to a construction wherein the guide arm 25 stops at the most pivoted position in the central direction and waits for insertion of the disk, when the small-diameter disk D2 is inserted near the left side of the disk unit, the small-diameter disk D2 enters the left side of the support member 25a, making the conveyance of the small-diameter disk D2 impossible. To prevent the occurrence of this inconvenience, the guide arm 25 is stopped at a position pivoted in the centrifugal direction by a predetermined amount from the most pivoted position in the centripetal direction and is allowed to wait for insertion of the disk. The state of waiting for insertion of the small-diameter disk D2 shown in FIGS. 23 and 30 is coincident with the state of waiting for insertion of the large-diameter disk D1 shown in FIGS. 9 and 16.

Since the base end portion of the guide arm 27 is urged by the extension spring 53, a force acting to pivot the tip support member 27a in the centripetal direction is always exerted on the guide arm 27, but the third pivotable member 51 connected to the pivot pin 27b is at rest in its predetermined position and the guide arm 27 stands still in its state shown in FIG. 23. This is because the link wire 52 stretched between the first pivotable member 45 which is at a standstill and the work pin 51a of the third pivotable member 51 functions as a stopper to inhibit a pivotal motion of the third pivotable member 51.

Likewise, the disk supporting arm 19, the guide arms 29, 35 and the loading arm 22 are also at rest in their states shown in FIG. 23. The driven pin 7a of the lift frame 7 which is guided by the cam groove 43e of the loading slider 43 lies in the lower portion 43e-1 of the cam groove 43e, while the driven pin 7b of the lift frame 7 which is guided by the cam groove 48c of the driven slider 48 lies in the lower portion 48c-1 of the cam groove 48c, so that the lift frame 7 is in its most descended state as shown in FIG. 37(A).

Figure 24:
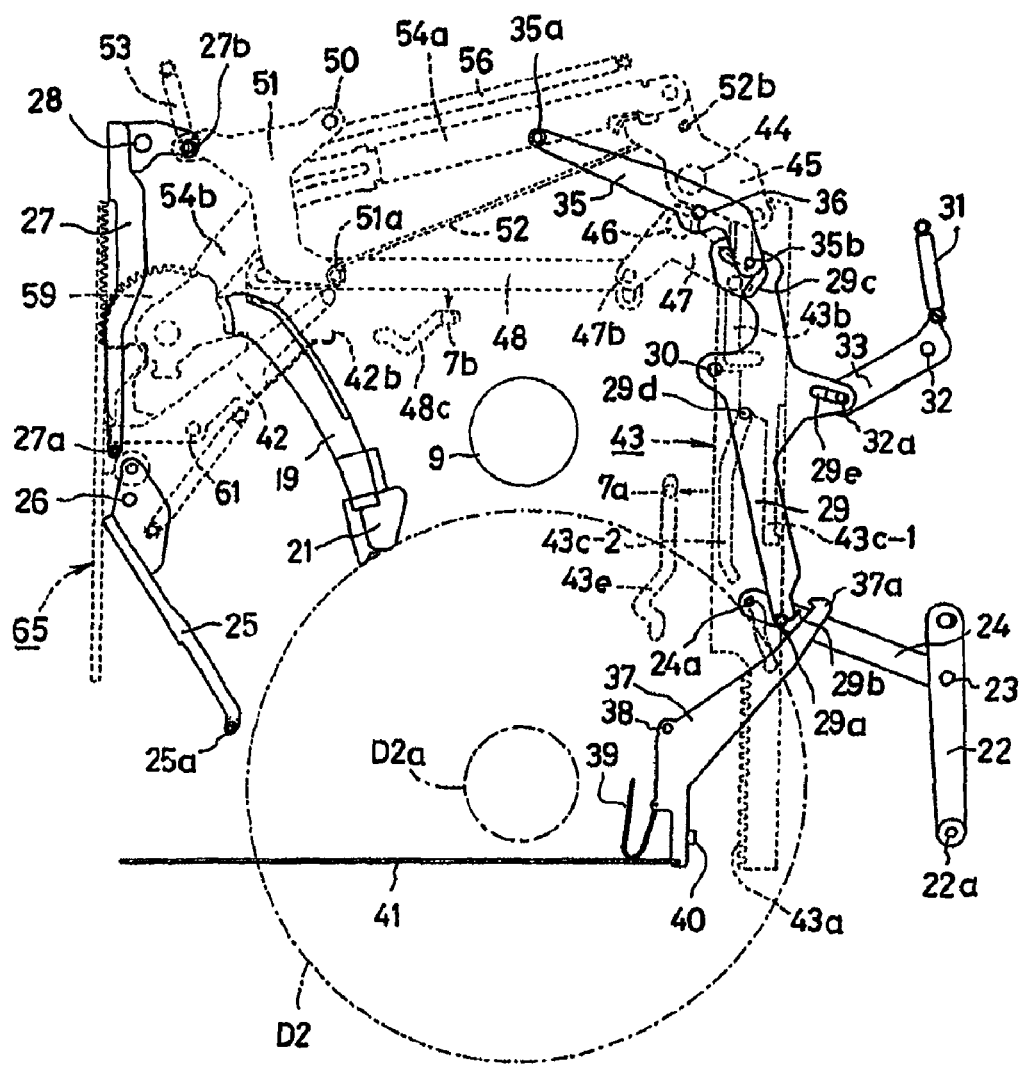
FIG. 24 is a second process diagram illustrating in what state the small-diameter disk is conveyed.
Figure 31:
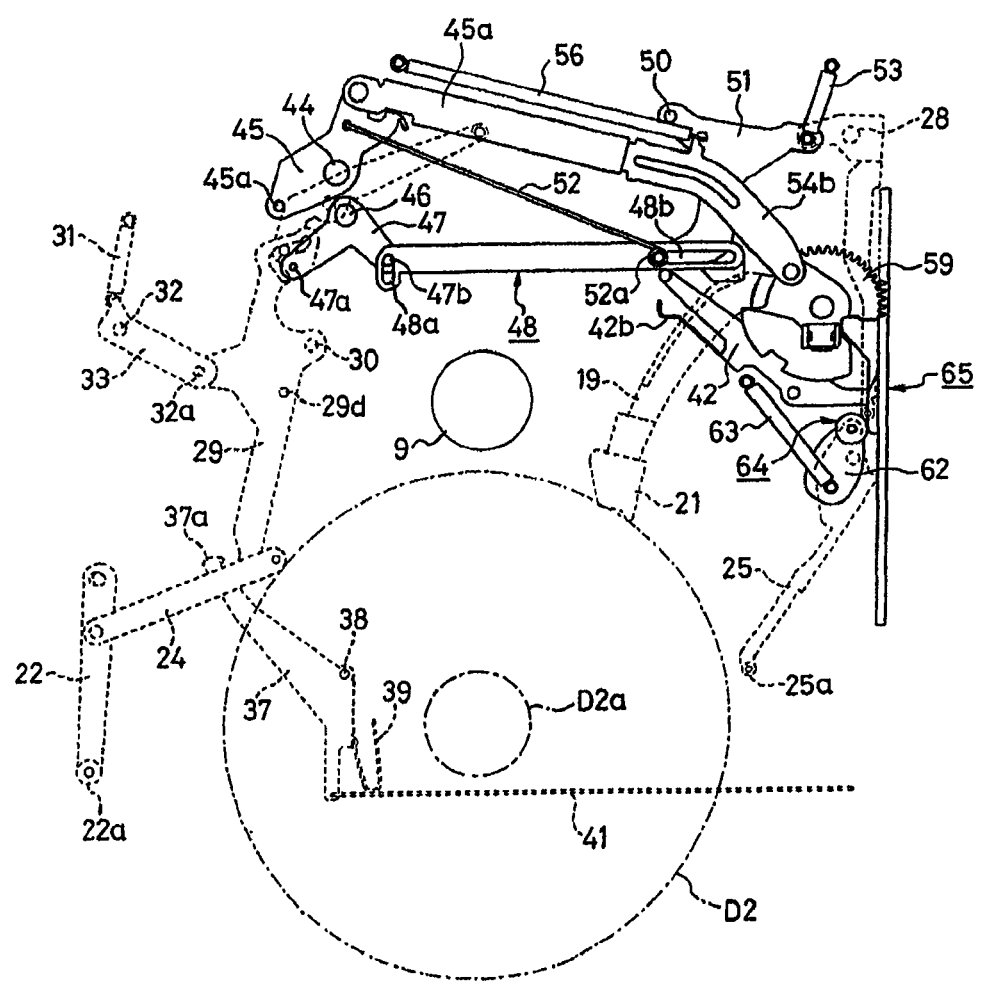
FIG. 31 is a second process diagram illustrating in what state the small-diameter disk is conveyed.

FIGS. 24 and 31 show a state in which the small-diameter disk D2 is inserted from the slot 3a of the bezel 3 by the operator and the front end side of the small-diameter disk D2 is abutted against the holder 21 of the disk supporting arm 19. In the insertion of the small-diameter disk D2 into the slot 3a at this stage, if the small-diameter disk D2 is offset to the left in FIG. 24, the left side portion of the front end of the small-diameter disk D2 contacts the support member 25a of the guide arm 25 and is pushed back, whereby it is possible to prevent dislodgment of the small-diameter disk D2 from the conveyance path.

Figure 43:
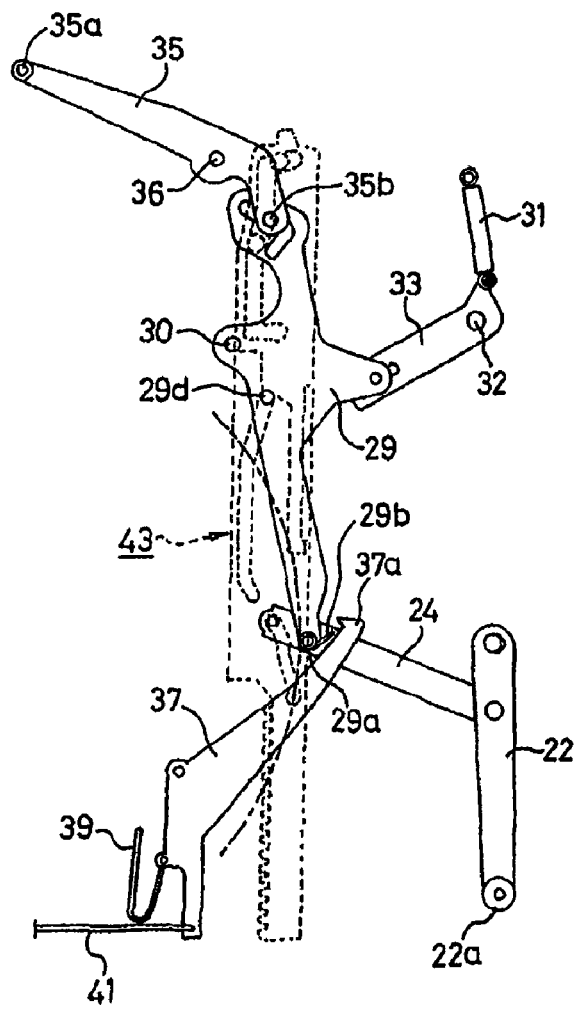
FIG. 43 is a process diagram showing in what state a lock lever functions.
Figure 43:
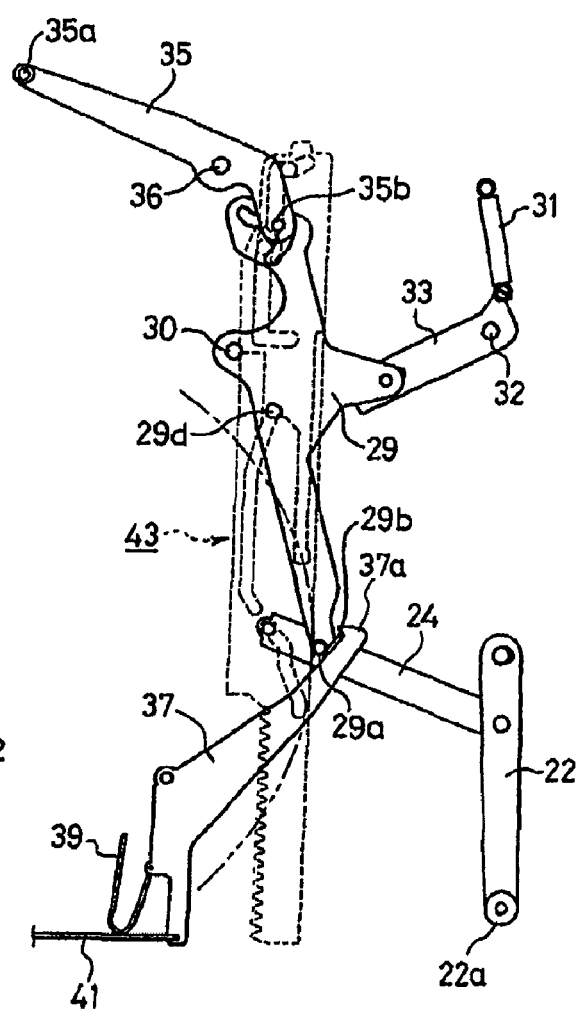

In the inserting operation of the small-diameter disk D2, if the right side portion of the front end of the small-diameter disk D2 presses the support member 29a of the guide arm 29 and causes the support member to pivot in the centrifugal direction as shown in FIG. 43(A), the tongue piece 29b is locked by the angle 37a of the lock lever 37 which is at rest in its predetermined position without pivoting as in FIG. 43(B). Therefore, also in this case it is possible to prevent dislodgment of the small-diameter disk D2 from the conveyance path. That is, the small-diameter disk D2 is guided to the center of the disk unit by both support member 25a of the guide arm 25 and support member 29a of the guide arm 29.

Figure 25:
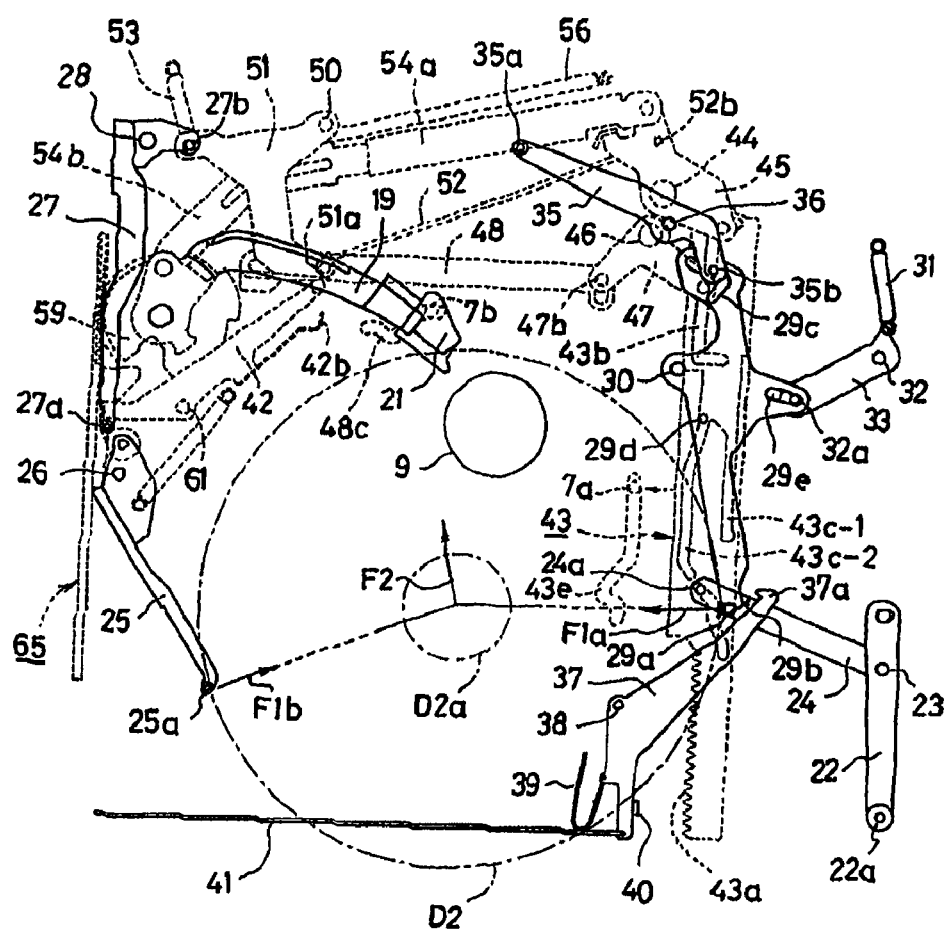
FIG. 25 is a third process diagram illustrating in what state the small-diameter disk is conveyed.
Figure 32:
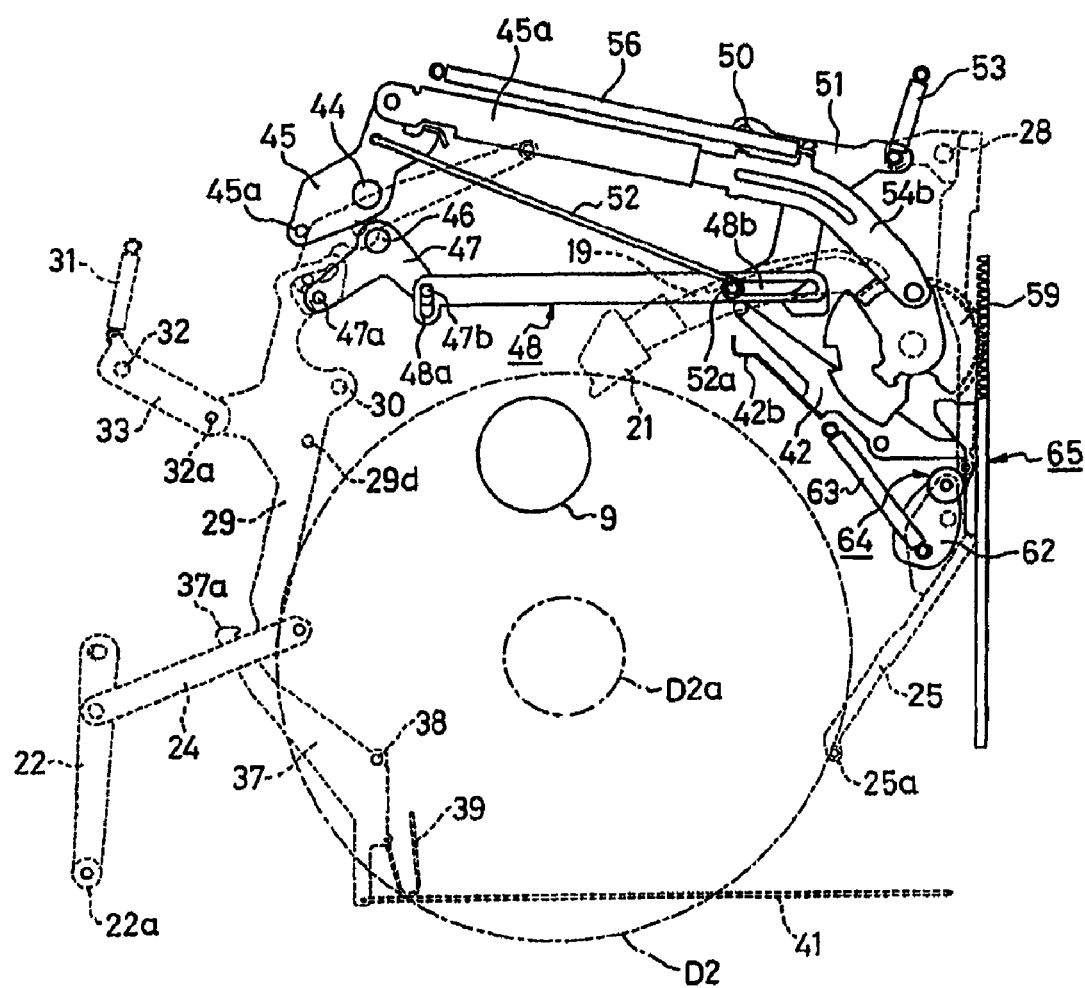
FIG. 32 is a third process diagram illustrating in what state the small-diameter disk is conveyed.

FIGS. 25 and 32 show a further inserted state of the small-diameter disk D2 from the above condition by the operator. The disk supporting arm 19 is pressed by the small-diameter disk D2 and pivots in the centrifugal direction, further, the support member 25a of the guide arm 25 which is interlocked with the pivotal movement of the disk supporting arm 19 and the support member 29a of the guide arm 29 come into contact with a side portion of the small-diameter disk D2. As a result, the small-diameter disk D2 assumes a three-point supported state by the support members 25a, 29a and the holder 21 of the disk supporting arm 19.

The base portion of the disk supporting arm 19 rotates about the rivet pin 20 from the position shown in FIG. 39(A) to the position shown in FIG. 39(B) and the limit switch 60 is actuated by the switch starting stepped portion 59e of the gear disc 59. An electric current of a low voltage flows in the loading motor 66 in accordance with a signal provided from the limit switch 60 thus actuated by the switch starting stepped portion 59e. At this time, the component of force F1a induced by pressing of the support member 29a of the guide arm 29 and the component of force F1b induced by pressing of the support member 25a of the guide arm 25 under the action of the extension spring 63 are strongly exerted on the disk, so that there occurs a resultant force F2 of propelling the small-diameter disk D2 in the loading direction, whereby an automatic loading is started by the loading motor 66.

Figure 26:
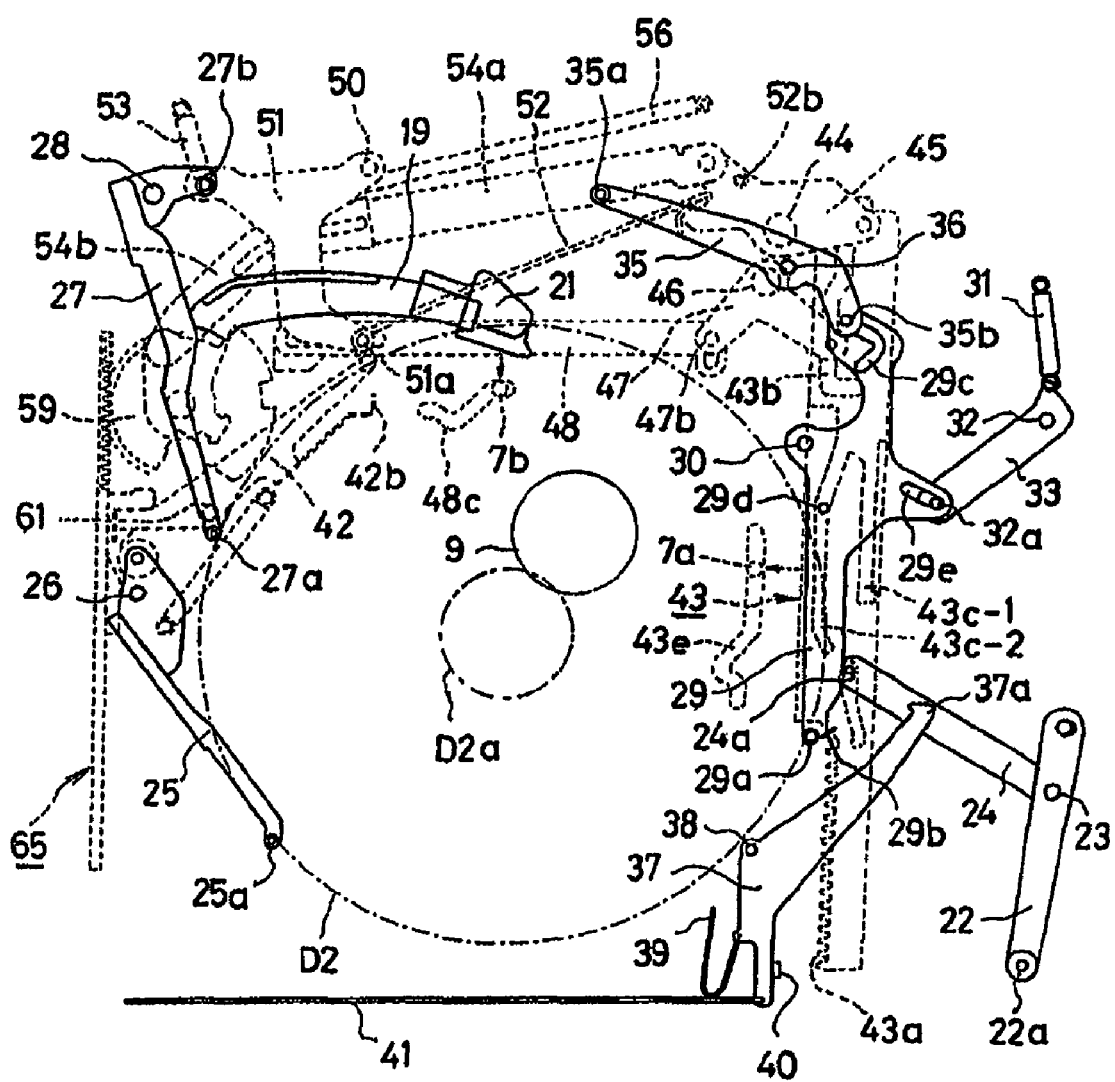
FIG. 26 is a fourth process diagram illustrating in what state the small-diameter disk is conveyed.
Figure 33:
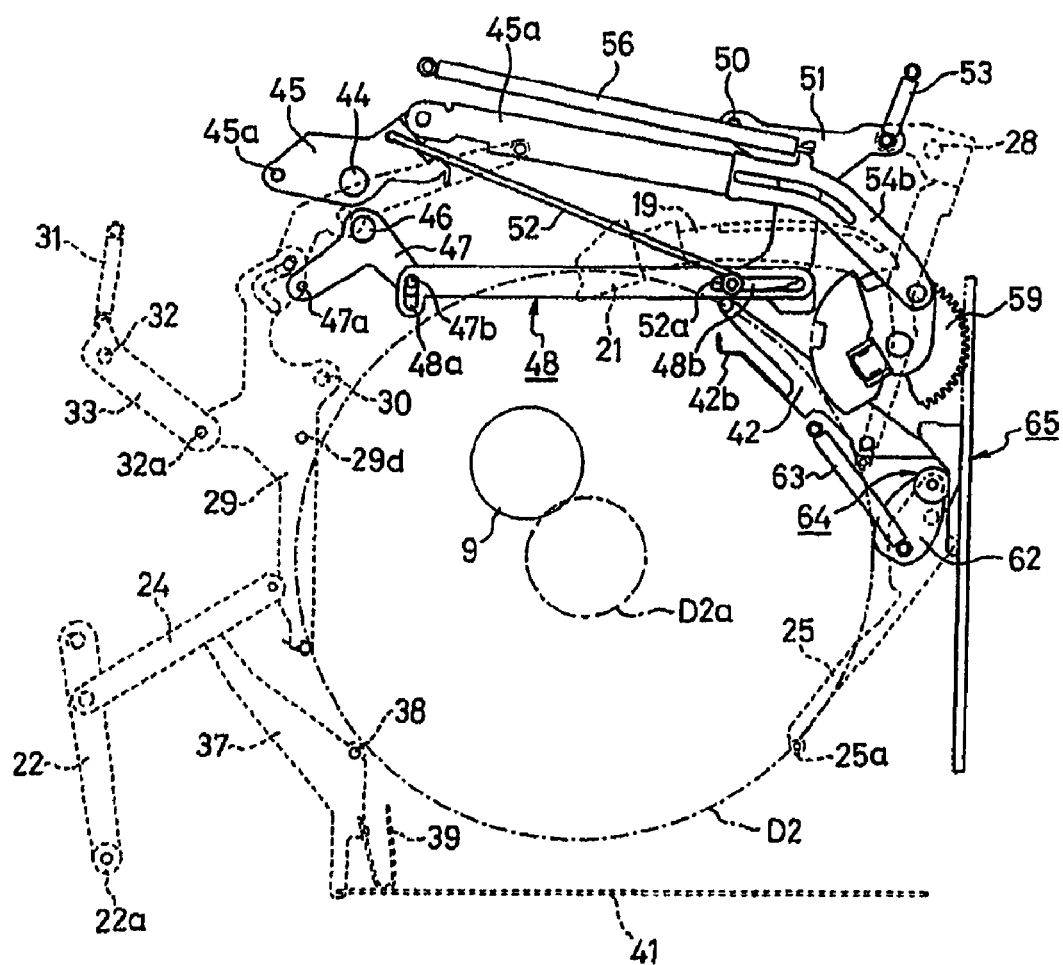
FIG. 33 is a fourth process diagram illustrating in what state the small-diameter disk is conveyed.

FIGS. 26 and 33 show a state in which the automatic loading is started by the loading motor 66 and the small-diameter disk D2 has been loaded. When the loading slider 43 further retreats from the state shown in FIG. 25, the driven pin 29d of the guide arm 29 enters the guide groove 43c-2 of the loading slider 43. At this time, the support member 29d is guided by the slant portion of the guide groove 43c-2 and moves a distance corresponding to the slant distance and the support member 29a pivots up to its illustrated position under loading of the small-diameter disk D2. At this time, under the action of the extension spring 63 the guide arm 25 also pivots to its illustrated position while the small-diameter disk D2 is being loaded.

When the loading slider 43 retreats up to its position shown in FIG. 26, the upper-end horizontal portion 43b-1 of the guide groove 43b pushes up the driven pin 45a of the first pivotable member 45, causing the first pivotable member 45 to pivot about the rivet pin 44 and thereby causing the gear disc 59 to rotate through the link arm 54. As a result, the disk supporting arm 19 pivots in the centrifugal direction, that is, the holder 21 which supports the rear end portion of the small-diameter disk D2 retreats in synchronism with loading of the small-diameter disk D2. At this stage, the driven pin 47a of the second pivotable member 47 is sliding along the vertical portion of the guide groove 43b, so that the second pivotable member 47 stands still and so does the driven slider 48.

Thus, with the pivotal movement of the first pivotable member 45, the third pivotable arm 51 also pivots under the action of the extension spring 53, so that the guide arm 27 pivots about the rivet pin 28 and its support member 27a comes into abutment against the small-diameter disk D2. At this time, the driven pin 7a of the lift frame 7 is moving laterally through the lower portion 43e-1 of the cam groove 43e and the driven slider 48 is at rest, so that the lift frame 7 remains in its position shown in FIG. 37(A).

Figure 27:
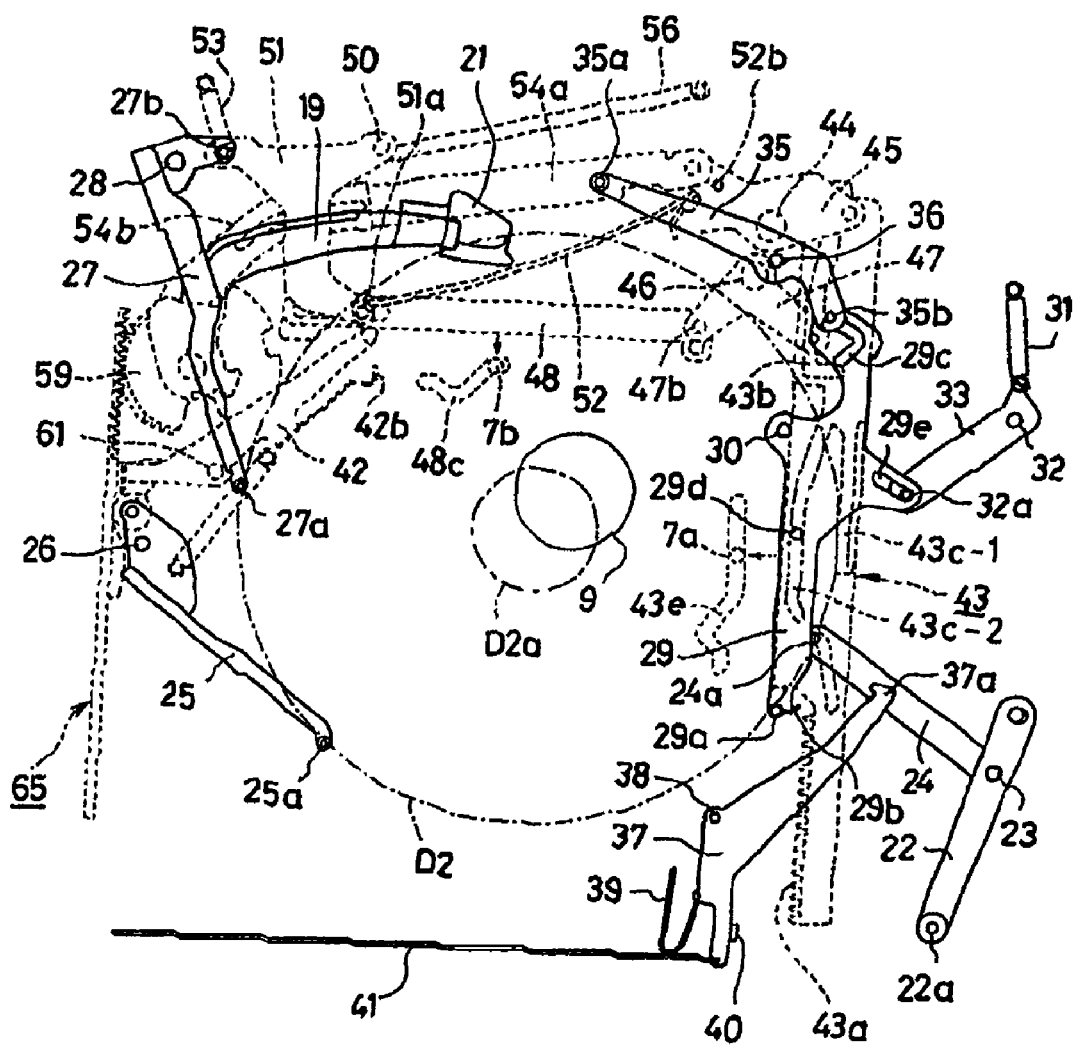
FIG. 27 is a fifth process diagram illustrating in what state the small-diameter disk is conveyed.
Figure 34:
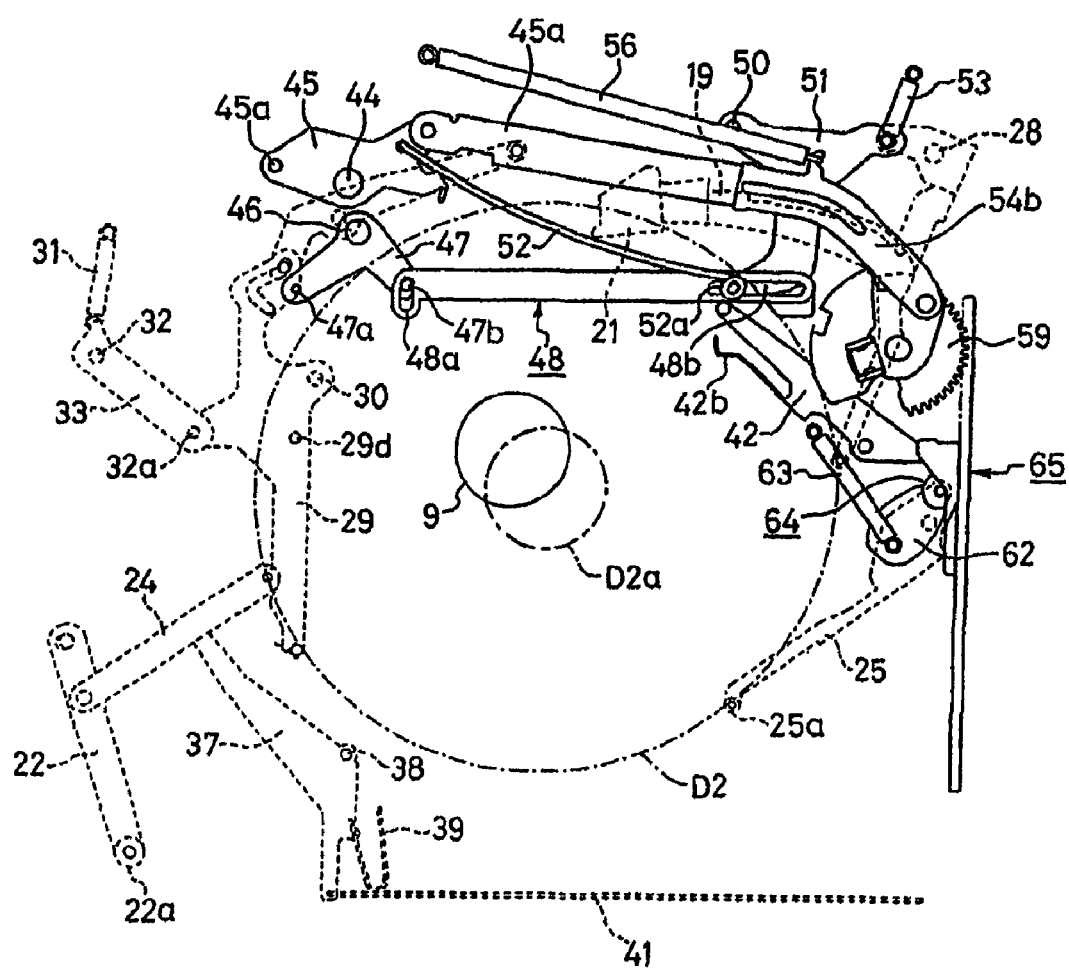
FIG. 34 is a fifth process diagram illustrating in what state the small-diameter disk is conveyed.

FIGS. 27 and 34 show a state in which the loading slider 43 further retreats from its state shown in FIGS. 26 and 33 and the loading of the small-diameter disk D2 is continued. The guide arm 29 does not pivot, but in accordance with the amount of movement of the loading slider 43 the disk supporting arm 19 pivots in the centrifugal direction and the guide arms 25 and 27 pivot in the centripetal direction to support the small-diameter disk D2.

Figure 28:
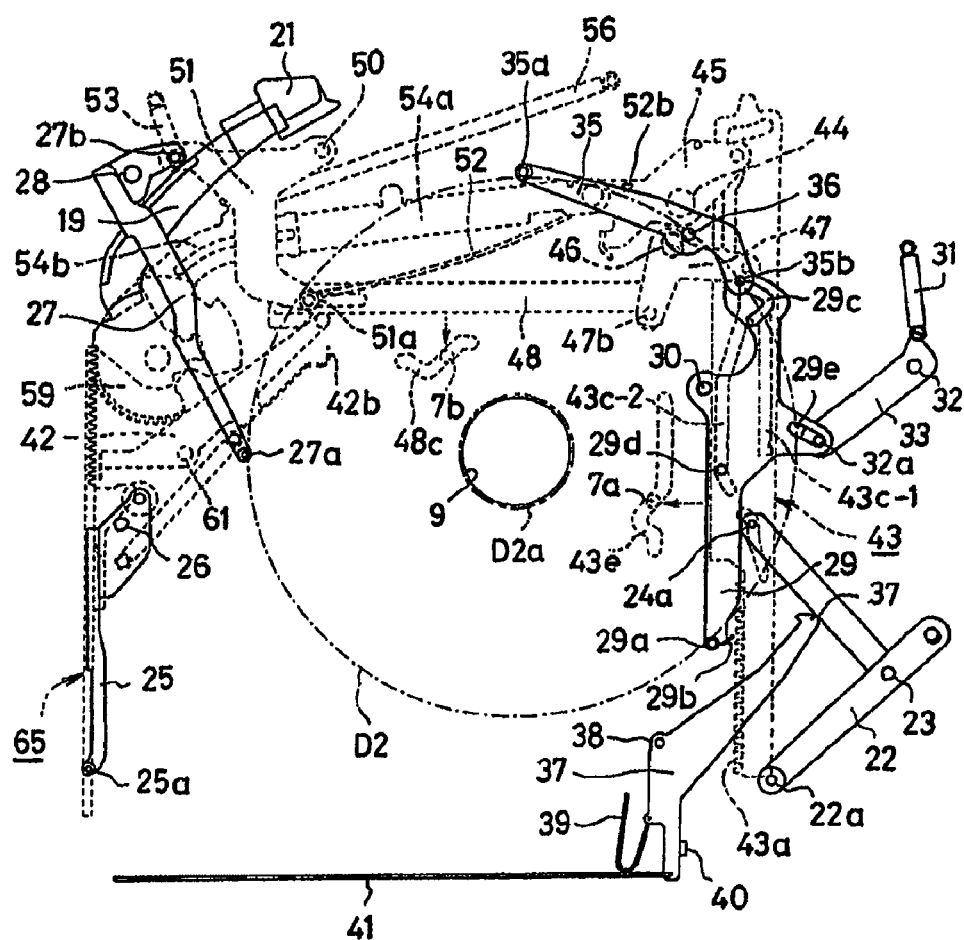
FIG. 28 is a sixth process diagram illustrating in what state the small-diameter disk is conveyed.
Figure 35:
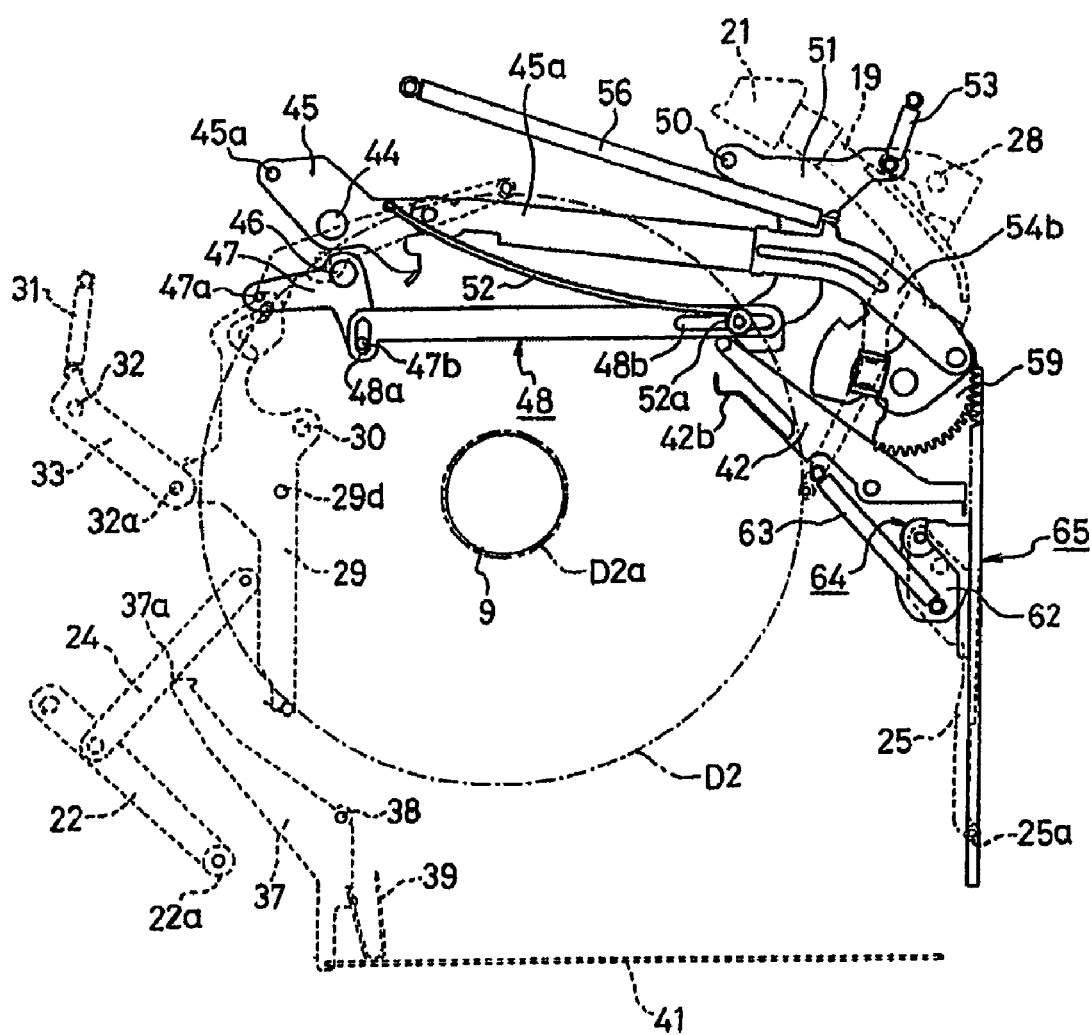
FIG. 35 is a sixth process diagram illustrating in what state the small-diameter disk is conveyed.
Figure 36:
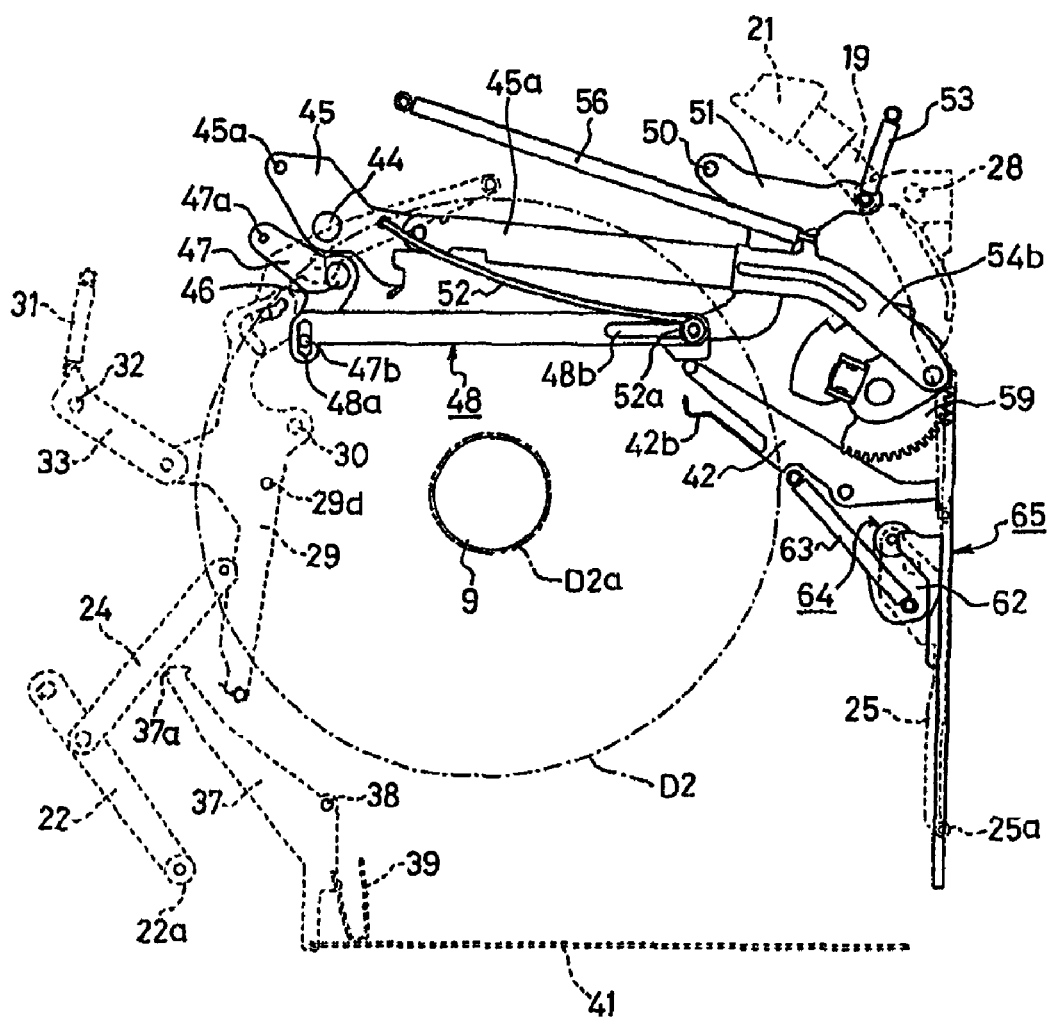
FIG. 36 is a seventh process diagram illustrating in what state the small-diameter disk is conveyed.

FIGS. 28 and 35 show a state in which the loading slider 43 further retreats from its state shown in FIGS. 27 and 34 and the center of the center hole D2a of the small-diameter disk D2 and that of the clamp head 9 are aligned with each other, bringing the disk to a stop. In the process up to such a state, as the loading slider 43 retreats, the disk supporting arm 19 pivots largely in the centrifugal direction to terminate the support of the outer periphery edge of the small-diameter disk D2 and as a result of this pivotal movement the gear disc 59 causes the rack slider 65 to move forward. Consequently, the small-diameter portion 64a of the double roller 64 strikes on the upper guide piece 65c of the rack slider 65 and hence the guide arm 25 pivots largely in the centrifugal direction to terminate the support of the outer periphery edge of the small-diameter disk D2. Now, the guide arm 25 is retracted sideways of the lift frame 7 and does not extend onto the lift frame 7.

In the above condition, the outer periphery edge of the small-diameter disk D2 is three-point supported by the support member 27a of the guide arm 27, the support member 29a of the guide arm 29 and the support member 35a of the guide arm 35. In the process up to this state the pressing force of the support member 27a of the guide arm 27 based on the action of the extension spring 53 is exerted on the small-diameter disk D2, whereby the loading of the disk D2 is continued.

In the process from FIG. 27 to FIG. 28, as the cam groove 43e of the loading slider 43 retreats, the driven pin 7a of the lift frame 7 shifts from the lower portion 43e-1 to the slant portion 43e-2 and assumes to rising state. On the other hand, the driven pin 47a of the second pivotable member 47 passes the vertical portion 43b-3 of the loading slider 43 and reaches the lower-end horizontal portion 43b-2, causing the second pivotable member 47 to pivot in the centrifugal direction, so that the work pin 47b causes the driven slider 48 to move horizontally and at the same time the cam groove 48c moves horizontally. As a result, the driven pin 7b of the lift frame 7 shifts from the lower portion 48c-1 to the slant portion 48c-2 and assumes a rising state and the lift frame 7 starts to rise as shown in FIG. 37(B).

Figure 29:
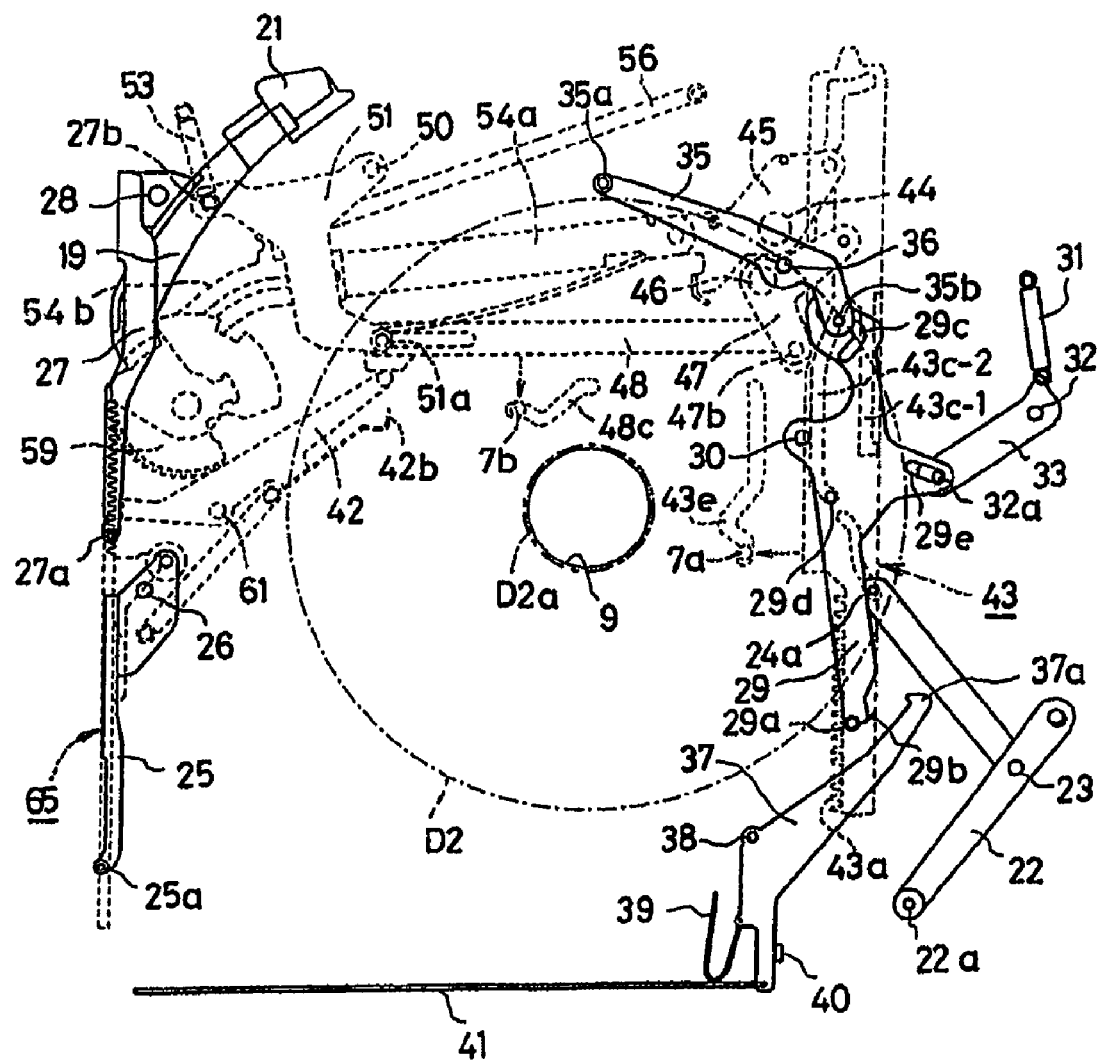
FIG. 29 is a seventh process diagram illustrating in what state the small-diameter disk is conveyed.

FIGS. 29 and 35 show a final state in which the clamp head 9 clamps the center hole D2a of the small-diameter disk D2, permitting drive of the small-diameter disk D2. For achieving this state it is necessary that the guide arms 27, 29 and 35 pivot and terminate the support of the small-diameter disk D2 so as not to be an obstacle to rotation of the small-diameter disk D2.

That is, in the further retreated and stopped position of the loading slider 43 from the state of FIG. 28, the driven pin 47a is pushed up by the lower-end horizontal portion 43b-2 and the second pivotable member 47 pivots in the centrifugal direction. As a result, the work pin 51a connected to the end through hole 48b of the driven slider 48 is pulled and the third pivotable member 51 pivots in the centripetal direction, whereby the guide arm 27 is pivotally moved in the centrifugal direction to terminate the support of the small-diameter disk D2.

On the other hand, the driven pin 29d of the guide arm 29 reaches the slant portion at the terminal end of the guide groove 43c-2 in the loading slider 43 and therefore the guide arm 29 pivots slightly in the centrifugal direction, so that the support of the small-diameter disk D2 by the support member 29a is ended. With this pivotal movement of the guide arm 29, the driven pin 35b connected to the guide groove 29c of the guide arm 29 is operated to pivot the guide arm 35 slightly in the centrifugal direction, thereby terminating the support of the small-diameter disk D2.

In the process from FIG. 28 to FIG. 29, the driven slider 48 moves horizontally in synchronism with retreat of the loading slider 43, but the driven pin 7a of the lift frame 7 shift from the slant portion 43e-2 of the cam groove 43e in the loading slider 43 to the higher portion 43e-3 and the driven pin 7b shifts from the slant portion 48c-2 of the cam groove 48c in the driven slider 48 to the higher portion 48c-3.

In this process the lift frame 7 behaves as follows. The lift frame 7 rises by the driven pins 7a and 7b which rise by the slant portions 43e-2 and 48c-2, then, as shown in FIG. 37(C), the chucking pawl 9a of the clamp head 9 comes into abutment against the center hole D2a of the small-diameter disk D2 and pushes up the small-diameter disk D2, so that the peripheral edge of the center hole D2a comes into abutment against the protuberance 2b of the chassis case 2.

When the driven pins 7a and 7b reach the tops of the slant portions 43e-2 and 48c-2 from the above condition, as shown in FIG. 37(D), the clamp head 9 is fitted in the center hole D2a of the small-diameter disk D2 to complete clamping by the chucking pawl 9a and the small-diameter disk D2 is fixed thereby onto the turntable 10. As the driven pins 7a and 7b shift to the higher portions 43e-3 and 48c-3, the lift frame 7 descends to its position shown in FIG. 37(E), thus permitting drive of the small-diameter disk D2.

Operation modes of various mechanisms during loading of the small-diameter disk D2 by the disk unit 1 of the present invention has been described above, but for unloading of the disk the mechanisms operate with advance of the loading slider 43 in accordance with a sequence reverse to the above loading sequence. That is, when the unloading of the small-diameter disk D2 is started and the loading slider 43 starts to advance, the lift frame 7 once rises and then descends to its initial position, as shown in FIGS. 38(A) to 38(E). In the meantime, the small-diameter disk D2 is stuck up by the clamp release pin 71 as shown in FIG. 38(C), whereby the clamped condition by the clamp head 9 is released.

In the process up to unclamping of the small-diameter disk D2 performed in the above manner, the guide arms 25, 27 and 29 pivot in the centripetal direction and assume the state shown in FIG. 28 in which they support the outer periphery edge of the small-diameter disk D2. Subsequently, operations are performed in a sequence reverse to the above sequence, like FIGS. 27 to 24, during which the small-diameter disk D2 is unloaded with the pivoting force in the centripetal direction of the disk supporting arm 19 until the front end portion thereof is exposed from the slot 3a of the bezel 3 and then stops.

Figure 44:
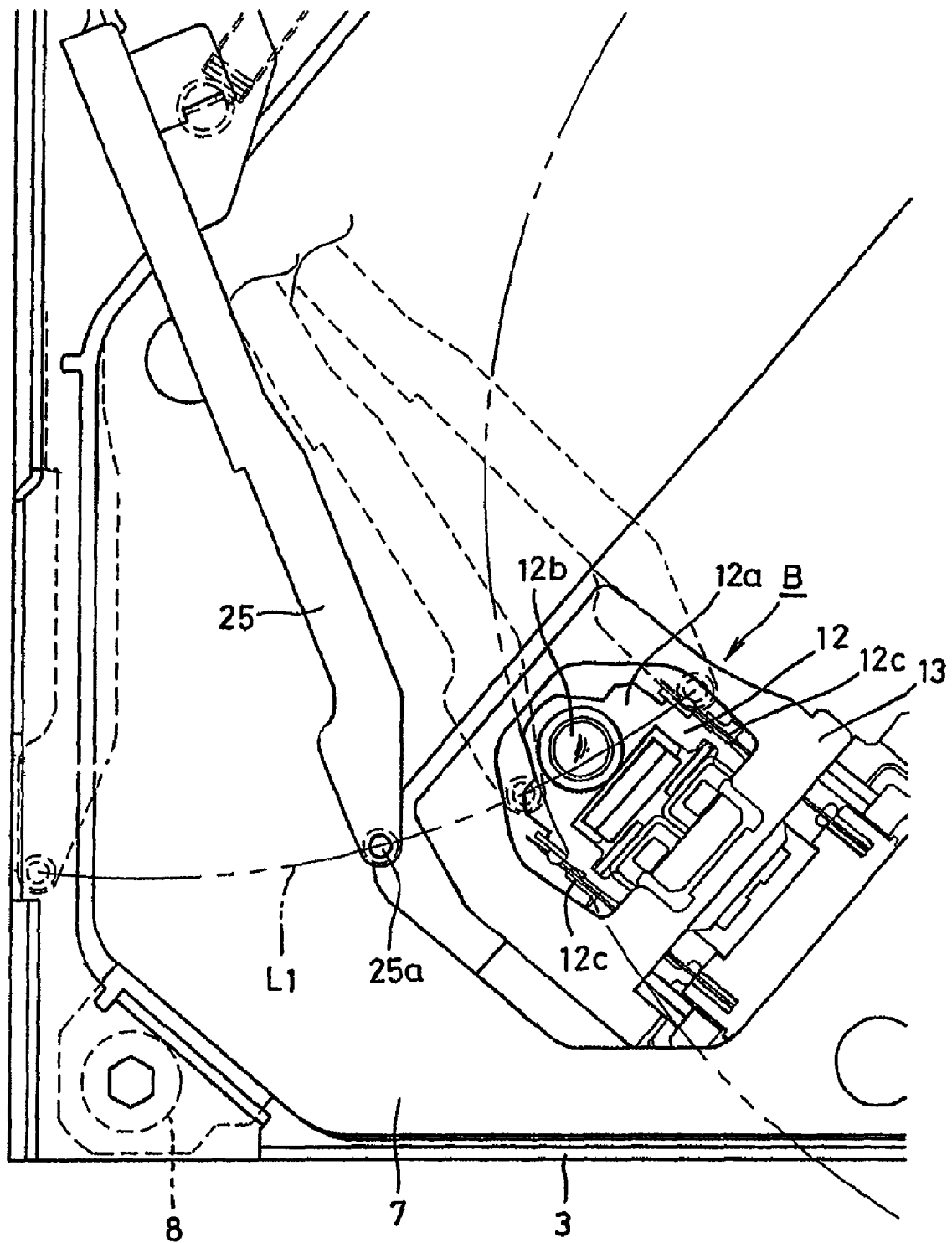
FIG. 44 is a diagram illustrating an operation mode of a guide arm.

Next, a construction for avoiding damage of the optical pickup 12 in the disk unit 1 constructed as above will be described with reference to FIGS. 44 to 48. FIG. 44 is a plan view showing on a larger scale the pivoting portion of the guide arm 25 in the above-described construction. The guide arm 25 indicated with a solid line in the same figure is in a state of waiting for insertion of the large- and small-diameter disks D1, D2 from the slot 3a of the bezel 3.

At this time, the optical pickup 12 adapted to reciprocate within the lift frame 7 is at rest in a position close to the bezel 3 which is remotest in the centrifugal direction from the turntable 10. This is for the following reason. The wall thickness of the optical pickup 12 is large, so if the optical pickup 12 is allowed to stop at the position closest to the turntable 10, its bottom comes into abutment against the bottom plate of the chassis case 2 with a large descent of the end portion of the lift frame 7 close to the turntable 10 because the lift frame 7 uses the bezel 3 side as a fulcrum of its pivotal motion.

Such an inconvenience can be avoided by making large the gap between the back side of the aforesaid end portion of the lift frame 7 and the bottom plate of the chassis case 2, but an increase in wall thickness of the entire disk unit results and thus it becomes impossible to meet the demand for the reduction of thickness. In view of this point, in the initial state in which the end portion in question of the lift frame 7 is most descended, the optical pickup 12 is approximated to the pivotal fulcrum where the amount of pivotal descent of the lift frame 7 is the smallest and is allowed to stand still there, thereby making the reduction of thickness possible.

Therefore, in a state in which the optical pickup 12 is at rest as shown in FIG. 44, particularly an objective lens 12b thereof is positioned under a pivoting path L1 of the support member 25a of the guide arm 25. Thus, there remains the possibility of occurrence of a problem in the conveyance process of the small-diameter disk D2 shown in FIGS. 25 to 26.

That is, when the guide arm 25 starts conveyance of the small-diameter disk D2 and the support member 25a moves pivotally in the centripetal direction, there is created a state in which a free end of the support member 25a confronts the objective lens 12b of the optical pickup 12, as shown in FIG. 45(A). As shown in the same figure, the confronting distance between the free end of the support member 25a and the objective lens 12b is extremely short, thus giving rise to a fear of mutual contact.

However, since the guide arm 25 is in a cantilevered state with its base end portion serving as a pivotal fulcrum, even a slight vibration or shock causes the end support member 25a to move vertically to a large extent and strike the objective lens 12b as shown in FIG. 45(B). Moreover, the pivoting path L1 of the support member 25a also overlaps a lens holder 12a, so if the lens holder 12a is struck by the support member 25a, a suspension wire 12c which supports the lens holder 12a may be deformed.

Figure 46:
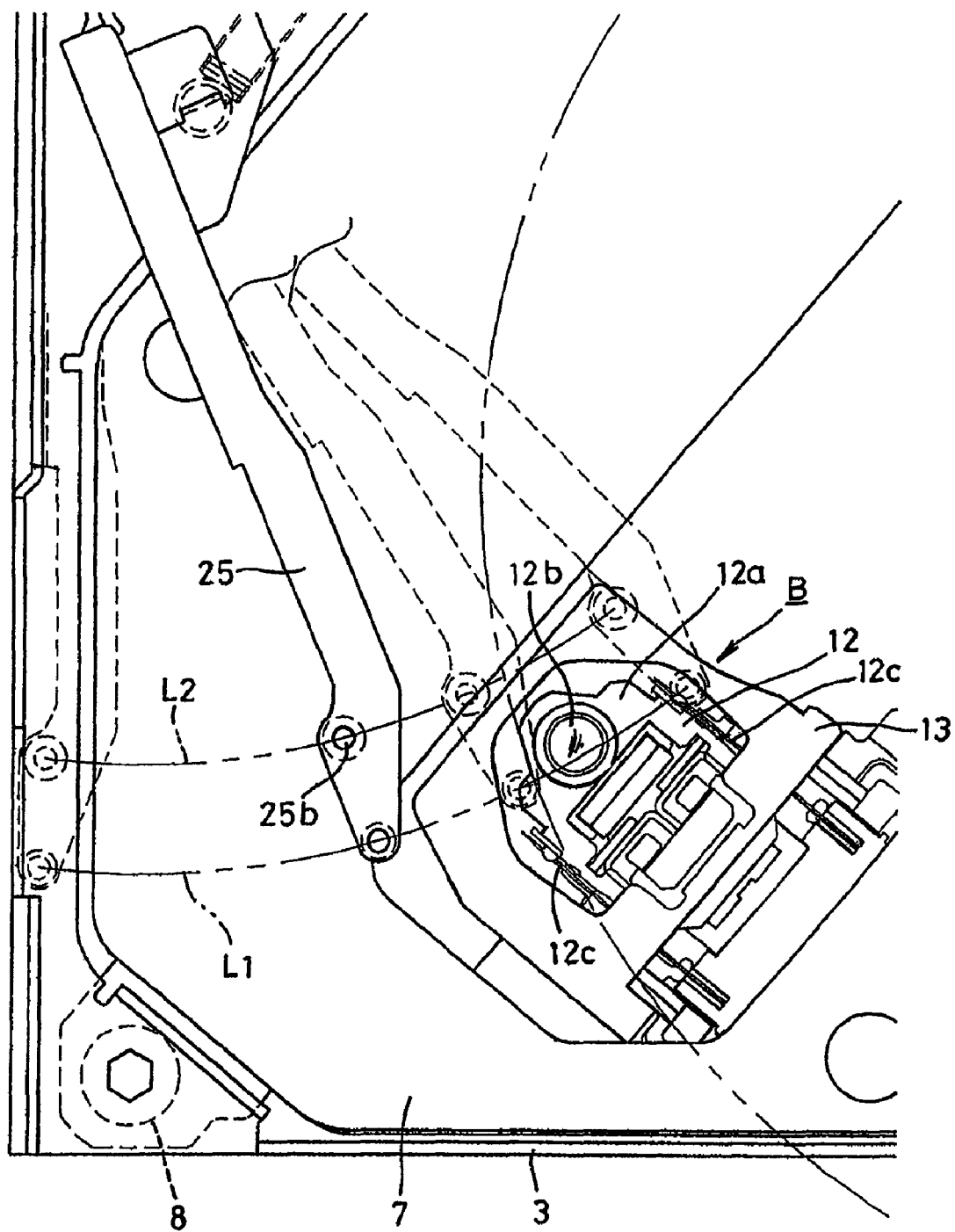
FIG. 46 is a diagram illustrating an operation mode of an improved guide arm according to the present invention.
Figure 48:
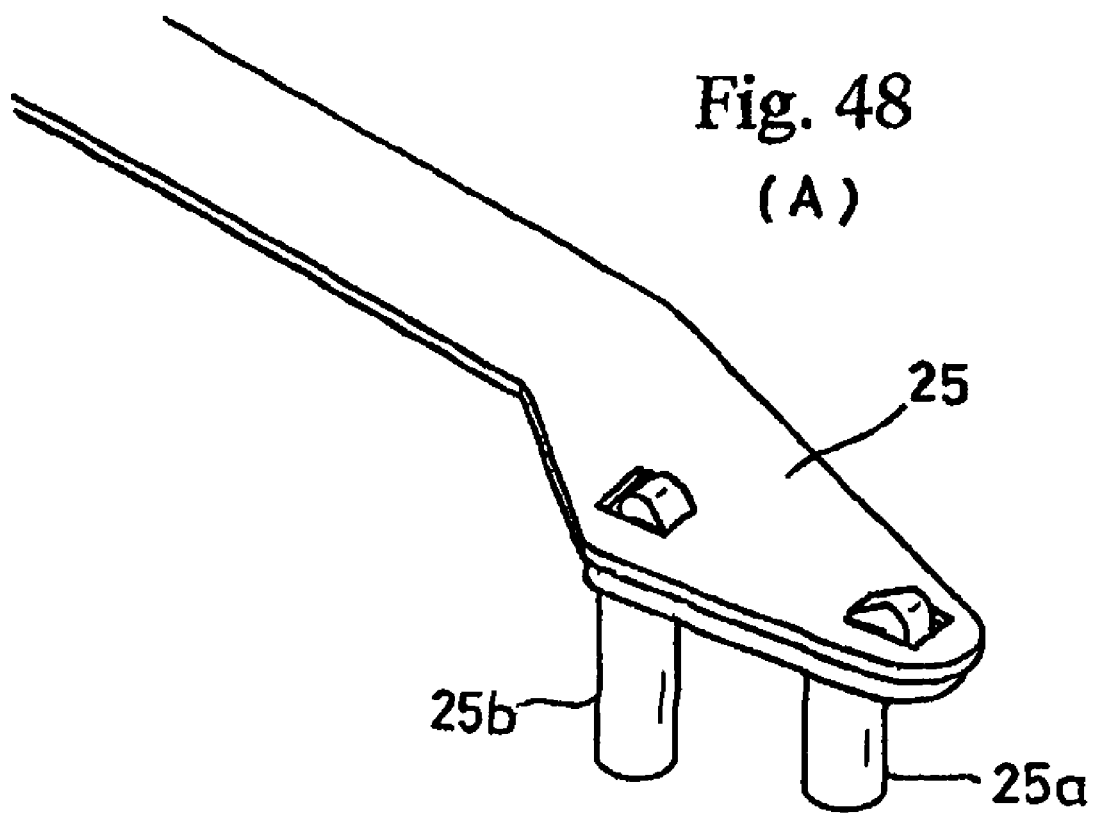
FIG. 48 is a perspective view showing another construction example of a descent inhibiting member.
Figure 48:
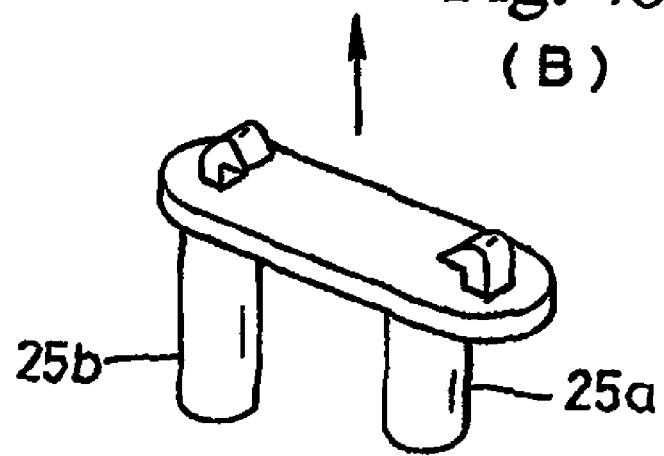
Figure 49:
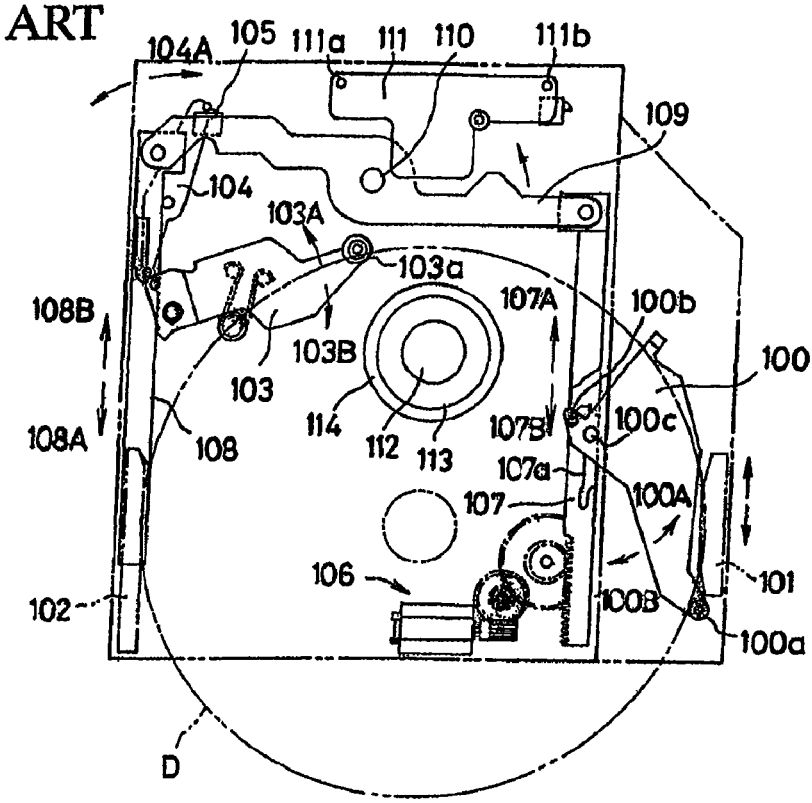
FIG. 49 is a plan view showing a conventional disk unit.
Figure 50:
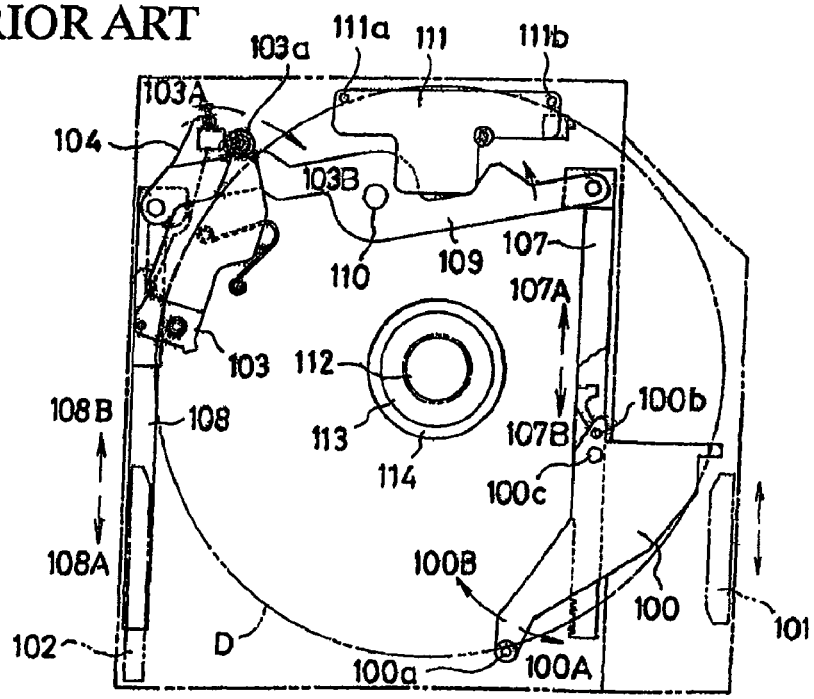
FIG. 50 is a plan view showing the conventional disk unit.

FIG. 46 shows a construction adopted in the present invention for solving such a problem. In this construction, a descent inhibiting member 25b for the guide arm 25 is provided at the tip of the guide arm 25. In the illustrated example, a pin member is used as the descent inhibiting member 25b and is fixed to the rear portion of the disk support member 25a by suitable means such as caulking. The descent inhibiting member 25b and the support member 25a may be integrally formed using a resin material, for example, as shown in FIG. 48(B), and may be locked or bonded to the tip of the guide arm 25 in such a state as shown in FIG. 48(A).

According to such a construction, when the guide arm 25 is pivoted, a pivoting path L2 of the descent inhibiting member 25b assumes a shifting state from above the lift frame 7 to the carrier block 13, so even if the tip of the guide arm 25 descends with a vertical movement of the guide arm caused by vibration or shock in the state of FIG. 47(A) which falls under the pivotal range of the guide arm 25, the descent inhibiting member 25b comes into abutment against the lift frame 7 or the carrier block 13 to inhibit the descent of the tip of the guide arm 25, as shown in FIG. 47(B), whereby the support member 25a can be prevented from contacting the objective lens 12b or the lens holder 12a.

Thus, the slot-in type disk unit 1 according to the present invention is constructed such that the outer periphery edges of the large- and small-diameter disks D1, D2 can be supported by plural arms which are actuated in synchronism with advance or retreat of the loading slider 43. Therefore, in the loading method involving a pivotal movement of arms, it became possible for the first time to effect automatic loading of disks different in diameter. Further, according to the present invention, the tip of the arm adapted to move pivotally over the optical pickup which writes or reads information to or from a disk, thereby conveying the disk, is prevented from damaging the optical pickup, whereby it is possible to improve the mechanical reliability of the disk unit.

While illustrative embodiments have been illustrated and described, it will be appreciated that various changes can be made therein without departing from the spirit and scope of the invention.

The invention claimed is:

1. A disk unit wherein a disk inserted is loaded to the interior of the disk unit or a disk accommodated in the interior of the disk unit is unloaded to the exterior of the disk unit, the disk unit comprises:
    a plurality of arms configured to convey two types of disks different in diameter while supporting an outer periphery edge of each of the two types of disks; and
    a lift frame provided with a turntable and a clamp head configured to support and rotate the disk,
    wherein the plurality of arms include a first arm that extends above the lift frame until loading of a small-diameter disk by the plurality of arms carrying the small-diameter disk to a position corresponding to the clamp head is finished, then the first arm that is extended above the lift frame is retracted to a location where the first arm does not extend over the lift frame, the first arm being retracted before the lift frame starts to raise or when the lift frame starts to raise, and after the loading of the small-diameter disk is finished.

2. The disk unit according to claim 1, wherein the plurality of arms can convey the two types of disks different in diameter while supporting the outer periphery edge of each of the two types of disks in at least three positions.

3. The disk unit according to claim 1, wherein the driving of the plurality of arms is controlled in an interlocking manner with advancement or retreat of a single loading slider.

4. The disk unit according to claim 1, wherein an automatic loading of a small-diameter disk is started on the basis of a primary operation of a detection switch configured to judge a state of operation of the disk supporting arms and an automatic loading of a large-diameter disk is started on the basis of a secondary operation of the detection switch.

5. The disk unit according to claim 1, wherein a loading slider for transmitting a driving force to at least one of the plurality of arms is provided with a guide groove to control the drive of an arm for the conveyance of a large-diameter disk and a guide groove to control the drive of an arm for the conveyance of a small-diameter disk.

6. The disk unit according to claim 1, wherein a common arm is guided by either a guide groove provided to control the drive of an arm for the conveyance of a large-diameter disk or a guide groove provided to control the drive of an arm for the conveyance of a small-diameter disk.

7. The disk unit according to claim 1, wherein an arm driven pin guided by a guide groove configured to control the drive of an arm for the conveyance of a large-diameter disk and a guide groove configured to control the drive of an arm for the conveyance of a small-diameter disk faces the guide groove configured to control the drive of the arm for the conveyance of the small-diameter disk in a steady state and, upon insertion of the large-diameter disk, faces the guide groove configured to control the drive of the arm for the conveyance of the large-diameter disk.

8. The disk unit according to claim 1, wherein a loading slider for transmitting a driving force to at least one of the plurality of arms is provided with a guide groove configured to make the one arm perform an operation for the conveyance of a large-diameter disk and a guide groove configured to make the one arm perform an operation for the conveyance of a small-diameter disk.

9. The disk unit according to claim 1, wherein at a tip of an arm passing over an optical pickup which is configured to reciprocate through the interior of the lift frame there is provided a descent inhibiting member for the arm.

10. The disk unit according to claim 9, wherein a pin member is fixed to a rear portion of a disk support member fixed to the tip of the arm to serve as the descent inhibiting member.

11. The disk unit according to claim 9, wherein a disk support member and the descent inhibiting member are formed integrally and fixed to the tip of the arm.

* * * * *